United States Patent
Yanagawa et al.

(10) Patent No.: US 7,164,402 B2
(45) Date of Patent: Jan. 16, 2007

(54) LIQUID CRYSTAL DISPLAY DEVICE

(75) Inventors: Kazuhiko Yanagawa, Mobara (JP); Yasushi Iwakabe, Ooamishirasato (JP); Yoshiaki Nakayoshi, Ooamishirasato (JP); Setsuo Kobayashi, Mobara (JP); Katsumi Kondo, Mito (JP); Nagatoshi Kurahashi, Mobara (JP)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 09/948,953

(22) Filed: Sep. 10, 2001

(65) Prior Publication Data

US 2002/0067322 A1 Jun. 6, 2002

(30) Foreign Application Priority Data

Dec. 1, 2000 (JP) .............................. 2000-367769

(51) Int. Cl.
*G09G 3/36* (2006.01)

(52) U.S. Cl. ........................... 345/87; 349/42; 349/139

(58) Field of Classification Search .................. 345/87, 345/92; 349/139, 141, 42–47
See application file for complete search history.

(56) References Cited

U.S. PATENT DOCUMENTS 5,774,099 A * 6/1998 Iwasaki et al. ............... 345/87
6,049,369 A    4/2000 Yanagawa et al. .......... 349/141
6,208,399 B1 * 3/2001 Ohta et al. ................... 349/139
6,259,502 B1 * 7/2001 Komatsu .................... 349/141
6,449,027 B1 * 9/2002 Lee et al. .................... 349/141

FOREIGN PATENT DOCUMENTS

JP        2000-132135      10/1998

* cited by examiner

Primary Examiner—Jimmy H. Nguyen
(74) Attorney, Agent, or Firm—Reed Smith LLP; Stanley P. Fisher, Esq.; Juan Carlos A. Marquez, Esq.

(57) ABSTRACT

A liquid crystal display device can suppress the local temperature elevation of a liquid crystal in the vicinity of drivers. On a liquid-crystal-side surface of one substrate out of substrates which are arranged to face each other in an opposed manner while sandwiching a liquid crystal therebetween, a switching element which is operated in response to scanning signals from a gate signal line, a pixel electrode to which video signals from a drain signal line are supplied via the switching element, and a reference electrode which generates an electric field between the reference electrode and the pixel electrode are mounted on each pixel region of the liquid-crystal-side surface. The video signals from the drain signal line are generated by a driver chip mounted on one substrate. A light transmittivity of the liquid crystal layer is set to take a minimum value when a voltage is not applied between the pixel electrode and the reference electrode. A maximum amplitude of voltage of the video signals is set to a value not more than a voltage necessary for setting a relative transmittivity of the liquid crystal layer to 90%.

19 Claims, 41 Drawing Sheets

Plenomena of ionic image sticking
After displaying lower patern at display for 1hour, measure chages of brightness with displying middle level (V5%) patern at measure.

FIG. 51A
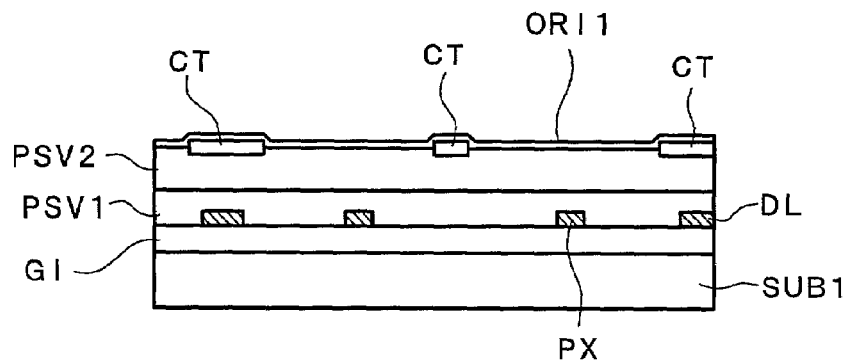
FIG. 51B
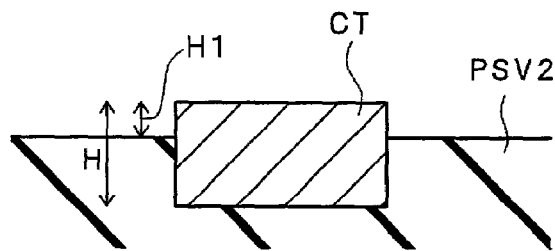
FIG. 52
| H | H1 | (H−H1)/H | Avoid unintended lighting at electrode edge |
|---|---|---|---|
| 300nm | 0 | 0 | ◎ |
| ↑ | 90nm | 0.3 | ◎ |
| ↑ | 150nm | 0.5 | ○ |
| ↑ | 300nm | 1 | × |

Dependence of Vmax to organic
PAS thickness and inter-
electrode distance
(at liquid crystal's Δε=10)

Dependence of Vmax to organic PAS thickness and inter-electrode distance
(at liquid crystal's Δε=10)

LIQUID CRYSTAL DISPLAY DEVICE

BACKGROUND OF THE INVENTION (1) Field of the Invention

The present invention relates to a liquid crystal display device, and more particularly, to an active-matrix type liquid crystal display device.

(2) Background Art

In an active-matrix type liquid crystal display device, on a liquid-crystal-side surface of one substrate out of respective substrates which are arranged to face each other in an opposed manner while sandwiching a liquid crystal therebetween, respective regions which are surrounded by gate signal lines which are extended in the x direction and are arranged in the y direction in parallel and drain signal lines which are extended in the y direction and are arranged in the x direction in parallel are formed as pixel regions. Each pixel region includes an active element which is operated in response to scanning signals from the gate signal line, a pixel electrode to which video signals from the drain signal line are supplied via the active element, and a capacity which is generated between the active element and the pixel electrode.

The liquid crystal display device having such a constitution realizes an image display by performing writing for a fixed time with the use of the active element and subsequent holding for a fixed time.

As holding methods, a Cadd (added capacity) method which generates a capacity between the gate signal line and the pixel electrode and Cstg (holding capacity) method which generates a capacity between a holding capacity signal line and the pixel electrode have been known.

Although the numerical aperture is lowered in the Cstg method since the method requires the holding capacity signal lines, the method can obtain a relatively high quality image since the holding potential can be made stable.

Further, as a liquid crystal display device using the Cstg method, a so-called lateral electric field type liquid crystal display device has been known. This type of liquid crystal display device is constituted such that on a substrate side on which pixel electrodes are formed, reference electrodes which generate an electric field between the pixel electrodes and the reference electrodes are mounted. Holding capacities are formed by superposing pixel electrodes on reference signal lines which supply reference signals to the reference electrodes via insulation films.

As liquid crystal display devices which can realize the broadening of a viewing angle of the display of the liquid crystal display device, liquid crystal display devices which adopt this Cstg method have been commercialized.

On the other hand, to ensure a uniform gap (cell gap) between respective substrates which are arranged to face each other in an opposed manner while sandwiching a liquid crystal therebetween, a constitution which disperses polymer stationary beads in the inside of the liquid crystal or a constitution which provides support columns made of organic material to one substrate surface by a selective etching with the use of a photolithography technique has been known.

Although the leaking of light is generated in the periphery of the beads or the support columns, the technique which arranges the support columns in the inside of the screen can preliminarily set their positions and hence, the technique can realize the enhancement of the contrast ratio compared to the technique which uses the dispersion of beads.

Further, as a mounting method of drivers (semiconductor chips) which supply signals to the active elements, a TCP method and a FCA (also referred to as "COG") method have been known.

The TCP method has a feature that the method can manufacture the liquid crystal display devices more easily than the FCP method and can enhance the yield. On the other hand, the FCP method can decrease the number of wiring which are pulled out to the outside so that the method is suitable for a high definition.

SUMMARY OF THE INVENTION (First Problem to be Solved by the Present Invention)

First of all, to realize a liquid crystal display device having a broad viewing angle and a high definition, it has been considered desirable to adopt the FCA method as the above-mentioned lateral electric field method.

However, the lateral electric field method adopts a birefringence refraction mode as a display mode of a liquid crystal thereof and hence, the mode is sensitive to the fluctuation of a thickness of a liquid crystal layer compared to the TN mode whereby there arises a drawback that the liquid crystal layer appears more colored with respect to the same fluctuation quantity of the thickness of the liquid crystal layer.

Further, inventors of the present invention have found out that, in the FCA method, the drivers are directly mounted on the substrate of the liquid crystal display device and hence, the generated heat from the drivers are directly transmitted to the substrate of the liquid crystal display device so that there arises a drawback that the liquid crystal in the vicinity of the drivers exhibits the local temperature elevation and this portion appears discolored.

(Second Problem to be Solved by the Present Invention)

Further, the inventors also have found that when the FCA method is adopted, it is often the case that drivers which are exclusively made of semiconductor chips are directly mounted on the substrate of the liquid crystal display device so that a stress is liable to be generated in the substrate at the peripheries of the semiconductor chips.

Then, the inventors have found that there arises a drawback that portions of the display surface in the vicinity of the drivers appears discolored due to this stress.

Here, that is, in a normally black mode, it has been confirmed that the leaking of light is generated at the time of black display and this results in the lowering of the contrast ratio. Here, the normally black mode means a mode in which an electric field is not applied to the liquid crystal and hence, the liquid crystal exhibits the minimum light transmittivity.

(Third Problem to be Solved by the Present Invention)

Further, when the support columns are formed on one-side substrate to make the gap formed between respective substrates which are arranged to face each other in an opposed manner while sandwiching the liquid crystal therebetween uniform, it has been found that because of the stress explained in the above-mentioned second problem, the alignment displacement between the upper and the lower substrates is worsened at regions in the vicinity of the chips than other regions.

It has been found that, when the beads are used, since their shape is a spherical body and they are not firmly secured, when a local stress is applied to the beads, the beads are rearranged in the direction to alleviate the stress and, as a result, the alignment displacement of the upper and the lower substrates in the vicinity of semiconductor chips can be decreased.

When the support columns are used, however, a following phenomenon is found. That is, the support columns and the substrate are brought into face contact so that the contact area is large. Further, the support columns per se are fixedly secured to one-side substrate. Accordingly, the local alignment displacement in the vicinity of the semiconductor chips due to the stress remains as it is so that it is difficult to alleviate the stress.

(Fourth Problem to be Solved by the Present Invention)

Further, it has been known that, in the lateral electric field method, out of the pixel electrodes and the reference electrodes which generate electric fields each other, the reference electrodes are arranged close to the video signal line.

This provision is provided to terminate the electric field from the video signal line at the reference electrode side so as to prevent the electric field from influencing the pixel electrode side.

Here, a gap is formed between the video signal line and the reference electrode and a so-called domain is generated by driving the liquid crystal in this gap portion. Accordingly, a light shielding film has been formed on this portion.

However, it has been pointed out that the formation of the light shielding film impedes the enhancement of the numerical aperture of the pixel.

(Fifth Problem to be Solved by the Present Invention)

Further, with respect to the connection of the driver with the gate signal line or the drain signal line, the signal line in the vicinity of the drivers is formed in a pattern which narrows the signal line to the size of the semiconductor chip.

In this case, it is required to pull out signal lines such as the reference signal lines besides the above-mentioned signal lines to the semiconductor chip side and to connect these signal lines to a separate wiring layer at the narrowed portions of respective signal lines so that it becomes necessary to ensure the contact regions.

However, to ensure such regions, there arises a drawback that the shrinkage of a so-called picture frame (portion which is formed of a width from an outer profile of the substrate to a display screen) can not be ensured.

Accordingly, it is an object of the present invention to provide a liquid crystal display device which can solve the drawback which is explained in conjunction with the above-mentioned first problem, that is, which can suppress the local temperature elevation of a liquid crystal in the vicinity of drivers.

It is another object of the present invention to provide a liquid crystal display device which can solve the drawback which is explained in conjunction with the above-mentioned second problem, that is, which can suppress the transmission of the stress from drivers to the substrate.

It is still another object of the present invention to provide a liquid crystal display device which can solve the drawback which is explained in conjunction with the abovementioned third problem, that is, which can suppress the alignment displacement on the display surface in the vicinity of the drivers.

It is a further object of the present invention to provide a liquid crystal display device which can solve the drawback which is explained in conjunction with the above-mentioned fourth problem, that is, which can enhance the numerical aperture.

It is a still further object of the present invention to provide a liquid crystal display device which can solve the drawback which is explained in conjunction with the above-mentioned fifth problem, that is, which can achieve a so-called shrinkage of the picture frame.

To briefly explain the summary of typical inventions among inventions disclosed here, they are as follows.

As typical means for solving the above-mentioned first problem, there is provided a liquid crystal display device being characterized in that on a liquid-crystal-side surface of one substrate out of substrates which are arranged to face each other in an opposed manner while sandwiching a liquid crystal therebetween, a switching element which is operated in response to scanning signals from a gate signal line, a pixel electrode to which video signals from a drain signal line are supplied via the switching element, and a reference electrode which generates an electric field between the reference electrode and the pixel electrode are mounted in each pixel region, the video signals from the drain signal line are generated by a driver chip mounted on one substrate, a light transmittivity of the liquid crystal layer is set to take a minimum value when a voltage is not applied between the pixel electrode and the reference electrode, and a maximum amplitude of voltage of the video signals is set to a value not more than a voltage necessary for setting a relative transmittivity of the liquid crystal layer to 90%.

As typical means for solving the above-mentioned second problem, there is provided a liquid crystal display device being characterized in that on a liquid-crystal-side surface of one substrate out of substrates which are arranged to face each other in an opposed manner while sandwiching a liquid crystal therebetween, for example, a switching element which is operated in response to scanning signals from a gate signal line, a pixel electrode to which video signals from a drain signal line are supplied via the switching element, and a reference electrode which generates an electric field between the reference electrode and the pixel electrode are mounted in each pixel region, the video signals from the drain signal line are generated by a driver chip mounted on one substrate, and a stress buffer layer is interposed between the driver chip and one substrate.

As typical means for solving the above-mentioned third problem, there is provided a liquid crystal display device being characterized in that on a liquid-crystal-side surface of one substrate out of substrates which are arranged to face each other in an opposed manner while sandwiching a liquid crystal therebetween, for example, a switching element which is operated in response to scanning signals from a gate signal line, a pixel electrode to which video signals from a drain signal line are supplied via the switching element, and a reference electrode which generates an electric field between the reference electrode and the pixel electrode are mounted in each pixel region, the signals from the respective signal lines are generated by a driver chip mounted on one substrate, support columns which ensure a gap formed between one substrate and the other substrate which faces one substrate in an oppose manner is mounted on a liquid-crystal-side surface of either one of the respective substrates, and the support columns are arranged with the density of one or less per two neighboring pixel regions.

As typical means for solving the above-mentioned fourth problem, there is provided a liquid crystal display device being characterized in that on a liquid-crystal-side surface of one substrate out of substrates which are arranged to face each other in an opposed manner while sandwiching a liquid crystal therebetween, for example, a switching element which is operated in response to scanning signals from a gate signal line, a pixel electrode to which video signals from a drain signal line are supplied via the switching element, and a plurality of reference electrodes which generate an electric field between the reference electrode and the pixel electrode are mounted in each pixel region, and one of the respective reference electrodes is formed in a superposed manner with the drain signal line via an insulation film having a dielectric constant lower than a dielectric constant of inorganic material and has a width thereof set larger than a width of the drain signal line.

As typical means for solving the above-mentioned fifth problem, there is provided a liquid crystal display device being characterized in that on a liquid-crystal-side surface of one substrate out of substrates which are arranged to face each other in an opposed manner while sandwiching a liquid crystal therebetween, for example, a switching element which is operated in response to scanning signals from a gate signal line, a pixel electrode to which video signals from a drain signal line are supplied via the switching element, and a reference electrode which is arranged in a spaced-apart manner from the pixel electrode and to which reference signals from a reference signal line are supplied are mounted in each pixel region, the video signals from the drain signal line are generated by a driver chip mounted on one of the substrates, and the gate signal line, the drain signal line and the reference signal line are respectively formed as layers which are different from each other via insulation films.

BRIEF DESCRIPTION OF THE DRAWINGS

FIG. 51 is a constitutional view showing another embodiment of the liquid crystal display device according to the present invention.

FIG. 52 is a graph showing the relationship between the electrode embedded state to an insulation film and the leaking of light in the vicinity of the electrode in the constitution shown in FIG. 51.

DESCRIPTION OF THE PREFERRED EMBODIMENTS

Embodiments of a liquid crystal display device according to the present invention are explained hereinafter in conjunction with attached drawings.

(Embodiment 1)

(Equivalent Circuit of Liquid Crystal Display Device)

Figure 2:
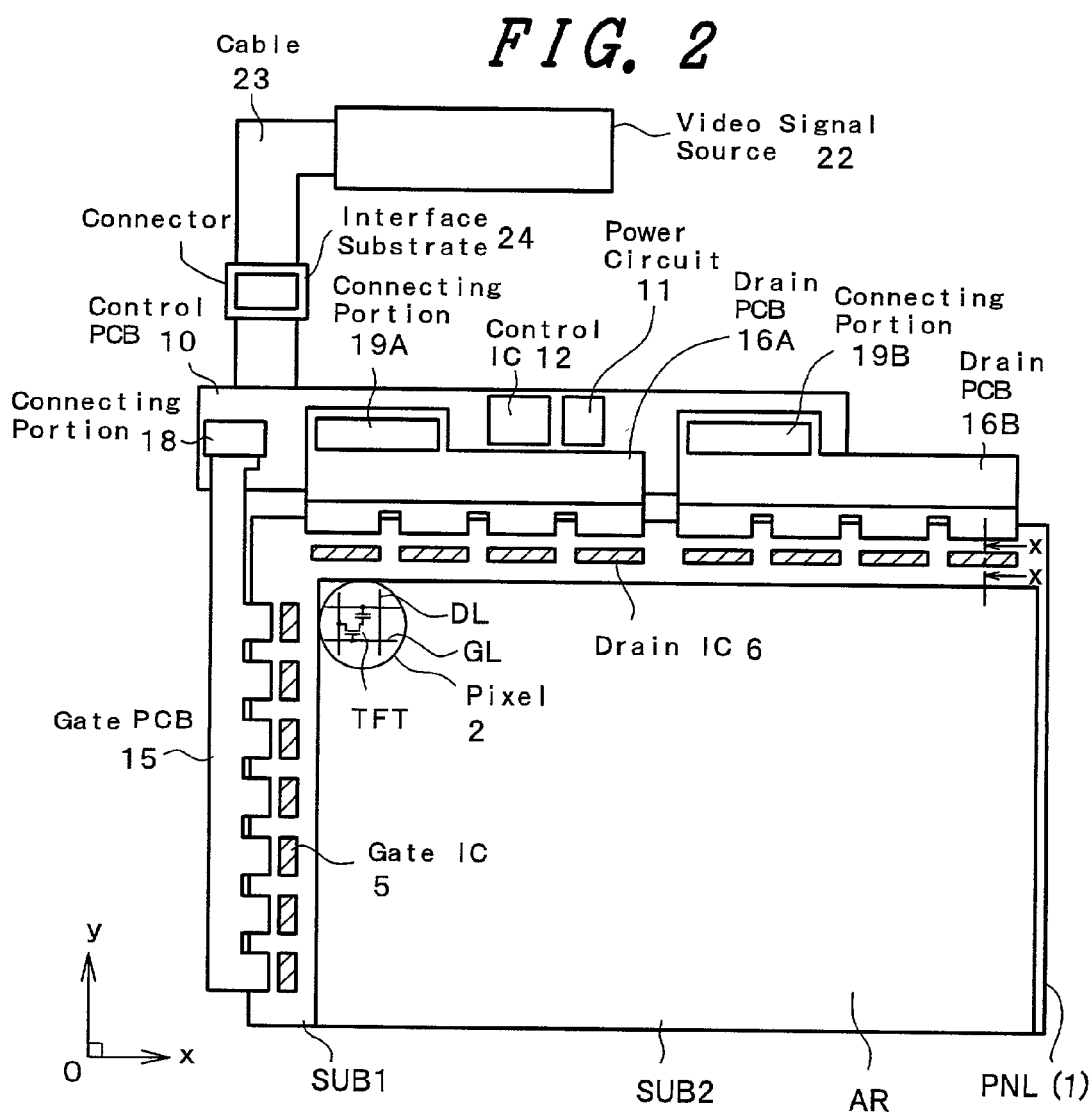
FIG. 2 is an entire constitutional view showing one embodiment of the liquid crystal display device according to the present invention.

FIG. 2 is an equivalent circuit block diagram showing one embodiment of a liquid crystal display device according to the present invention. Although this drawing is a circuit block diagram, they are drawn corresponding to the actual geometric arrangement.

In this embodiment, the present invention is applied to a liquid crystal display device which adopts a so-called lateral electric field method which is known as a method having a broad viewing angle.

First, the liquid crystal display device includes a liquid crystal display panel PNL and this liquid crystal display panel PNL uses transparent substrates SUB1, SUB2 which are arranged to face each other in an opposed manner while sandwiching a liquid crystal between them as an envelope.

In this case, one transparent substrate (in the drawing, a lower-side substrate: a matrix substrate) is formed slightly larger than the other transparent substrate (in the drawing, an upper-side substrate: a color filter substrate). In the drawing, the transparent substrates are arranged such that lower-side and right-side peripheral ends are disposed substantially on a coplanar plane.

As a result, the left-side periphery in the drawing and the upper-side periphery in the drawing of one transparent substrate SUB1 are extended outwardly from the other transparent substrate SUB2. As will be explained later in detail, this portion defines a region where a gate drive circuit (IC) 5 and a drain drive circuit (IC) 6 are mounted.

In a region where respective transparent substrate SUB1, SUB2 are superposed, pixels 2 which are arranged in a matrix array are formed. The pixels 2 are formed in regions which are surrounded by gate signal lines GL which are extended in the x direction and are arranged in parallel in the y direction in the drawing and drain signal lines DL which are extended in the y direction and are arranged in parallel in the x direction. Each pixel 2 is provided with at least a switching element TFT which is driven by the supply of scanning signals from one-side gate signal line GL and a pixel electrode to which video signals supplied from one-side drain signal line DL via the switching element TFT are applied.

Here, as mentioned previously, since the liquid crystal display device adopts the so-called lateral electric field method, as will be explained in detail later, each pixel 2 includes a reference electrode CT and a holding capacity Cstg besides the above-mentioned switching element TFT and pixel electrode PX.

Then, each gate signal line GL has one end thereof (left-side end portion in the drawing) extended to the outside of the transparent substrate SUB1 and connected to an output terminal of the gate drive circuit 5 mounted on the transparent substrate SUB1.

In this case, a plurality of gate drive circuits 5 are provided and the gate signal line GL and neighboring gate signal lines are formed into a group (see FIG. 5B) and these respective grouped gate signal lines GL are respectively connected to respective gate drive circuits 5 which are disposed close to the gate signal lines GL.

Further, in the same manner, respective drain signal lines DL have one ends thereof (upper-side end portions in the drawing) extended to the outside of the transparent substrate SUB1 and connected to an output terminal of the drain drive circuit 6.

Also in this case, a plurality of drain drive circuits 6 are provided and the above-mentioned drain signal line DL and neighboring drain signal lines are formed into a group and these respective grouped drain signal lines DL are respectively connected to respective drain drive circuits 6 which are disposed close to the drain signal lines DL.

On the other hand, the liquid crystal display device includes a printed circuit board 10 (control circuit board 10) which is arranged adjacent to the liquid crystal display panel PNL on which the gate drive circuits 5 and the drain drive circuits 6 are mounted. In addition to a power supply circuit 11 and the like, a control circuit (IC) 12 for supplying input signals to the gate drive circuits 5 and the drain drive circuits 6 is mounted on the printed circuit board 10.

Signals outputted from this control circuit 12 are supplied to the gate drive circuits 5 and the drain drive circuits 6 via a flexible wiring board (a gate circuit board 15, a drain circuit board 16A, a drain circuit board 16B).

That is, at the gate drive circuits 5 side, the flexible wiring board (gate circuit board 15) provided with terminals which are respectively connected to input-side terminals of respective gate drive circuits 5 in an opposed manner is provided.

The gate circuit board 15 has a portion thereof extended to the above-mentioned control circuit board 10 side and an extension portion there of is connected to the control circuit board 10 via a connecting portion 18.

Output signals from the control circuit 12 which is mounted on the control circuit board 10 are inputted to respective gate drive circuits 5 via a wiring layer formed on the control circuit board 10, the above-mentioned connecting portion 18 and a wiring layer formed on the gate circuit board 15.

Further, at the drain drive circuits 6 side, the drain circuit boards 16A, 16B provided with terminals which are respectively connected with input-side terminals of respective drain drive circuits 6 in an opposed manner are arranged.

These drain circuit boards 16A, 16B have portions thereof extended to the above-mentioned control circuit board 10 side and these extension portions are connected with the control circuit board 10 via connecting portions 19A, 19B.

Output signals from the control circuit 12 which is mounted on the control circuit board 10 are inputted to respective drain drive circuits 16 via a wiring layer formed on the control circuit board 10, the above-mentioned connecting portions 19A, 19B and wiring layers formed on the drain circuit boards 16A, 16B.

As shown in the drawing, the drain circuit boards 16A, 16B at the drain drive circuit 6 side are divided in two elements. This provision is made to prevent a problem brought about by making the liquid crystal display panel 1 large-sized, for example, a problem caused by a thermal expansion due to the increase of the length of the drain circuit board in the x direction in the drawing.

Then, output signals from the control circuit 12 on the control circuit board 10 are inputted to the corresponding drain drive circuits 6 via the connecting portion 19A of the drain circuit board 16A and the connecting portion 19B of the drain circuit board 16B respectively.

Further, video signals are supplied from a video signal source 22 to the control circuit board 10 via an interface board 24 through a cable 23 and the video signals are inputted to the control circuit 12 which is mounted on the control circuit board 10.

In the drawing, although the liquid crystal display panel PNL, the gate circuit board 15, the drain circuit boards 16A, 16B and the control circuit board 10 are depicted as being positioned substantially on the same plane, in reality, the control circuit board 10 is bent at portions of the gate circuit board 15 and the drain circuit boards 16A, 16B such that the control circuit board 10 is positioned substantially perpendicular to the liquid crystal display panel 1.

This provision is provided to narrow the area of a picture frame. Here, the picture frame means a region formed between a profile of an outer frame of the liquid crystal display panel PNL and a profile of a display region AR. By narrowing this area, an advantageous effect that the area of a display portion relative to the outer frame can be increased is achieved.

<<Constitution of Pixel>>

Figure 3:
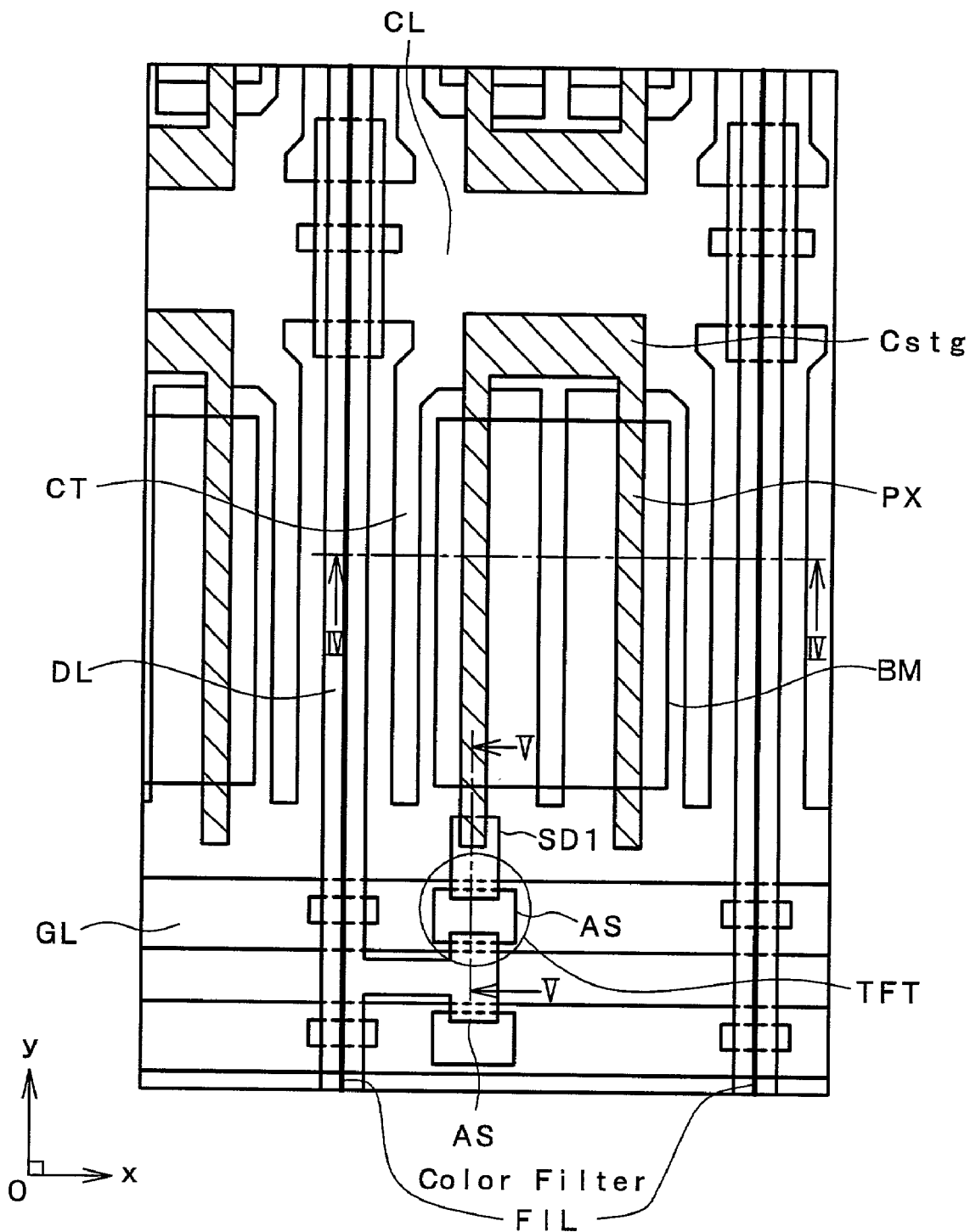
FIG. 3 is a plan view showing one embodiment of a pixel of the liquid crystal display device according to the present invention.
Figure 4:
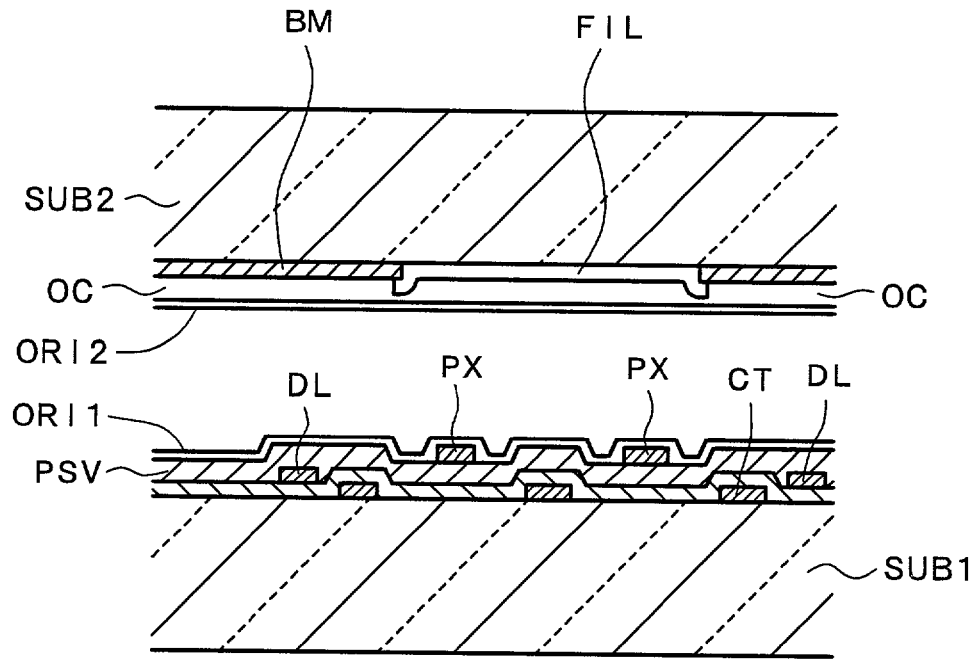
FIG. 4 is a cross-sectional view taken along a line IV—IV of FIG. 3.
Figure 5:
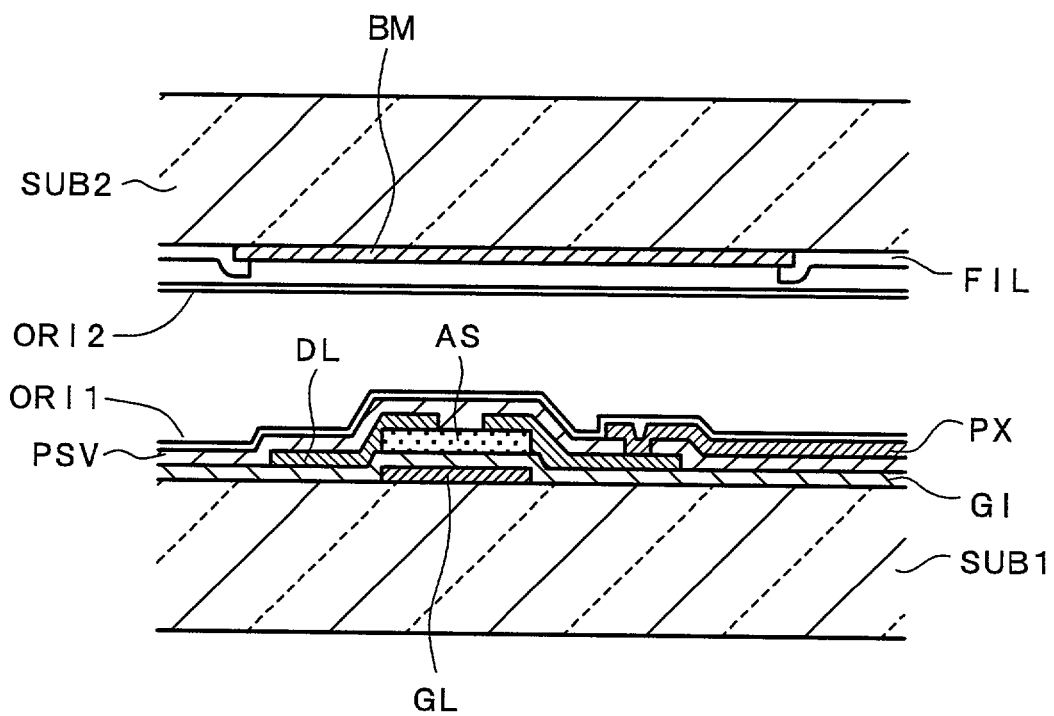
FIG. 5 is a cross-sectional view taken along a line V—V of FIG. 3.

Here, as mentioned above, in the liquid crystal display panel PNL, the display region portion AR is constituted of a large number of pixels 2 which are arranged in a matrix array and one of such pixels has the constitution shown in FIG. 3. Further, FIG. 4 is a cross-sectional view of FIG. 3 taken along a line IV—IV and FIG. 5 is a cross-sectional view of FIG. 3 taken along a line V—V.

In the drawing, the gate signal line GL and a reference voltage signal line CL which are extended in the x direction are formed on a main surface of the transparent substrate SUB1. A region which is surrounded by these respective signal lines GL, CL and the drain signal lines DL which are extended in the y direction as will be explained later is formed as a pixel region.

That is, in this embodiment, the reference voltage signal line CL is formed such that the reference voltage signal line CL runs between the gate signal lines GL and the pixel regions are formed respectively in the±y direction using the reference voltage signal line CL as a boundary.

Due to such a constitution, the reference voltage signal lines CL which are arranged in parallel in the y direction can be decreased in number to approximately half of the conventional liquid crystal display panel so that the regions which are closed by the reference voltage signal lines CL can be shared by the pixel region sides whereby the areas of the pixel regions can be increased.

In each pixel region, on the reference voltage signal line CL, three reference electrodes CT which are extended in the y direction integral with the reference voltage signal line CL are formed in an equidistantly spaced-apart manner. These respective reference electrodes CT are extended close to the gate signal line GL without being connected with the gate signal line GL. Among these reference electrodes CT, two reference electrodes CT at both sides are arranged close to the drain signal line DL and the remaining one reference electrode CT is positioned at the center.

Further, on the main surface of the transparent substrate SUB1 on which the gate signal line GL, the reference voltage signal line CL and the reference electrodes CT are formed in the above-mentioned manner, an insulation film GI which also covers these gate signal lines GL and the like and is made of a silicon nitride film, for example, is formed. This insulation film GI functions as an interlayer insulation film for ensuring the insulation of the gate signal line GL and the reference voltage signal line CL against the drain signal line DL which will be explained later, as a gate insulation film against a thin film transistor TFT, and as a dielectric film against a storage capacity Cstg.

On a surface of this insulation film GI, first of all, a semiconductor layer AS is formed in a formation region of the thin film transistor TFT. This semiconductor layer AS is, for example, made of amorphous Si and is formed on a portion of the gate signal line GL close to the drain signal line DL which will be explained later in a superposed manner. Due to such a constitution, a portion of the gate signal line GL also functions as the gate electrode of the thin film transistor TFT.

Then, on the surface of the insulation film GI, the drain signal line DL which is extended in the y direction and is arranged in parallel in the x direction is formed. This drain signal line DL is integrally provided with the drain electrode SD1 which is formed such that the drain electrode SD1 is extended to a portion of a surface of the semiconductor layer AS which constitutes the thin film transistor TFT.

Further, on the surface of the insulation film GI in the pixel region, the pixel electrode PX which is connected to a source electrode SD2 of the thin film transistor TFT is formed. This pixel electrode PX is extended in the y direction at respective centers of the reference electrodes CT. That is, one end of the pixel electrode PX also functions as a source electrode SD2 of the thin film transistor TFT, is extended in the y direction as it is, and is further extended in the x direction on the reference voltage signal line CL to form a U shape extending in the y direction.

Here, a portion of the pixel electrode PX which is superposed on the reference voltage signal line CL constitutes a storage capacity Cstg which uses the insulation film GI as a dielectric film between the portion and the reference voltage signal line CL. With the use of this storage capacity Cstg, an advantageous effect that video information can be stored for a long time in the pixel electrode PX when the thin film transistor TFT is turned off can be achieved.

A surface of the semiconductor layer AS which corresponds to an interface between the drain electrode SD1 and the source electrode SD2 of the above-mentioned thin film transistor TFT is doped with phosphorus (P) thus forming a high concentration layer. Due to such a constitution, respective electrodes have an ohmic contact. In this case, the high concentration layer is formed on the whole area of the surface of the semiconductor layer AS and hence, after forming respective electrodes, by etching the high concentration layer other than the electrode forming region using the electrodes as masks, the above-mentioned constitution is obtained.

On the upper surface of the insulation film GI on which the thin film transistor TFT, the drain signal line DL, the pixel electrode PX and the storage capacity Cstg are formed, a protective film PSV made of a silicon nitride film, for example, is formed. Further, on an upper surface of the protective film PSV, an orientation film ORI1 is formed thus constituting a so-called lower-side substrate of the liquid crystal display panel PNL.

Here, both of the reference electrodes CT and the pixel electrode PX may be formed of an opaque material layer such as metal or at least one of them may be formed of a light-transmitting material layer such as ITO (indium-tin-oxide) or the like. In the latter case, an advantageous effect that the numerical aperture of the pixel can be enhanced is obtained.

Further, on a liquid-crystal-side portion of the transparent substrate (color filter substrate) SUB2 which constitutes an upper-side substrate, a black matrix BM which has aperture portions at portions thereof corresponding to respective pixel regions is formed.

Further, color filters FIL are formed such that the color filters FIL cover the aperture portions which are formed at portions of the black matrix BM corresponding to the pixel regions. Each color filter FIL has a color which is different from colors of the neighboring pixel regions in the x direction. Further, these color filters FIL respectively define boundary portions on the black matrix BM.

Further, on the surface on which the black matrix BM and the color filters FIL are formed, a flat film OC which is made of a resin film or the like is formed and an orientation film ORI2 is formed on the flat film OC.

Here, in this embodiment, when no electric field is generated between the pixel electrode PX and the reference electrode CT, a so-called normally black mode in which the liquid crystal exhibits the minimum light transmittivity is established.

Then, the maximum amplitude of video signals (voltage) supplied to the drain signal line DL is set to a value not more than a voltage (V90) which is necessary for setting the relative transmittivity of the liquid crystal layer LC to 90%.

Based on the fact that the liquid crystal display device of this embodiment adopts the normally black mode, the large reduction of the liquid crystal driving voltage and the suppression of the influence derived from the lowering of the contrast ratio can be achieved.

Figure 1:
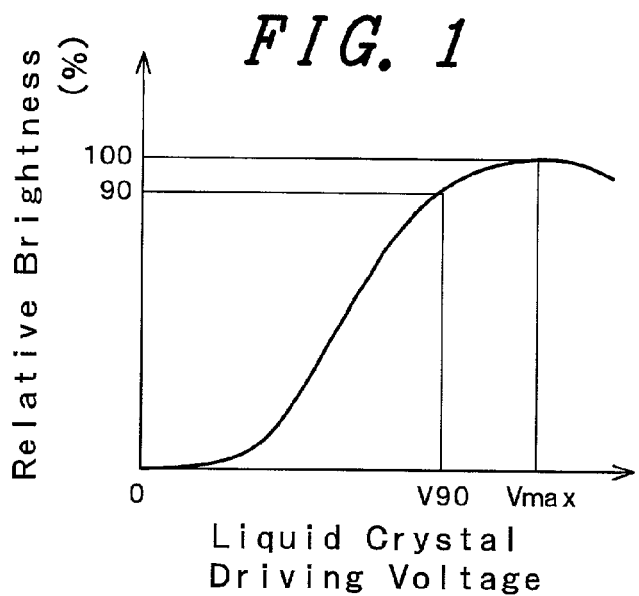
FIG. 1 is an explanatory view showing one embodiment of a liquid crystal display device according to the present invention, and more particularly to a graph which shows the relationship between a liquid crystal driving voltage and a relative brightness in a normally black mode.

That is, FIG. 1 is a graph showing th relationship between the liquid crystal driving voltage (V) and the relative brightness (%) in the normally black mode. In the normally black mode, although the white display brightness depends on the voltage, the white display brightness exhibits the saturation tendency in the vicinity of a voltage (Vmax) which gives the relative brightness of 100%. This implies that no substantial change occurs with respect to the brightness even when the liquid crystal is driven in the vicinity of the voltage (Vmax) which gives the relative brightness of 100%.

Accordingly, by suppressing the brightness to not more than 90% to provide the white display, the liquid crystal driving voltage can be largely reduced.

This implies that as the drain drive IC which supplies the video signals to the drain signal line DL, a drain drive IC with a small output can be selected and a heat generation quantity can be also reduced.

Figure 6:
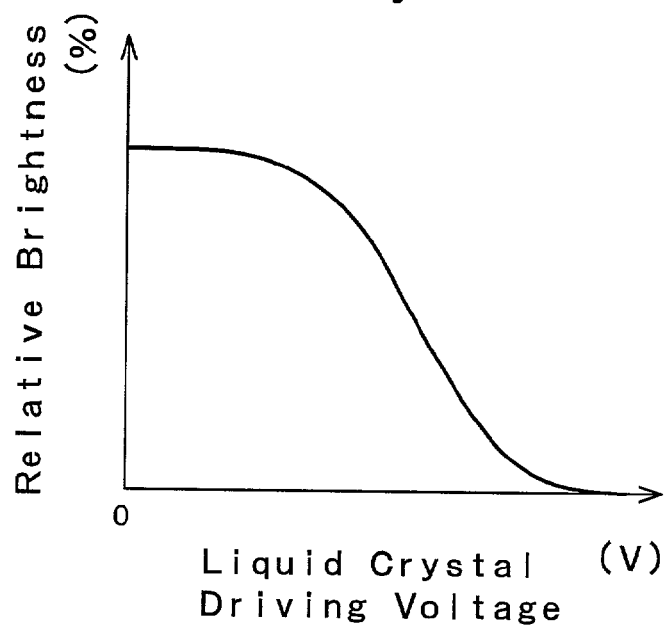
FIG. 6 is a graph showing the relationship between a liquid crystal driving voltage and a relative brightness in a normally white mode.

Further, the black display in this case is the non-current supply state and hence, the influence to the contrast ratio can be suppressed compared to the case of normally white mode (characteristics thereof being shown in FIG. 6).

(Embodiment 2)

This embodiment is characterized in that reference signals which are supplied to the reference electrodes CT of each pixel region via the reference voltage signal line CL are inverted every frame.

Figure 7:
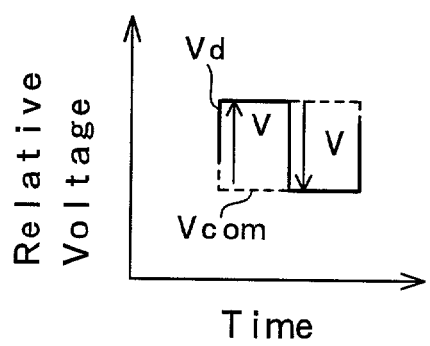
FIG. 7 is a graph showing a voltage value between a pixel electrode and a reference electrode in a common inversion in relation to time.

As shown in FIG. 7, this implies that the amplitude V of the video signals is determined in response to the reference signals which are inverted by a unit of a frame and hence, the amplitude of the video signals can be made small as a whole.

Figure 8:
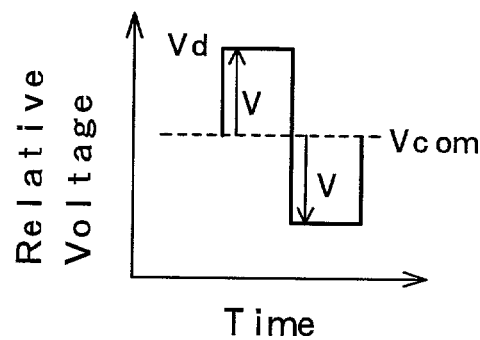
FIG. 8 is a graph showing a voltage value between a pixel electrode and a reference electrode in a fixed common voltage in relation to time.

Ton consider a case in which the reference signals are set constant by a unit of a frame as shown in FIG. 8 for a comparison purpose, it is necessary for the video signals to take an amplitude V in the (+) side and an amplitude V in the (−) side in response to the reference signals.

Accordingly, this embodiment can reduce the amplitude of the video signal by half compared to FIG. 8.

This implies that as the drain drive IC, a drain drive IC with a small output can be selected and a heat generation quantity can be also reduced.

(Embodiment 3)

In this embodiment, out of the drain signal line DL and the reference voltage signal line CL, the signal line to which signals having a larger average voltage amplitude by a unit of a frame are supplied is set to have a resistance lower than that of the other signal line.

Figure 9A:
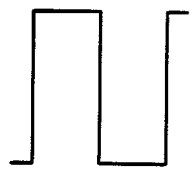
FIG. 9 is an explanatory view showing the generation of distortion of signals at the time of transmitting signals to a signal line.
Figure 9A:

Although various drive waveforms which are inputted to the signal lines exhibit a shape approximating a rectangular shape as shown in FIG. 9(a) at an input end thereof, they exhibit a deformed waveform as shown in FIG. 9(b) at a remote end thereof due to the resistance of the signal lines or the parasitic capacity.

A uniform display is required on the entire region of the display surface of the liquid crystal display panel PNL and hence, it is necessary for the actual input signals to preliminarily increase the amplitude of the input voltage in consideration of a distortion amount of this waveform. However, the driving voltage is required to be elevated further correspondingly.

Accordingly, with the use of the wiring which has the resistance lower than that of other signal line as the signal line to which the signals having the maximum average amplitude per a frame are applied, the distortion of the waveform on the signal line having the large amplitude is reduced without using any particularly large voltage signals.

In this case, in the drive which makes the reference signal (voltage) constant (see FIG. 8), it is advantageous to set the specific resistance of the wiring of the drain signal line DL lower than that of the reference voltage signal line CL.

For example, the drain signal line DL may be made of AL, an alloy including Al or a multi-layered structure made of these materials and the reference signal line may be made of Al, Cr, Ta, Mo, W, an alloy including at least one of these metals or a multi-layered structure made of these materials.

Further, the drain signal line DL may be made of Cr, an alloy including Cr or a multi-layered structure made of these materials and the reference signal line may be made of Cr, Ta, Mo, W, an alloy including at least one of these metals or a multi-layered structure made of these materials.

Further, the drain signal line DL may be made of Al, Cr, Mo, Ta, W, an alloy including at least one of these metals or a multi-layered structure made of these materials and the reference signal line may be made of ITO, $In_2O_3$, $SnO_2$.

Further, in the drive which inverts the reference voltage signal CL every frame, it is advantageous to set the specific resistance of the reference voltage signal line CL lower than that of the drain signal line DL.

For example, the drain signal line DL may be made of Al, Cr, Ta, Mo, W, an alloy including at least one of these metals or a multi-layered structure made of these materials and the reference signal line may be made of Al, Cr, an alloy including at least one of these metals or a multi-layered structure made of these materials.

Further, it is needless to say that the drain signal line DL and the reference voltage signal line CL are constituted of a multi-layered structure made of the same kind of material and the above-mentioned relationship is sufficed by increasing or decreasing a width of one of these lines, for example.

(Embodiment 4)

Figure 10A:
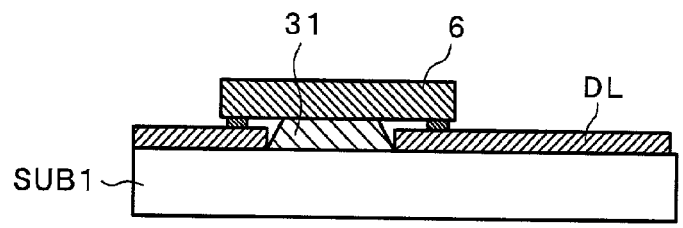
FIG. 10 is a side view showing drivers (gate drive IC, drain drive IC) which are connected to the signal lines and the constitution in the vicinity of the drivers.

FIG. 10(a) is a view showing the cross section of FIG. 2 taken along a line x—x. The drain drive IC 6 made of a semiconductor chip has a surface on which an input bump and an output bump are formed face the transparent substrate SUB1 in an opposed manner (face-down) and respective bumps are connected to terminals of a wiring layer formed on the transparent substrate SUB1 surface (referred to as "FCA method" in this specification).

In this case, the drain drive ICs 6 ensure a gap of a value not less than a height of the bumps between the drain drive ICs and the transparent substrate SUB1 side at regions which are defined between a group of input bumps and a group of output bumps which are arranged in parallel.

A stress buffer layer 31 is formed on the transparent substrate SUB1 side such that the stress buffer layer 31 fills the gap. With the provision of such a stress buffer layer 31 formed on the transparent substrate SUB1 side, the deflection of the drain drive ICs 6 (deflection which is bulged toward the transparent substrate SUB1 side at a center portion of the drain drive IC) can be absorbed.

Due to such a constitution, the stress generated in the drain drive IC 6 is hardly transmitted to the transparent substrate SUB1 side and hence, the local alignment displacement between the transparent substrate SUB1 and the transparent substrate SUB2 in the vicinity of the drain ICs 6 can be obviated.

Figure 10B:
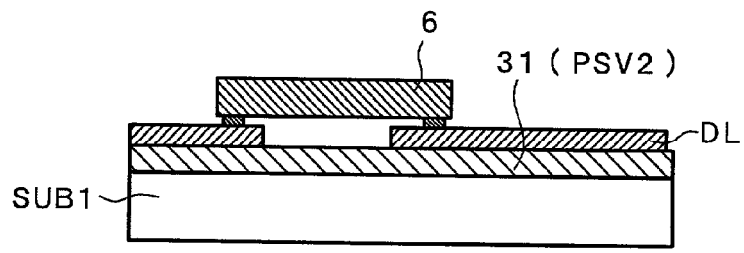

Further, FIG. 10(b) is a constitutional view showing another embodiment and corresponds to FIG. 10b.

In FIG. 10(b), the stress buffer layer 31 is not limited to the region on which the drain drive IC 6 is mounted and is formed such that the stress buffer layer 31 is extended to the periphery of the drain drive IC 6. Further, a wiring layer (drain signal layer DL) which is connected to respective bumps of the drain drive IC 6 is formed on an upper surface of the stress buffer layer 31.

There may be a case that the above-mentioned protective film PSV formed on each pixel region is formed of a sequential laminated body which is comprised of an inorganic material layer made of a SiN film and an organic material layer made of resin. This is because that there is a case that the dielectric constant of the protective film PSV is required to be made small or a case that cracks or the like generated in the inorganic material layer are required to be covered with the organic material layer.

In such a case, by simultaneously forming the stress buffer layer 31 (the stress buffer layer 31 may be formed by extending the stress buffer layer) at the time of forming the organic material layer, the increase of the number of man-hours can be obviated.

Although this embodiment is explained with respect to the drain drive IC 6, the same goes for the gate drive IC 5 and hence, it is needless to say that the similar constitution may be adopted by the region where the gate drive IC 5 is mounted.

(Embodiment 5)

Although the explanation has been made that the transparent substrate SUB1 is made of the glass substrate in the previous embodiments, this embodiment particularly adopts a resin substrate made of resin as the transparent substrate SUB1.

The drain drive IC 6 and the gate drive ICs 5 are mounted on the transparent substrate SUB1. By using resin having the higher elastic property compared to glass as the substrate, any drawbacks derived from the stress generated in each drive IC can be solved.

Figure 11:
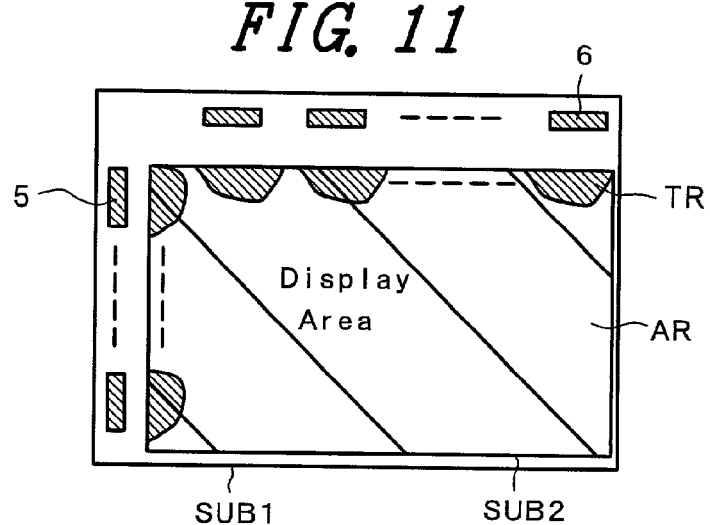
FIG. 11 is an explanatory view showing a phenomenon that portions close to drivers in a display region of a liquid crystal display devices are discolored.

By adopting at least one of the above-mentioned respective embodiments, the driving power of the drive ICs can be reduced and a heat generation quantity derived from the driving of the drive ICs can be reduced. Accordingly, as shown in FIG. 11, in regions TR close to the drive ICs in the display region portion AR, it becomes possible to obviate the influence (discoloring) derived from the generation of heat.

(Embodiment 6)

Figure 12A:
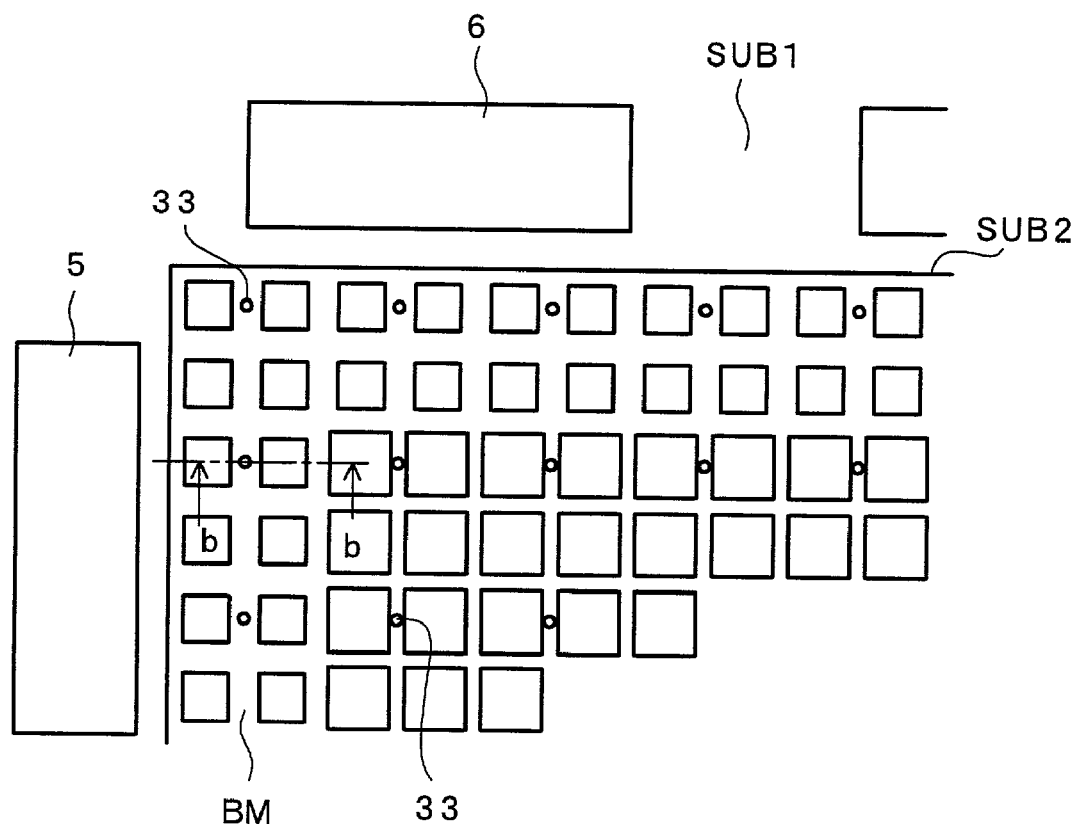
FIG. 12 is a constitutional view showing one embodiment of support columns which are arranged between respective substrates which are arranged to face each other via liquid crystal of a liquid crystal display device.
Figure 12B:
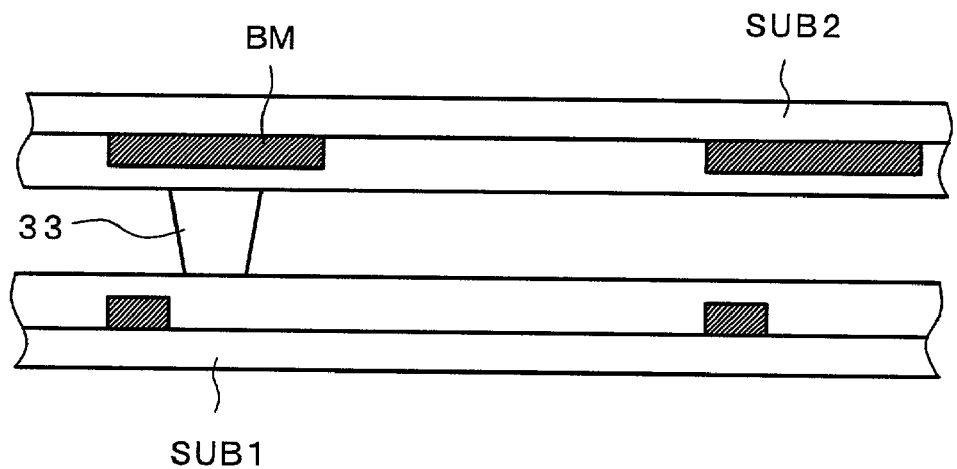

As shown in FIG. 12, out of respective transparent substrates which are arranged to face each other in an opposed manner while sandwiching a liquid crystal therebetween, a light shielding film which is referred to as a black matrix BM is formed on the transparent substrate SUB2. Here, in the drawing, FIG. 12(*a*) is a plan view and FIG. 12(*b*) is a cross-sectional view of FIG. 12(*a*) taken along a line b—b.

As a spacer for ensuring a gap between the transparent substrate SUB1 and the transparent substrate SUB2, for example, support columns 33 which are formed by selectively etching a resin layer formed on the transparent substrate SUB2 side using a photolithography technique are used.

These support columns 33 can be arranged at given positions in the inside of the display portion which is formed as a mass of respective pixel regions. These support columns 33 are formed such that they are superposed on the black matrix BM.

This is because that the disorder of the orientation of the molecules of liquid crystal is liable to occur in the peripheries of the support columns 33 and the disorder can be easily observed with naked eyes (referred to as "domains").

In this embodiment, the black matrix BM has a width thereof increased in the vicinity of the drain drive ICs 6 and the gate drive ICs 5 than a width thereof at other portions.

The reason for providing such a constitution is that the alignment displacement of the transparent substrates SUB1, SUB2 is liable to occur in the vicinity of the respective drive ICs due to the generation of heat of the drive ICs in such locations and the domains are more liable to be visualized due to such alignment displacement.

The light shielding film is not limited to the black matrix BM and it is needless to say that any light shielding films for other purposes can be used as such a light shielding film.

(Embodiment 7)

This embodiment is characterized in that the above-mentioned support columns in the inside of the display portion are arranged at a density of one support column per two to eight unit pixels.

Here, the unit pixel is defined such that 1 unit pixel is formed of a set made of RGB or a set of CMY.

Assume a case in which the above-mentioned support columns are arranged at a density of less than 1 support column per eight unit pixels. In this case, the upper and lower substrates are easily moved due to the stress and the alignment displacement is worsened due to the provision of the support columns. Further, the strength of the support columns cannot withstand the stress so that it gives rise to the non-uniformity of gap between the upper and lower substrates due to the plastic deformation.

Although the above-mentioned respective embodiments describe cases in which the respective embodiments are applied to a liquid crystal display device having a pixel constitution shown in FIG. 13, the respective embodiments are applicable to liquid crystal display devices having pixel constitutions which are explained hereinafter.

(Embodiment 8)

Figure 13A:
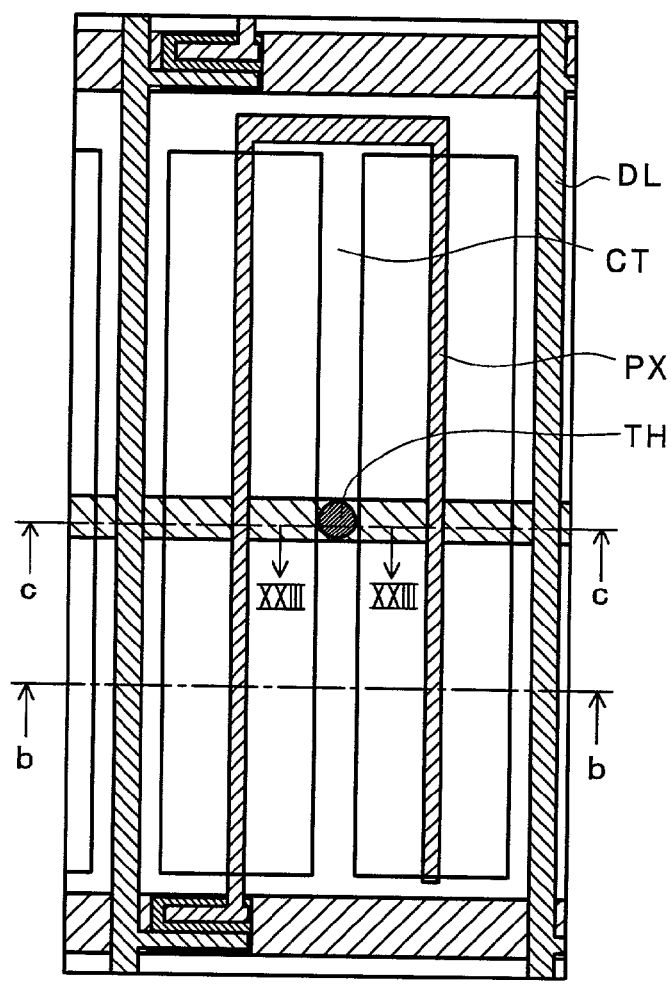
FIG. 13 is a constitutional view showing another embodiment of a pixel of the liquid crystal display device according to the present invention.
Figure 13B:
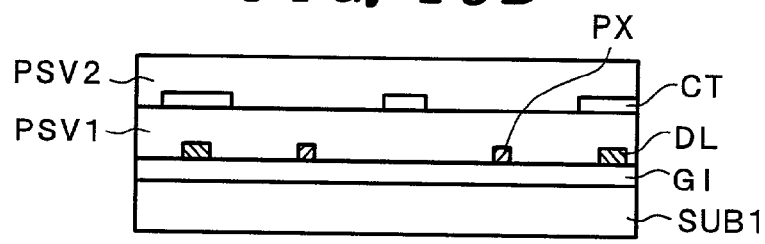
Figure 13C:
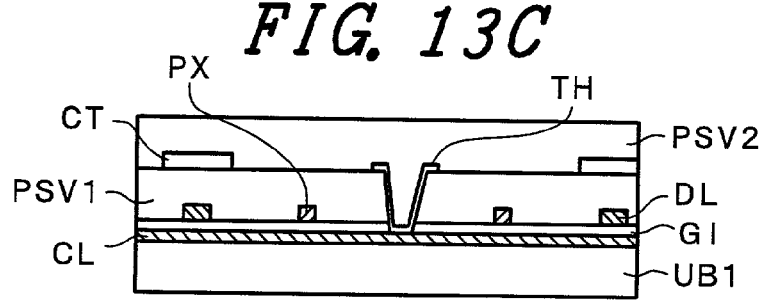

As shown in FIG. 13, in this embodiment, a drain signal line DL and a pixel electrode PX are positioned on the same layer and reference electrodes CT are formed as a layer above the drain signal line DL and the pixel electrode PX via a protective film PSV1. Further, the reference electrode CT is connected with a reference voltage signal line CL which is formed on the same layer as a gate signal line GL via a through hole TH. In the drawing, FIG. 13(*a*) is a plan view, FIG. 13(*b*) is a cross-sectional view of FIG. 13(*a*) taken along a line b—b, and FIG. 13(*c*) is a cross-sectional view of FIG. 13(*a*) taken along a line c—c.

The reference electrodes CT are formed such that the reference electrodes CT are superposed on the drain signal line D1 and hence, it becomes possible to prevent an unexpected behavior (domain) of the liquid crystal due to the an electric field generated between the drain signal line DL and the reference electrodes CT from being visualized or observed from outside.

That is, this embodiment adopts the constitution in which the reference electrodes CT perform the light shielding of the domains which are generated due to the electric field derived from the drain signal line DL.

Further, due to such a constitution, the electric field from the drain signal line DL is terminated to the reference electrode CT side whose potential is fixed so that the influence to the pixel region side can be suppressed.

The reference electrodes CT may be formed of an opaque conductive layer such as a metal layer or may be formed of a transparent conductive layer such as an ITO (Indium-Tin-Oxide) layer.

Here, when the reference electrodes CT are constituted of the transparent conductive layer, to make the reference electrodes CT have the function as a light shielding film which performs the light-shielding of visualization of the domain, it is necessary to adopt the normally white mode.

The normally white mode is formed by selecting material of the liquid crystal which can minimize the light transmittivity of the liquid crystal when the electric field is not generated between the pixel electrode CT and the reference voltage electrode CL.

The material of the transparent conductive layer is not limited to ITO. The transparent conductive layer may be made of $In_2O_3$, $SnO_2$, IZO, $ZnO_2$, a mixture thereof or a laminated body thereof.

Further, in this embodiment, a protective film PSV2 is formed on upper surfaces of the reference electrodes CT and an orientation film (not shown in the drawing) is formed on an upper surface of the protective film PSV2.

Here, organic material such as resin or the like can be used as material of the protective film PSV2. In this case, the surface of the protective film PSV2 can be flattened.

(Embodiment 9)

This embodiment is characterized in that, in the constitution shown in the embodiment 8 (FIG. 13), the protective film PSV1 is formed of a sequential laminated body which is constituted of inorganic material made of SiN and organic material made of resin, for example.

In this case, an advantageous effect that the dielectric constant between the pixel electrode PX and the reference electrode CT can be suppressed to a low value.

(Embodiment 10)

This embodiment is characterized in that, in the constitution of the above-mentioned embodiment 8 (FIG. 13) provided that the reference electrodes CT are particularly constituted of metal layers, a protective film PSV2 is formed on upper surfaces of the reference electrodes CT such that the protective films PSV2 cover the reference electrodes CT and an orientation film is formed on the upper surface of the protective film PSV2.

When the reference electrodes CT are constituted of the metal layers, the metal layers face the liquid crystal in an opposed manner via the extremely thin orientation film so that the metal layers are liable to generate a chemical reaction with the liquid crystal and there arises an unfavorable phenomenon such as an electrolytic corrosion or the like.

Accordingly, by inserting an insulation film between the reference electrodes CT and the orientation film, the protection of the reference electrodes CT is achieved.

The material of the insulation film may be, for example, inorganic material such as SiN, $SiO_2$ or organic material such as resin.

(Embodiment 11)

In this embodiment, as shown in FIG. 13, a reference signal line CL which supplies reference signals to the reference electrodes CT is formed as the same layer as a gate signal line GT and is made of the same material (metal layer) as the gate signal line GT.

The reference signal line CL is arranged substantially in parallel with the gate signal line GL and is positioned substantially at the center between neighboring gate signal lines GL which are arranged close to each other.

Then, the reference electrodes CT are formed on the protective film PSV1 disposed above the surface of the transparent substrate SUB1 on which the reference signal line CL is formed via the insulation film GI and the protective film Psv1.

The connection of the reference signal line CL and the reference electrodes CT is established via a through hole TH which is formed in the protective film PSV1 and the insulation film GI substantially at the center of the pixel region.

The reference electrodes CT are formed of ITO films, for example, and are formed as three electrodes in total which are extended in the y direction and are arranged in parallel in the x direction in the drawing.

In this case, the center reference electrode CT is connected with the reference signal line CL via the through hole TH and the remaining two reference electrodes CT except for the above-mentioned reference electrode CT are respectively formed such that they are superposed on the video signal lines DL. Further, Upper and lower end portions of each reference electrode CT are connected to each other with the use of an ITO film which is superposed on the gate signal line GL.

Accordingly, the ITO film which is formed on the protective film PSV1 is formed such that the protective film PSV1 surrounds the pixel region, in other words, the ITO film is superposed on the drain signal line DL and the gate signal line GL, and has a width larger than the widths of these signal lines.

This ITO film is integrally formed with ITO films of other neighboring pixel regions.

Due to such a constitution, the ITO film can be formed in a grid array in the inside of the display region and hence, an advantageous effect that the resistance value of the ITO film per se can be reduced is obtained.

Further, since the reference signal line CL which supplies the reference signals to this ITO film is formed of a metal layer having a low resistance value, the generation of signal distortion of the reference signals supplied to the reference electrodes CT can be suppressed.

(Embodiment 12)

This embodiment is characterized in that, in the constitution of the above-mentioned embodiment 11, the protective film PSV1 is formed of a sequential laminated body which is constituted of inorganic material made of SiN and organic material made of resin, for example.

(Embodiment 13)

In the embodiments 11 and 12, the reference voltage signal line CL is formed of the metal layer and the reference electrodes CT are formed of light-transmitting conductive layers made of ITO or the like. However, so long as the resistance of the material layer of the reference voltage signal line CL is set smaller than the resistance of the material layer of the reference electrodes CT, the reference voltage signal line CL and the reference electrodes CT are not always limited to these materials. Due to such a constitution, the total resistance of the reference voltage signal line CL and the reference electrodes CT can be reduced and hence, stabilization of the potential of the reference signals supplied to respective reference electrodes CT can be ensured.

(Embodiment 14)

This embodiment is characterized in that, in the constitution of the embodiment 11 (FIG. 13), a normally black mode is adopted.

That is, when an electric field is not applied between the pixel electrode PX and the reference electrodes CT, the liquid crystal is set to exhibit the minimum light transmittivity (black display).

In this case, the ITO film which includes the reference electrode CT as a portion thereof functions as a light shielding film and hence, the light shielding film which can sufficiently cover the gate signal line GL and the drain signal line DL can be formed.

This implies that it becomes possible to obtain an advantageous effect that it is unnecessary to form a light shielding film having the similar function such as a black matrix or the like in a separate step.

In this case, the material which forms the reference electrode as a portion thereof is not limited to ITO and may be $In_2O_3$, $SnO_2$, IZO, $ZnO_2$, a mixed body thereof or a laminated body thereof.

(Embodiment 15)

In respective embodiments 11 to 14, the material layer which forms the reference electrode CT as a portion thereof is formed in a grid array in the inside of the display region and hence, the reference signals can be also supplied to this material layer.

Accordingly, in this embodiment, needless to say that the reference signals are supplied to the reference voltage signal line CL, the reference signals are also supplied to the material layer which forms the reference electrodes CT as a portion thereof. In this case, the pixel region is constituted such that the reference signals are supplied from the direction which intersects the extension direction of the reference signal line CL at a right angle.

That is, among peripheral sides of the material layer which forms the reference electrode CT as a portion thereof, the reference signals are supplied from either one or both of the peripheral sides which are in parallel to the x direction in the drawing.

Figure 14:
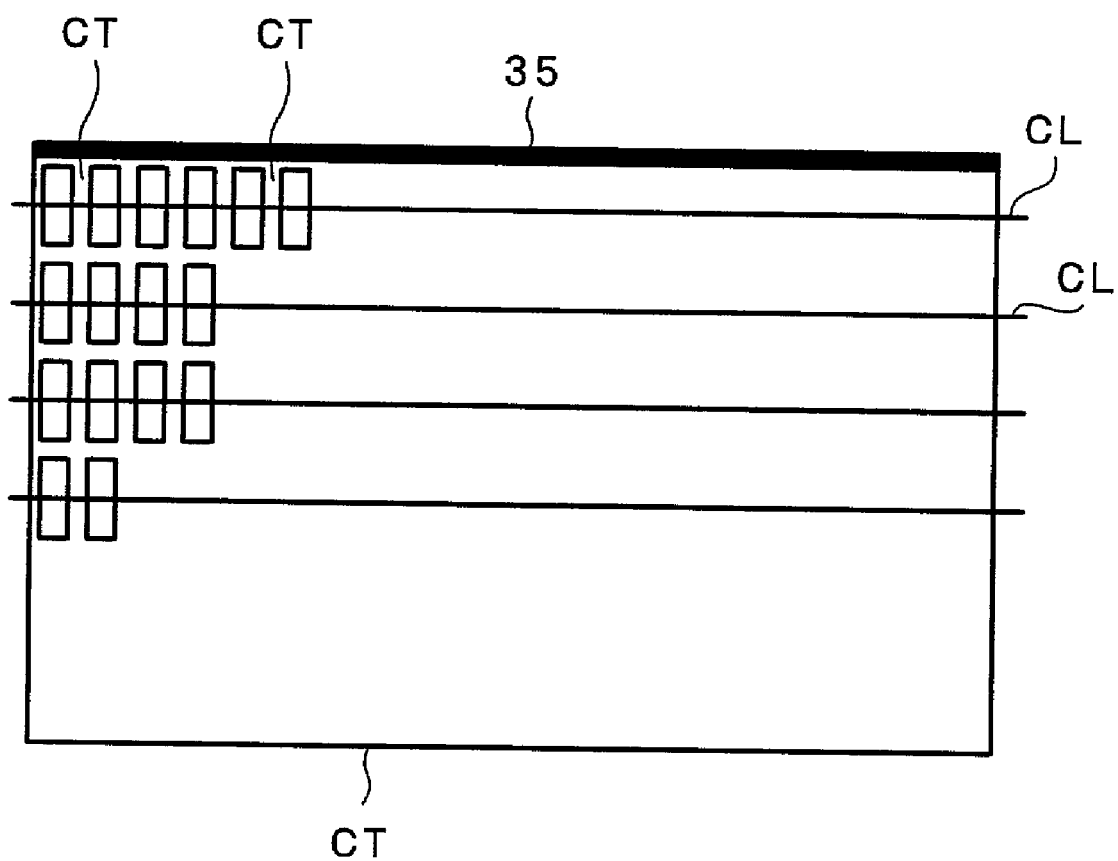
FIG. 14 is a plan view showing one embodiment of a reference electrode which is formed on a liquid crystal display device according to the present invention.

In this case, as shown in FIG. 14, a strip-like metal layer 35 having a low resistance is superposed on one side of the material layer and the reference signals are supplied via this metal layer 35.

Due to such a constitution, the waveform distortion of the reference signals supplied to the reference electrodes CT in each pixel region can be alleviated.

It is needless to say that, in this embodiment, the material layer which includes the above-mentioned reference electrode CT as a portion thereof may be made of material having a high light transmittivity or a metal layer.

(Embodiment 16)

This embodiment is characterized in that, in either constitution of the above-mentioned embodiment 13 or 15, the reference signals are inverted every 1 frame (common inversion driving).

As mentioned previously, since the reference voltage signal line CL has the resistance which is set lower than the resistance of the reference electrodes CT, the waveform distortion of signals at the time of supplying the reference signals to the reference electrodes CT can be reduced.

Further, since this embodiment adopts the common inversion driving and hence, the output of the drain drive IC can be reduced so that a drive IC with an small output can be used as such a drain drive IC.

In this case, when the FCA method is adopted as a method for mounting the drain drive IC, the generation of heat of the drain drive IC becomes small and hence, the use of the reliable drain drive IC is realized.

Further, due to such a constitution, along with the suppression of the signal distortions in the reference voltage signal line DL (Al, Cr, Ta, Mo, W, a mixed body thereof or a laminated body), the signal distortion in the drain signal line DL can be suppressed by using Al, Cr, a mixed body thereof or a laminated body thereof as the material of the drain signal line.

(Embodiment 17)

As shown in FIG. 13, in this embodiment, a through hole TH which is formed in the inside of the pixel region is substantially formed at the center of neighboring respective pixel electrodes PX and the connection of the reference voltage signal line CL and the reference electrode CT is established via this through hole TH.

Due to such a constitution, the probability of the occurrence of the short-circuiting of the through hole TH and the neighboring pixel electrode PX can be decreased.

(Embodiment 18)

As shown in FIG. 13, this embodiment is characterized in that a diameter of the through hole TH is set smaller than the width of the reference voltage signal line CL and is also set smaller than width of the reference electrode CT.

Due to such a constitution, the occurrence of disconnection at the through hole TH portion of the reference electrode CT can be reduced.

(Embodiment 19)

Figure 15:
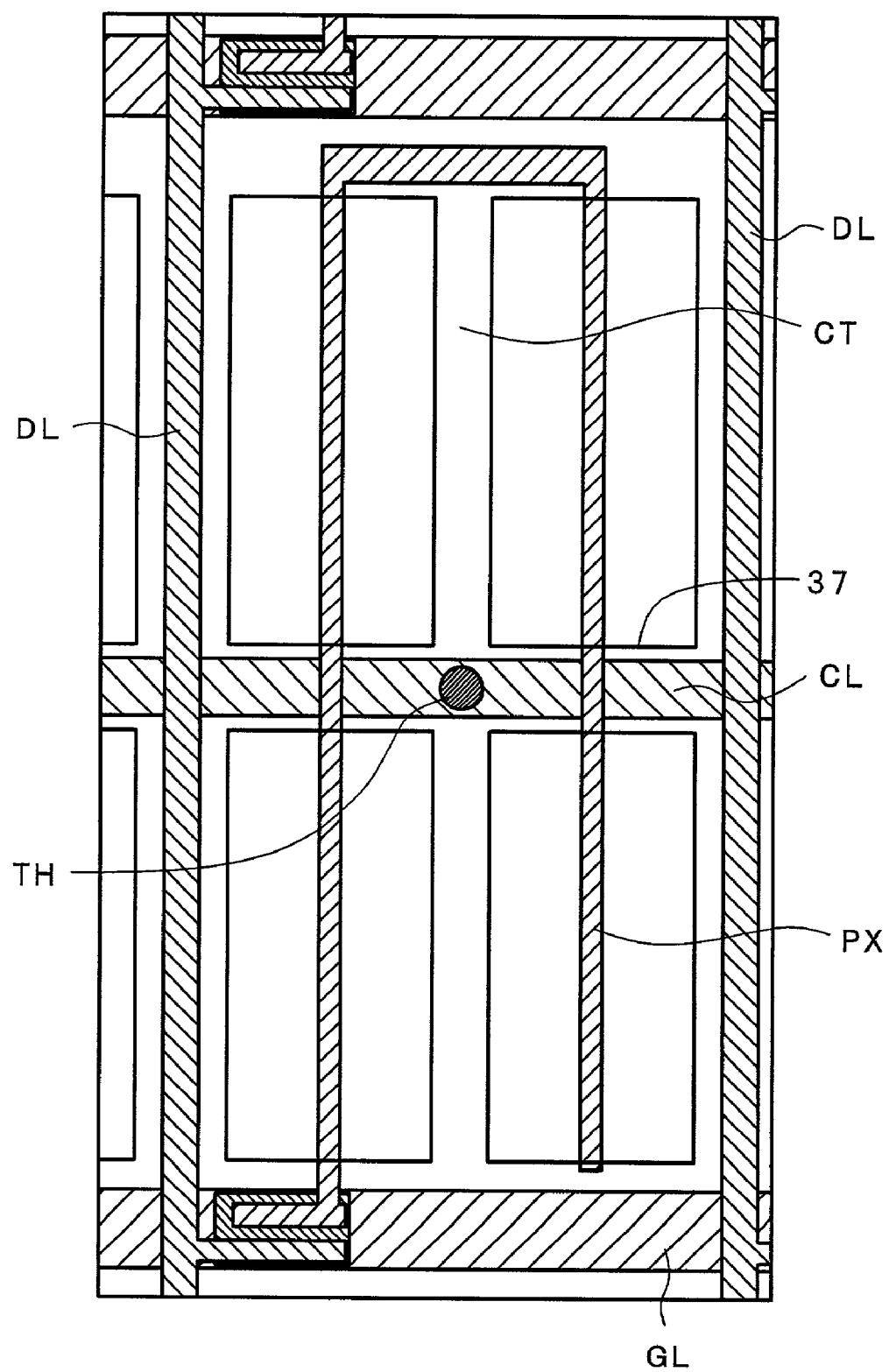
FIG. 15 is a constitutional view showing another embodiment of the pixel of the liquid crystal display device according to the present invention.

In this embodiment, as shown in FIG. 15, a material layer which includes a reference electrode CT as a portion thereof is formed on a protective film PSV1 via a reference voltage signal line CL and a protective film PSV1, and this material layer includes a strip-like portion 37 which is superposed along at least the reference voltage signal line CL and a reference electrode CT which is extended such that the reference electrode CT intersects this strip-like portion 37, and the material layer is connected with the reference voltage signal line CL via a through hole TH at the intersecting portion.

Due to such a constitution, the potential from the reference voltage signal line CL can be transmitted to the reference electrode CT with the low resistance and hence, the distortion of the reference potential can be further suppressed.

(Embodiment 20)

Figure 16:
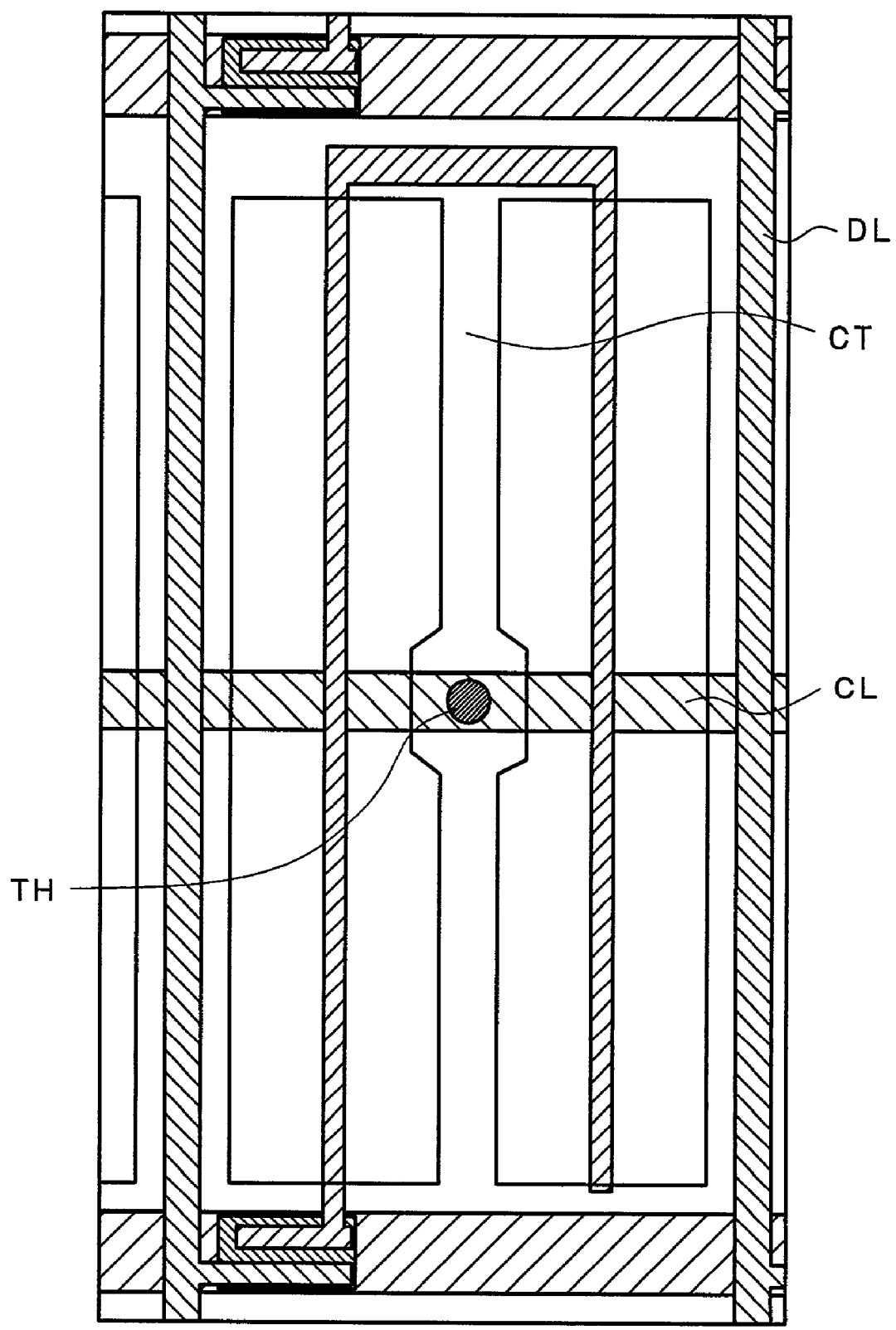
FIG. 16 is a constitutional view showing another embodiment of the pixel of the liquid crystal display device according to the present invention.

In this embodiment, as shown in FIG. 16, a material layer which includes the reference electrode CT as a portion thereof is formed on a protective film PSV1 via a reference voltage signal line CL and a protective film PSV1, and this material layer includes the reference electrode CT which is extended while intersecting at least the reference voltage signal line CL, the material layer has a width at the intersecting portion with the reference voltage signal line CL which is wider than the width at other portions, and the material layer is connected with the reference voltage signal line CL via the through hole TH at the portion where the width is widened.

Due to such a constitution, the disconnection of the reference electrode CT at the through hole TH portion can be obviated.

(Embodiment 21)

Figure 17:
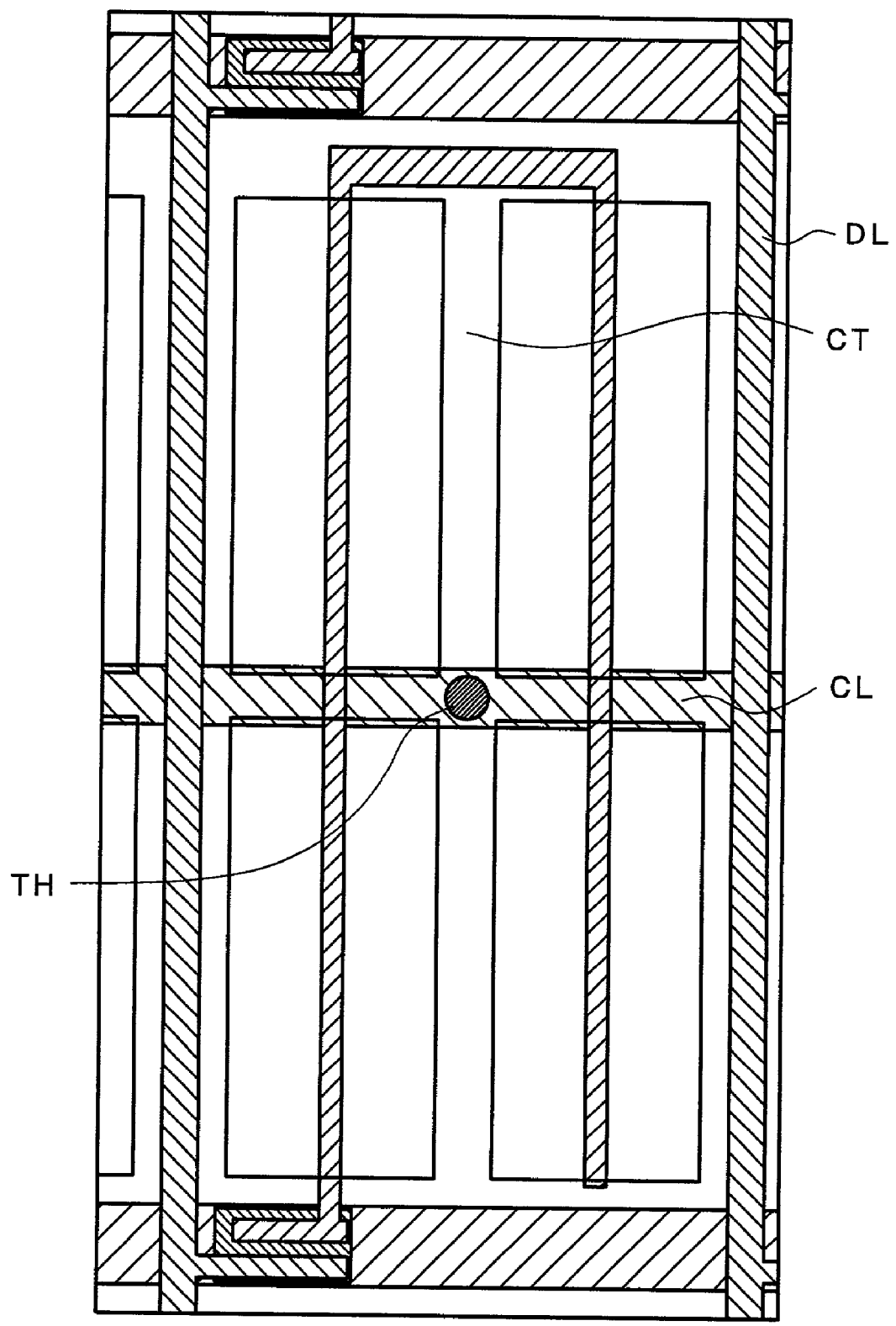
FIG. 17 is a constitutional view showing another embodiment of the pixel of the liquid crystal display device according to the present invention.

As shown in FIG. 17, this embodiment has a constitution similar to the constitution shown in FIG. 15. In this embodiment, first of all, a material layer which includes a reference electrode CT as a portion thereof is constituted of an opaque conductive member made of a metal layer.

Further, the material layer which is formed such that the material layer is superposed along a reference voltage signal line CL has a center axis thereof substantially aligned with a center axis of the reference voltage signal line CL and has a width thereof made smaller than a width of the reference voltage signal line CL.

Due to such a constitution, a light transmitting area in a pixel region can be increased so that the enhancement of the numerical aperture can be achieved.

(Embodiment 22)

Figure 18:
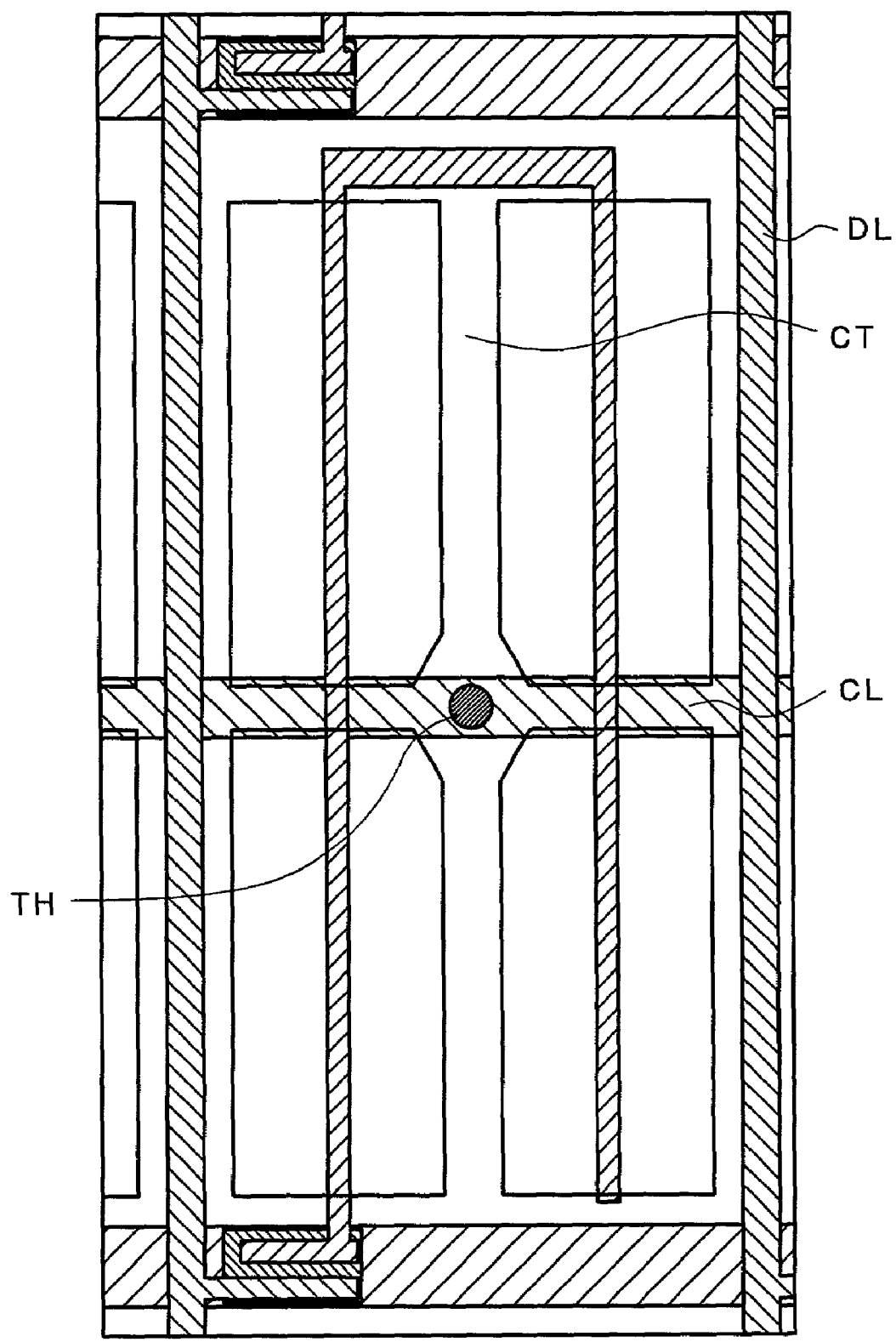
FIG. 18 is a constitutional view showing another embodiment of the pixel of the liquid crystal display device according to the present invention.

In this embodiment, as shown in FIG. 18, a material layer which includes a reference electrode CT as a portion thereof is formed on a protective film PSV1 via a reference voltage signal line CL and a protective film PSV1, and this material layer includes a strip-like portion which is superposed along at least the reference voltage signal line CL and a reference electrode CT which is extended such that the reference electrode CT intersects this strip-like portion, and the material layer is connected with the reference voltage signal line CL via a through hole TH at the intersecting portion. Further, in the vicinity of the through hole TH, the reference electrode CT is formed such that the width thereof is gradually widened as the reference electrode CT approaches the through hole TH.

In this case, the reference electrode CT is formed of an opaque metal layer and the width of the above-mentioned strip-like portion which is superposed along the reference voltage signal line CL is made smaller than the width of the reference voltage signal line CL.

(Embodiment 23)

Figure 19:
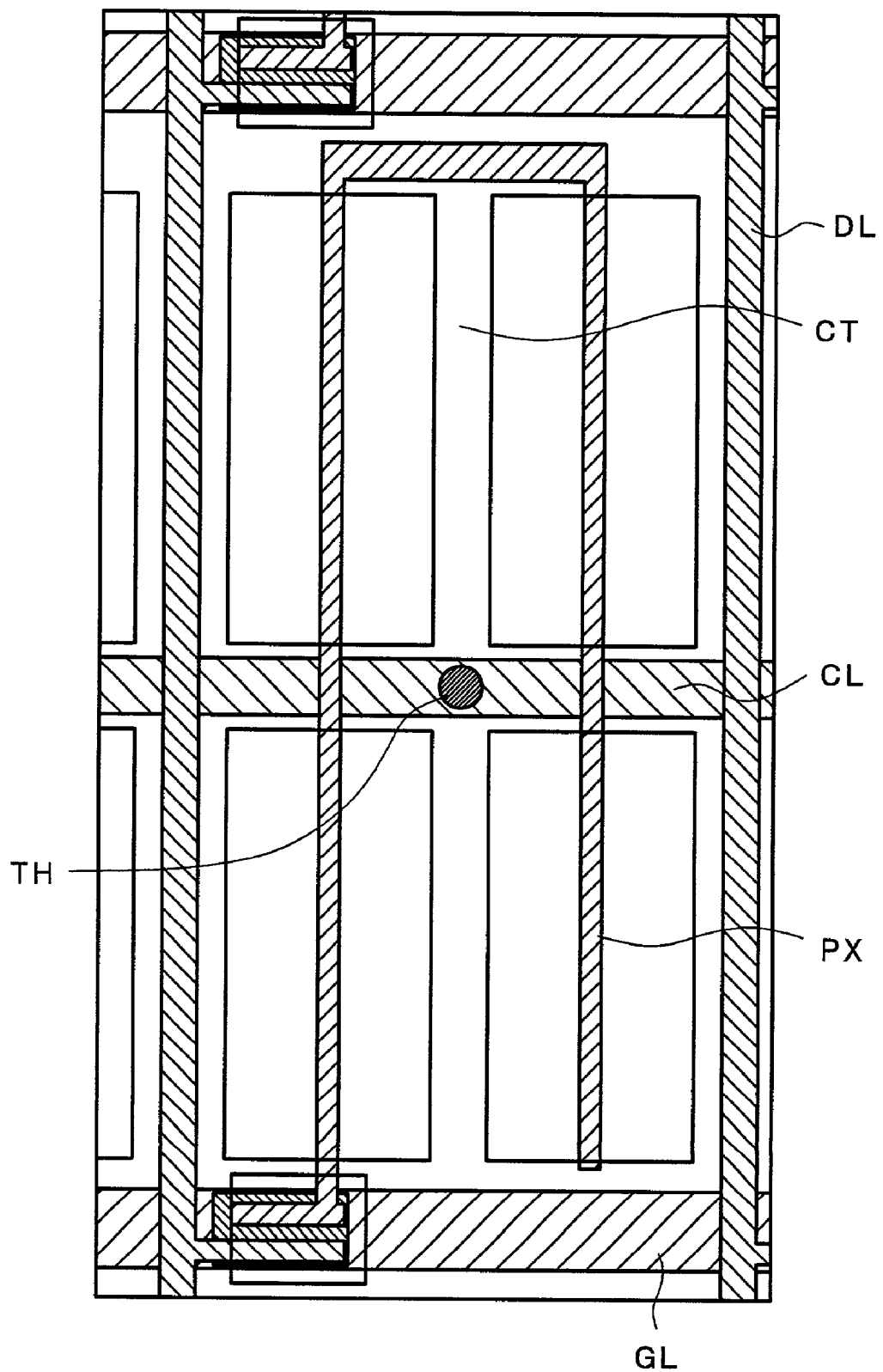
FIG. 19 is a constitutional view showing another embodiment of the pixel of the liquid crystal display device according to the present invention.

As shown in FIG. 19, this embodiment is characterized in that, in the constitution of the embodiment 11 (FIG. 15), for example, the material layer which includes the reference electrode which is formed while covering the gate signal line GL as a portion thereof is provided with an aperture (a region where the material layer is not formed) at a portion which faces a thin film transistor TFT in an opposed manner.

When a potential is applied to an upper portion of the thin film transistor TFT, a threshold value of the thin film transistor TFT is fluctuated (back channel). This drawback can be obviated with the provision of the above-mentioned aperture.

(Embodiment 24)

Figure 20:
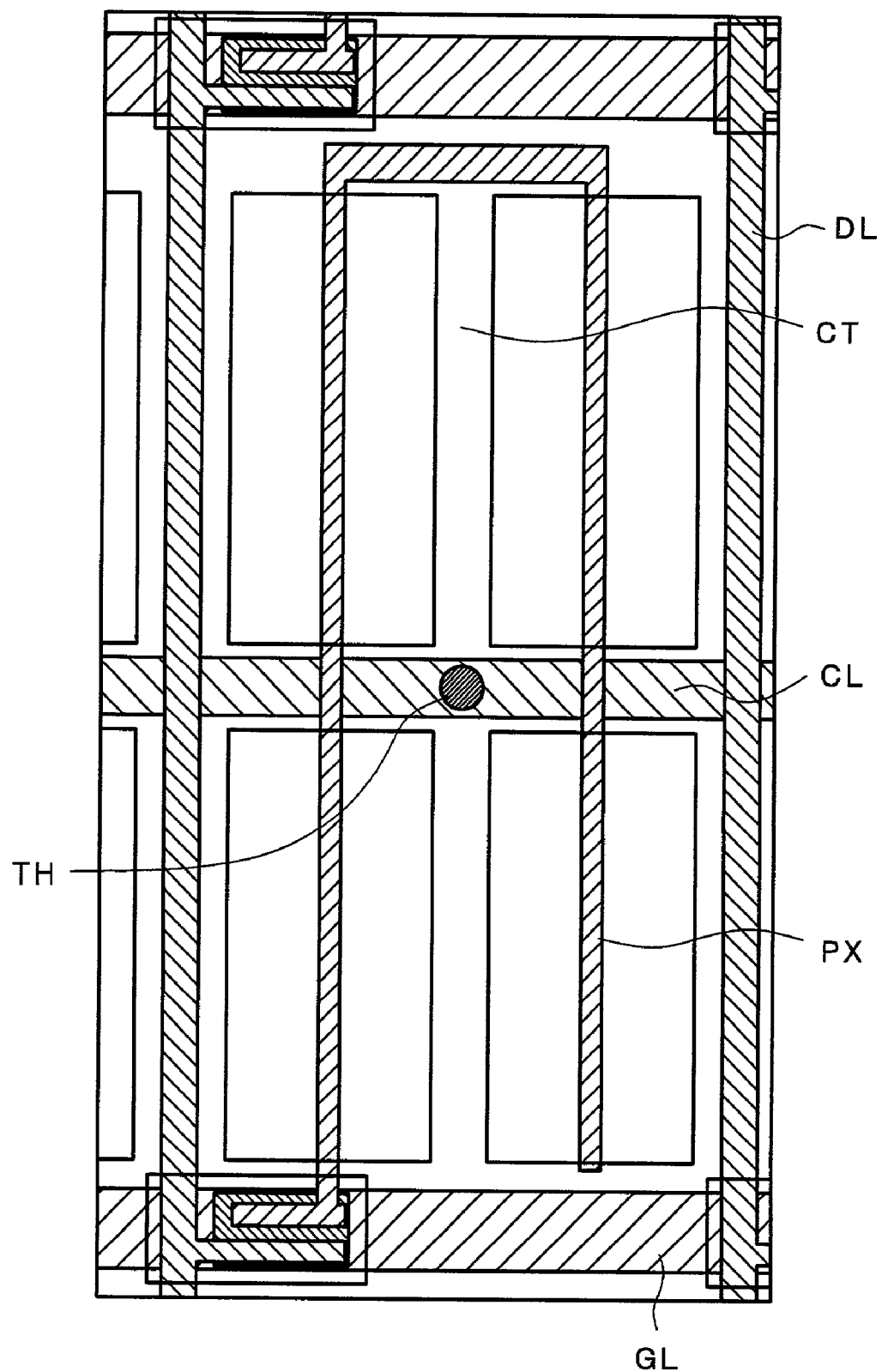
FIG. 20 is a constitutional view showing another embodiment of the pixel of the liquid crystal display device according to the present invention.

As shown in FIG. 20, this embodiment is characterized in that, in the constitution of the embodiment 11, for example, an aperture of the material layer which is formed at a portion which faces a thin film transistor TFT in an opposed manner is enlarged such that the aperture is extended toward the drain signal line DL side along the gate signal line GL and a portion of the drain signal line DL is made to face the aperture in an opposed manner.

Due to such a constitution, the influence of a jump voltage from the potential of the reference electrode CT to a back channel of the thin film transistor TFT can be obviated.

(Embodiment 25)

Figure 21:
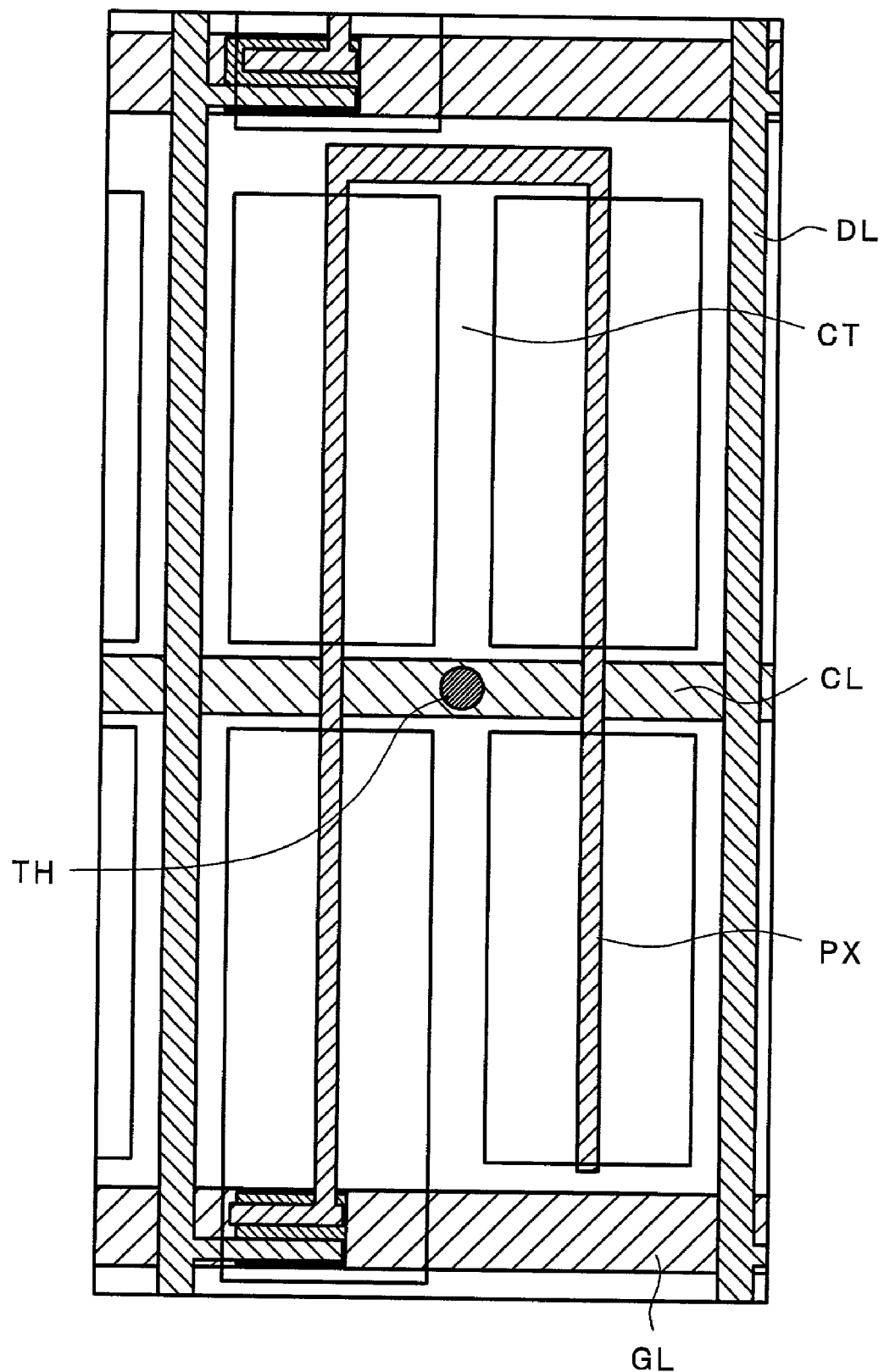
FIG. 21 is a constitutional view showing another embodiment of the pixel of the liquid crystal display device according to the present invention.

In this embodiment, as shown in FIG. 21, an aperture of a material layer which is formed between a reference electrode CT which is superposed on a drain signal line DL and other neighboring reference electrode CT is expanded to a region where a thin film transistor TFT is formed and hence, the material layer is prevented from being superposed on the thin film transistor.

With such a provision, the influence of a jump voltage from the reference electrode CT to a back channel of the thin film transistor TFT can be obviated.

Further, since the fine or minute processing of the material layer is not necessary (compared with the embodiment 11, for example), the yield can be enhanced.

(Embodiment 26)

Figure 22:
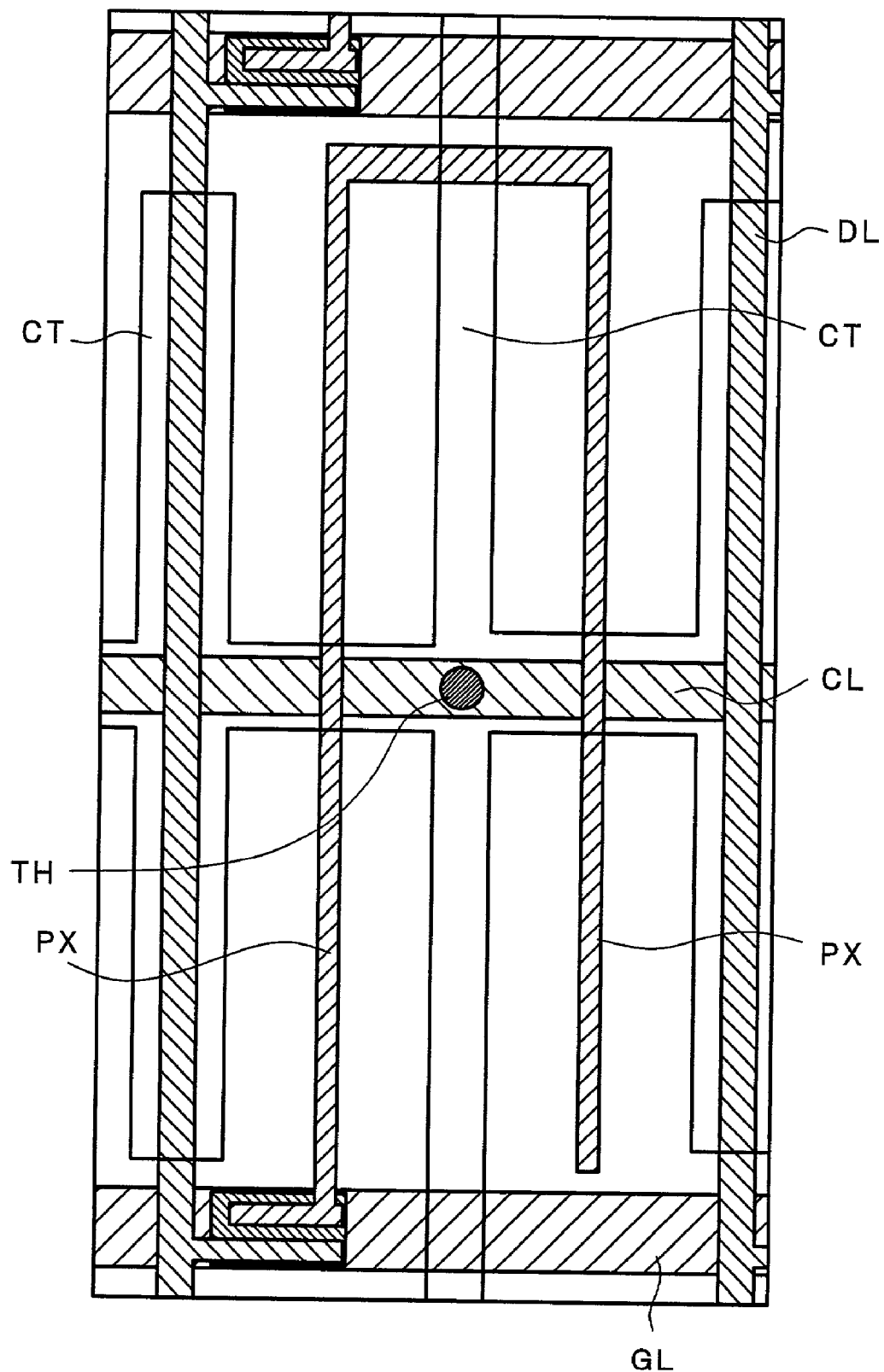
FIG. 22 is a constitutional view showing another embodiment of the pixel of the liquid crystal display device according to the present invention.

As shown in FIG. 22, this embodiment is characterized in that, in the constitution of the embodiment 25 (FIG. 21), the aperture of the material layer which is formed between the reference electrode CT which is superposed on the drain signal line DL and other neighboring reference electrode CT is extended over the region where the thin film transistor TFT is formed and reaches other neighboring pixel region with the gate signal line GL disposed therebetween.

Also in this case, since the fine or minute processing of the material layer is not necessary (compared with the embodiment 24, for example), the yield can be enhanced.

With respect to the constitutions of the embodiment 23 to the embodiment 26, the reference electrodes CT and the reference voltage signal line CL are formed as different layers. However, it is needless to say that the present invention is not limited to these constitutions and is applicable to a case in which the reference electrodes and the reference signal line are formed as the same layer integrally.

(Embodiment 27)

Figure 23:
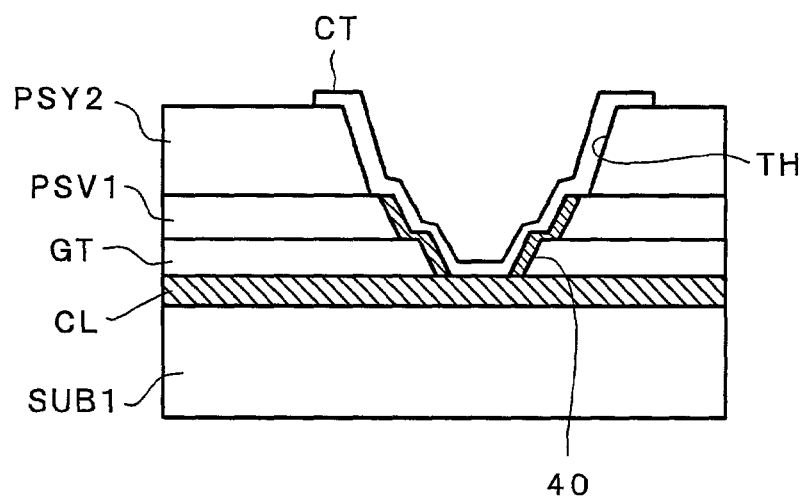
FIG. 23 is a cross-sectional view showing one embodiment of a through hole formed in the inside of the pixel of the liquid crystal display device according to the present invention.

FIG. 23 is, for example, a cross-sectional view of FIG. 13 taken along a line XXIII—XXIII and shows a cross-section of a through hole TH for performing the connection between the reference voltage signal line CL and the reference electrode CT.

First of all, the reference voltage signal line CL is formed on a surface of a transparent substrate SUB1 and then, an insulation film GI made of a SiN film is formed on the substrate SUB1 such that the insulation film GI also covers the reference voltage signal line CL. This insulation film GI functions as a gate insulation film of a thin film transistor TFT. Further, protective films PSV1, PSV2 are formed on an upper surface of the insulation film GI and these protective films PSV1, PSV2 constitutes a sequential laminated body consisting of inorganic material made of a SiN film and organic material made of a resin film.

Then, a through hole TH which reaches the protective films PSV1, PSV2 and the insulation film GI and exposes a portion of the reference voltage signal line CL is formed. A SiO$_2$ film 40 is formed on the SiN film which constitutes the insulation film GI in the inside of the through hole TH and on the side wall of the SiN film which constitutes the protective film PSV1.

Due to such a constitution, a slanted surface on the side wall of the through hole TH can be formed of smooth surface so that a broken step due to steps of the reference electrode CT can be obviated.

Figure 26:
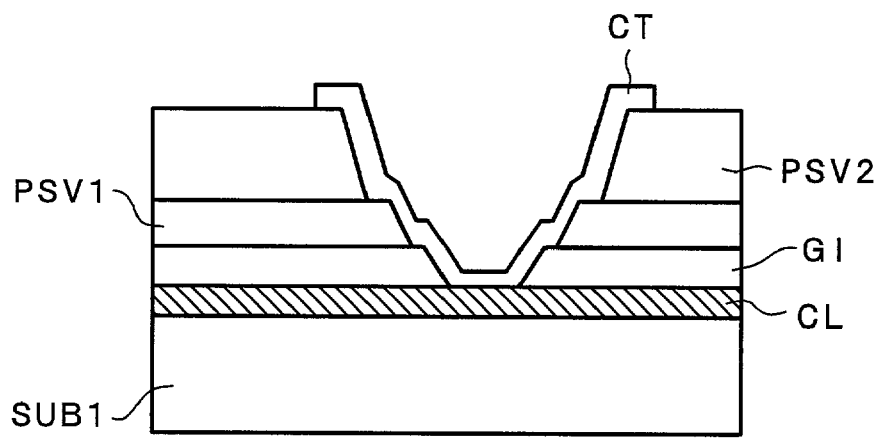
FIG. 26 is a cross-sectional view showing another embodiment of a through hole formed in the inside of the pixel of the liquid crystal display device according to the present invention.

For a comparison purpose, there is provided FIG. 26 which is a cross-sectional view showing the state in which the above-mentioned SiO$_2$ film is not formed. As shown in the drawing, between the SiN film which constitutes the insulation film GI and the SiN film which constitutes the protective film PSV1 and between the SiN film which constitutes the protective film PSV1 and the resin film which constitutes the protective film PSV2, steps are formed.

Since the SiN film which constitutes the insulation film GI is made to have a function as the gate insulation film of the thin film transistor TFT, the density thereof becomes dense, while since the SiN film which constitutes the protective film PSV1 assigns priority to the enhancement of the throughput, the density thereof becomes coarser than the density of the insulation film GI.

In this manner, since respective materials of the laminated body exhibit different etching rates, it gives rise to steps shown in FIG. 26.

As a method for forming the above-mentioned SiO$_2$ film 40, a method which performs ashing processing by introducing O$_2$ gas at the time of etching the SiN film, for example, may be adopted.

Further, as another method, a method which etches a resin layer by dry etching and performs such etching using gas containing O$_2$ may be adopted.

(Embodiment 28)

Figure 24:
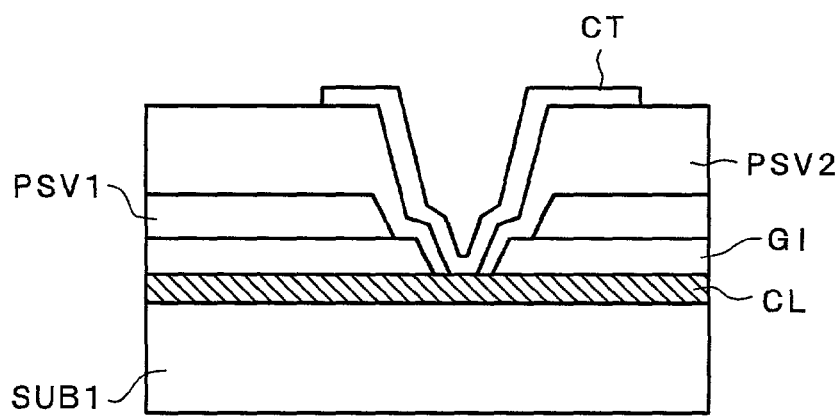
FIG. 24 is a cross-sectional view showing another embodiment of a through hole formed in the inside of the pixel of the liquid crystal display device according to the present invention.

This embodiment constitutes another embodiment of the constitution of the above-mentioned through hole TH and FIG. 24 is a view showing a cross section of the through hole TH.

Here, a resin film which constitutes a protective film PSV2 is formed such that the protective film PSV2 covers a side wall of a SiN film (protective film PSV1) formed as a layer below the protective film PSV2 and a side wall of a SiN film (insulation film GI) formed as a layer below the protective film PSV1 respectively.

Due to such a constitution, a step which is formed between the SiN film (insulation film GI) and the SiN film (protective film PSV1) can be covered with the resin film and the resin film is formed on the entire region of the side wall of the through hole TH and hence, the slanted surface can be formed of a smooth surface.

Accordingly, a broken step due to steps of the reference electrode CT which is connected to the reference voltage signal line CL via this through hole TH can be obviated.

As a method for forming the through hole TH, a following method is adopted. First of all, a through hole TH is formed in the SiN film constituting the insulation film GI and in the SiN film constituting the protective film PSV1 both of which are formed on the transparent substrate SUB1. A resin film constituting the protective film PSV2 is formed on the substrate such that the resin film also covers the through hole TH. A through hole TH having a diameter smaller than that of the previous through hole TH is formed in the resin film concentrically with the previous through hole TH.

In this case, it is needless to say that a resin film made of photolytic material or a resin film made of photo-hardening material can be used as such a resin film.

(Embodiment 29)

Figure 25:
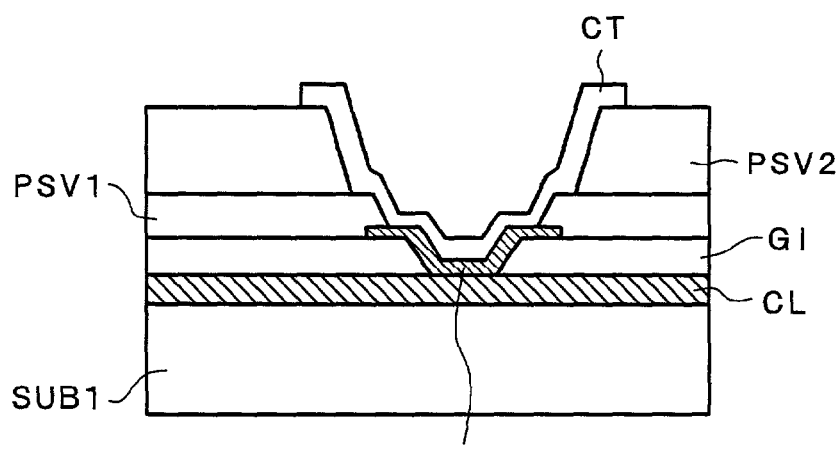
FIG. 25 is a cross-sectional view showing another embodiment of a through hole formed in the inside of the pixel of the liquid crystal display device according to the present invention.

As shown in FIG. 25, in view of the fact that an insulation film which forms a through hole TH has a multi-layered structure, this embodiment interposes other conductive layer 42 for connecting a reference voltage signal line CL and a reference electrode CT.

That is, in a sequential laminated body which is constituted of an insulation film GI, a protective film PSV1 made of inorganic material and a protective film PSV2 made of organic material, the conductive layer 42 which is connected with a reference voltage signal line CL via a through hole TH which is formed in the insulation film GI is formed. Further, there is provided a reference electrode CT which is connected with the conductive layer 42 via the through hole TH formed in a protective film PSV which is formed of the sequential laminated body constituted of inorganic material and organic material.

Since the through hole TH has a shape which gradually narrows a diameter thereof toward a bottom portion of the through hole TH, by performing the connection of the reference voltage signal line CL and the reference electrode CT via the conductive layer 42 which has a larger exposure area through the through hole TH than that of the reference voltage signal line CL, the disconnection occurrence rate can be decreased and the contact resistance can be reduced.

When the reference electrode CT which is made of material exhibiting an unfavorable connection property with the reference voltage signal line CL, this drawback can be obviated by selecting the material of the conductive layer 42.

For example, a case in which the reference voltage signal line CL is made of Al-based material and the reference electrode CT is made of a light-transmitting conductive film such as ITO or the like is considered. In this case, by using Cr-based material as the conductive layer 42, the connection between the reference voltage signal line CL and the reference electrode CT is improved.

Further, by forming the conductive layer 42 simultaneous with the formation of the drain signal line DL, for example, the increase of the number of manufacturing man-hours can be obviated.

Although this embodiment discloses the connection between the reference voltage signal line CL and the reference electrode CT, the present invention is not limited to such a connection and includes a case in which respective conductive layers are connected to each other via a through hole.

(Embodiment 30)

Figures 27A, 27B:
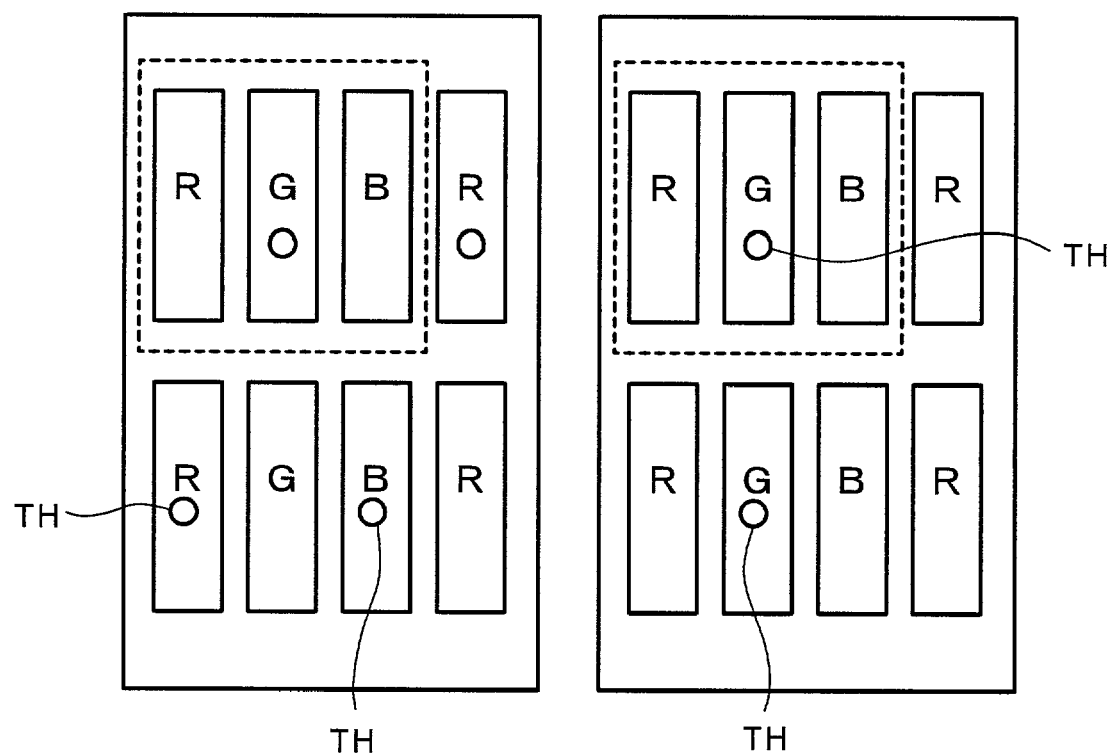
FIG. 27 is a cross-sectional view showing one embodiment of the arrangement of a through hole formed in the inside of the pixel of the liquid crystal display device according to the present invention.

FIG. 27(a) and FIG. 27(b) are plan views of respective embodiments of the arrangement state when through holes formed in respective pixel regions are observed in view of the whole display regions.

In each drawing, respective pixel regions which are in charge of three primary colors R, G, B in color display respectively are formed as neighboring regions. In the explanation made hereinafter, there exists a case that these respective pixels are expressed as a unit pixel in color display.

In FIG. 27(a), the through holes TH are formed in every one other pixel region, for example. Accordingly, there exist a case in which one through hole is formed in each unit pixel and a case in which two through holes are formed in each unit pixel.

In such cases, an advantageous effect that the numerical aperture is enhanced by an amount corresponding to the decrease of the number of the through holes which can decreased.

With such a constitution, the pixel region is constituted, for example, as shown in FIG. 13. That is, the reference electrodes CT are arranged in a grid array on the display surface and the reference signals can be supplied to the reference electrodes CT via the reference voltage signal line CL.

In FIG. 27(b), one through hole TH is formed per unit pixel and the through hole is formed in the inside of the pixel region which is in charge of the color of G (green).

The pixel region which is in charge of the color of G (green) exhibits the higher light transmittivity than the pixel regions which are in charge of other colors. Accordingly, by forming the through hole TH in this region, the lowering of the numerical aperture caused by the formation of the through holes TH can be suppressed as much as possible.

(Embodiment 31)

Figure 28:
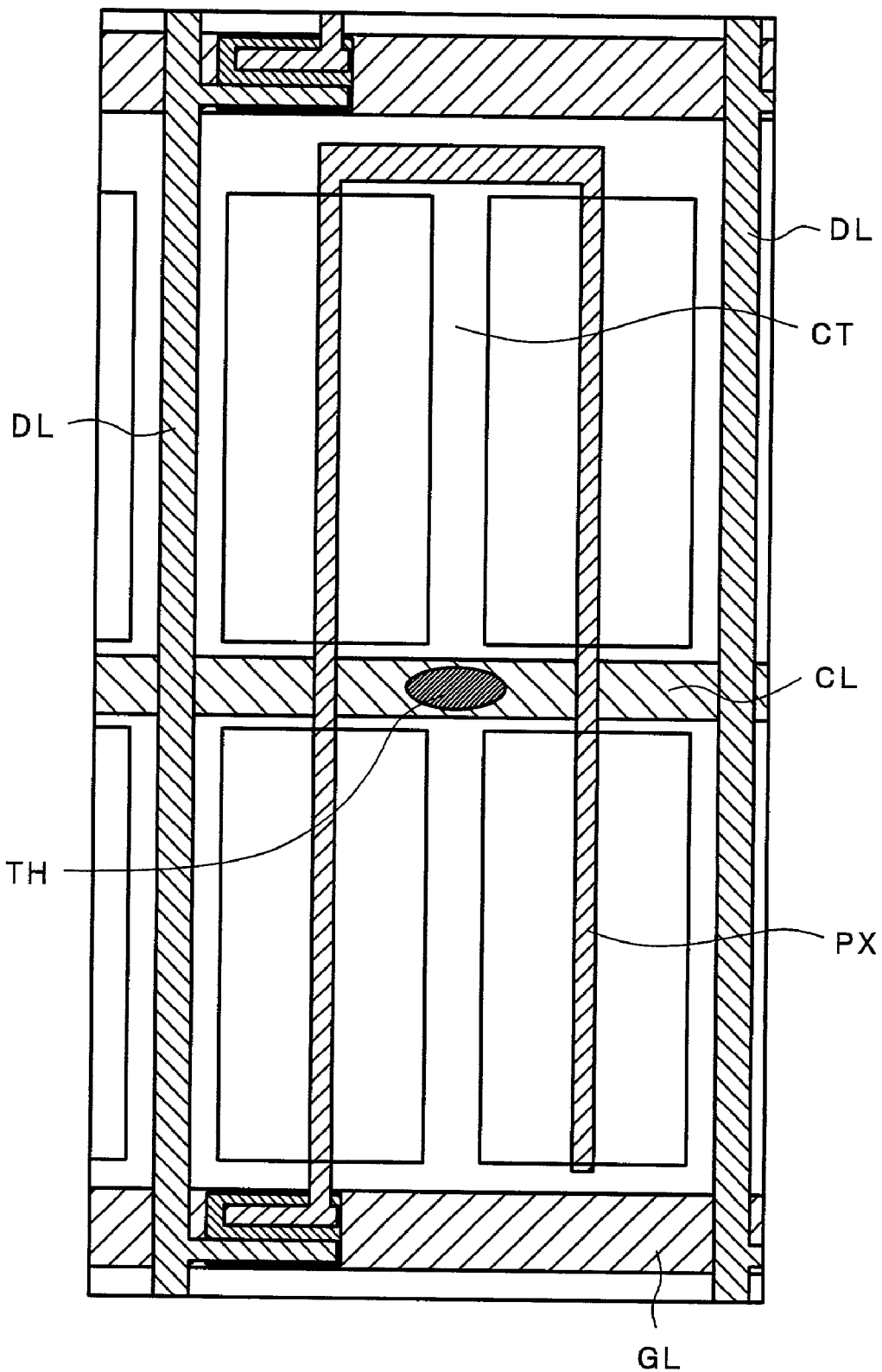
FIG. 28 is a cross-sectional view showing another embodiment of a through hole formed in the inside of the pixel of the liquid crystal display device according to the present invention.

This embodiment is, as shown in FIG. 28, characterized in that, in forming a through hole TH which is served for connecting a reference voltage signal line CL and a reference electrode CT, the shape of the through hole TH is formed such that the shape is expanded in the extension direction of the reference voltage signal line CL.

That is, the connection of the reference voltage signal line CL and the reference electrode CT above an insulation film (insulation film GI, protective films PSV1, PSV2) via the insulation film is performed via the through hole TH which is formed in the insulation film on a region within a width of the reference voltage signal line CL and is expanded in the extension direction of the reference voltage signal line CL.

Due to such a constitution, the contact area of the reference electrode CT with the reference voltage signal line CL can be increased so that an advantageous effect that the connection resistance can be largely reduced is obtained.

(Embodiment 32)

This embodiment is characterized by the provision of a capacitive element Cstg which is formed between a reference voltage signal line CL and a pixel electrode PX.

Figure 29:
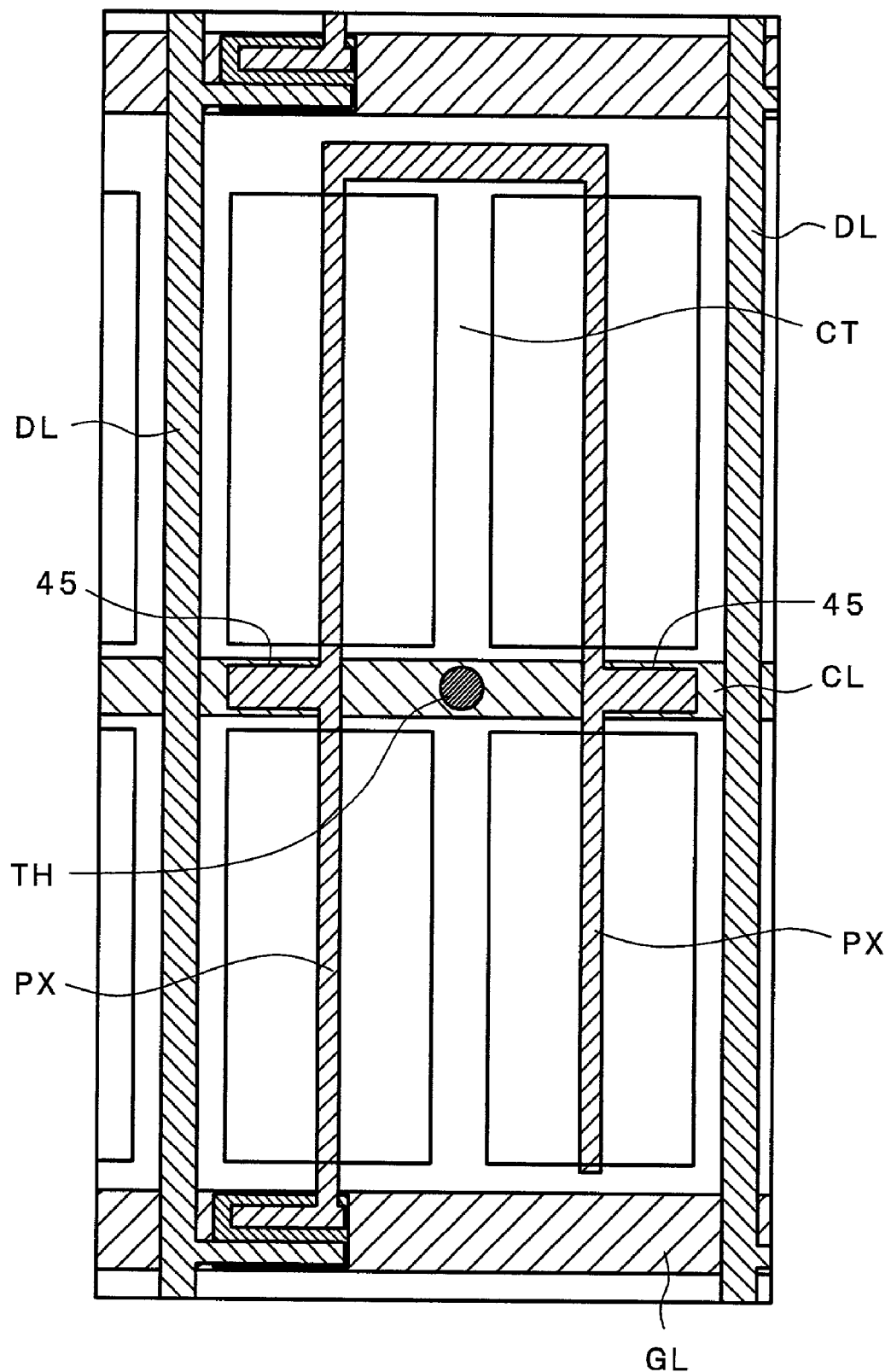
FIG. 29 is a constitutional view showing another embodiment of the pixel of the liquid crystal display device according to the present invention.

That is, as shown in FIG. 29, a reference electrode CT is formed such that the reference electrode CT is extended in the direction which intersects the reference voltage signal line CL via an insulation film and is connected with the reference voltage signal line CL via a through hole TH formed in the insulation film.

Pixel electrodes PX are positioned at both sides of the reference electrode CT. These pixel electrodes PX have extension portions 45 on the reference voltage signal line CL which are extended in the direction away from the through hole TH.

Due to the provision of these extension portions 45, capacitive elements Cstg having a capacity of not less than a given value are formed between the pixel electrode PX and the reference voltage signal line CL. Further, since the extension portions 45 are formed such that they are extended away from the through hole TH, an advantageous effect that the occurrence of short-circuiting between the pixel electrode PX and the reference voltage signal line CL can be obviated is obtained.

(Embodiment 33)

Figure 30:
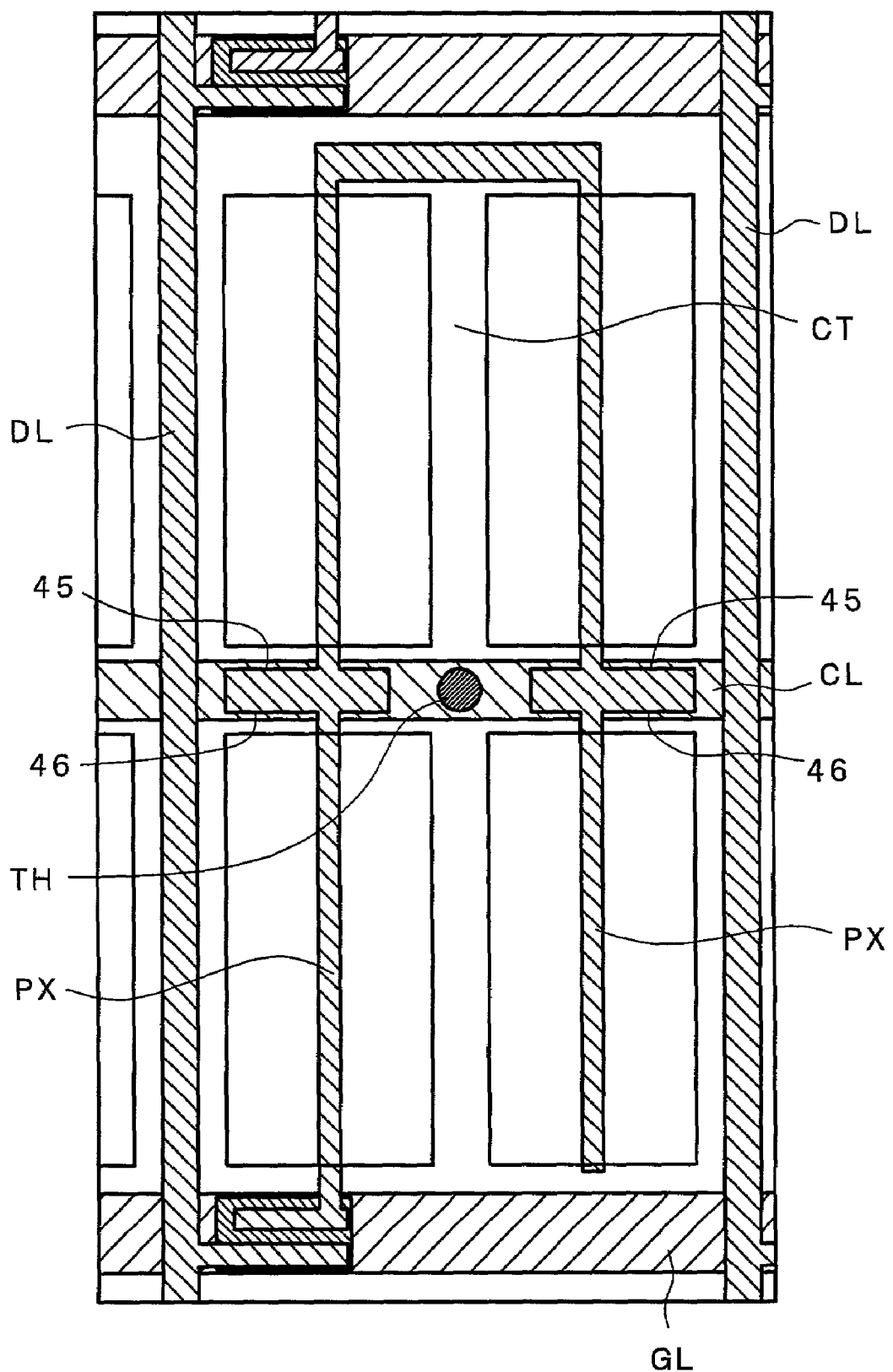
FIG. 30 is a constitutional view showing another embodiment of the pixel of the liquid crystal display device according to the present invention.

This embodiment is an improvement of the embodiment 32. As shown in FIG. 30, the pixel electrodes PX are positioned at both sides of the reference electrode CT which is connected with the reference voltage signal line CL via the through hole TH. Besides the extension portions 45, these pixel electrodes PX also include extension portions 46 on the reference voltage signal line CL which are extended in the direction toward the through hole TH and the length of the extension portions 46 is set shorter than the length of the extension portions 45 which are extended in the direction away from the through hole TH.

Due to such a constitution, advantageous effects that the interference between the extension portions 46 and the through hole TH can be obviated and the capacity of the capacitive elements Cstg can be increased are obtained.

(Embodiment 34)

Figure 31A:
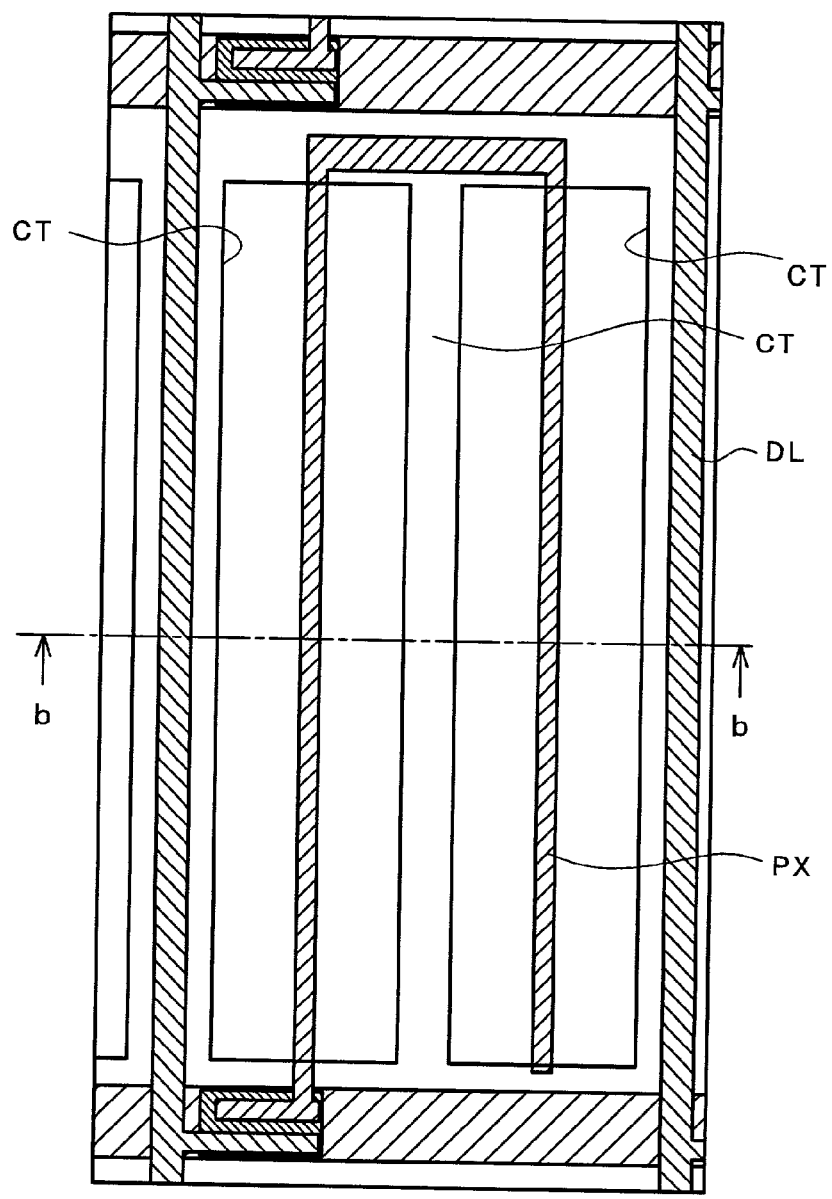
FIG. 31 is a constitutional view showing another embodiment of the pixel of the liquid crystal display device according to the present invention.

This embodiment is characterized in that, as shown in FIG. 31, the above-mentioned reference voltage signal line CL is not formed so that the numerical aperture is enhanced.

As shown in FIG. 31, the reference electrodes CT are positioned as layers disposed above a gate signal line GL, a thin film transistor TFT, a drain signal line DL and a pixel electrode PX. Further, the reference electrodes CT are formed as portions of a conductive layer which is formed such that they are superposed on the gate signal line GL and the drain signal line DL. The supply of reference signals to the reference electrodes CT is performed via the conductive layer.

That is, the conductive layer is integrally formed with other conductive layer corresponding to other neighboring pixel region and hence, the conductive layer is formed such that it is extended to the periphery of a display region. Due to such a constitution, it becomes easy to supply the reference signals from the periphery of the conductive layer.

In this case, by performing the power supply via the metal layer 35 as shown in FIG. 14, for example, the reference signals can be uniformly supplied to the conductive layer.

In this embodiment, it is needless to say that the reference electrodes are not limited to the conductive layer having a light transmittivity such as an ITO film or the like and may be an opaque conductive layer such as a metal layer.

(Embodiment 35)

This embodiment is characterized by a constitution which ensures a capacitive element Cadd between a pixel electrode PX and reference electrodes CT in the state that the above-mentioned reference voltage signal line CL is not formed.

Figure 32:
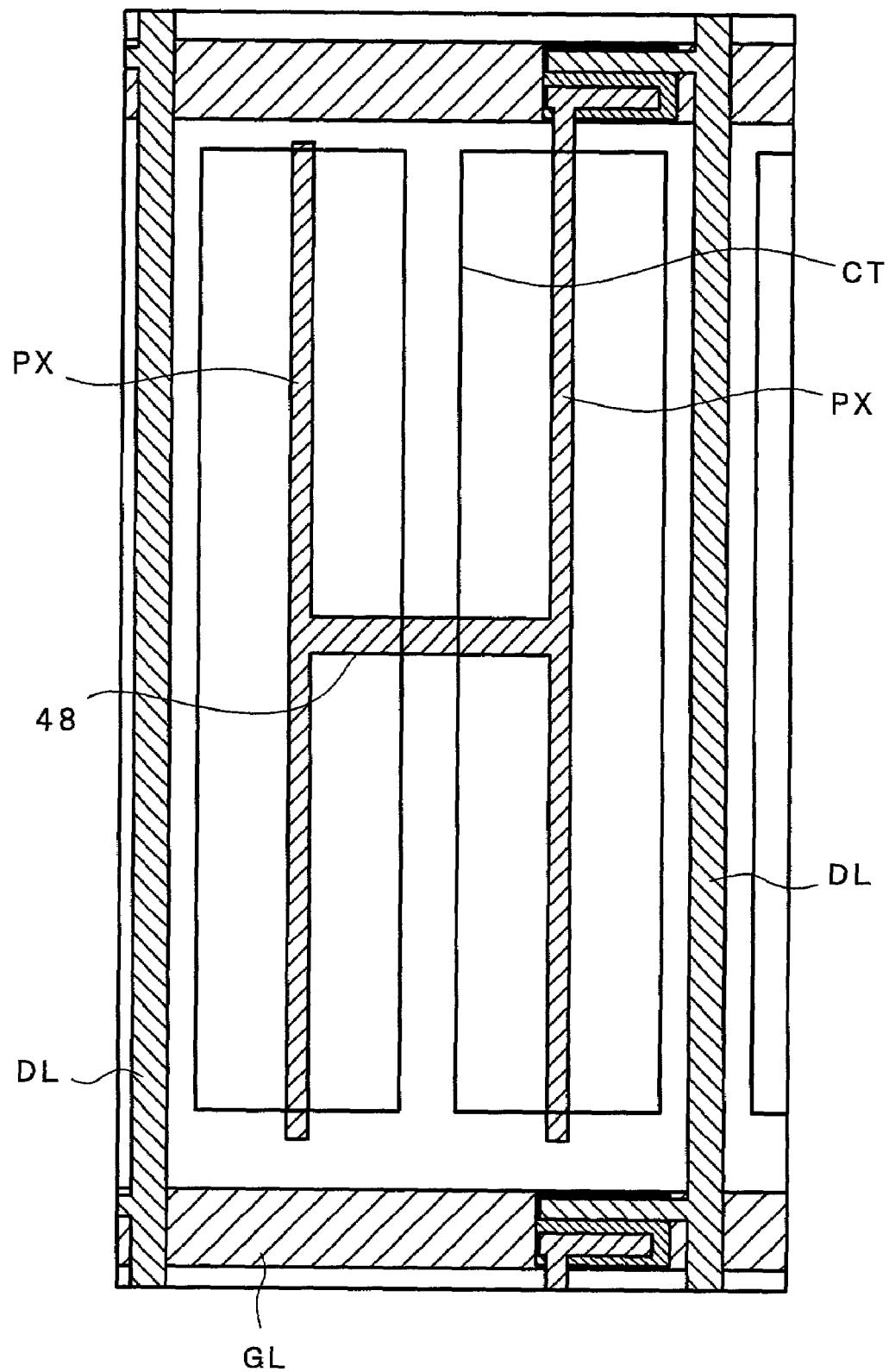
FIG. 32 is a constitutional view showing another embodiment of the pixel of the liquid crystal display device according to the present invention.

That is, as shown in FIG. 32, a connecting portion 48 for pixel electrodes PX disposed at both sides of a reference electrode CT is provided and this connecting portion 48 is arranged to intersect the reference electrode CT, and the capacitive element Cadd is formed at an intersecting portion.

This reference electrode CT is integrally formed with a material layer which covers a gate signal line GL and each reference electrode CT has both ends thereof superposed on the material layer and capacitive elements Cadd are also formed in these superposed portions.

(Embodiment 36)

Figure 33:
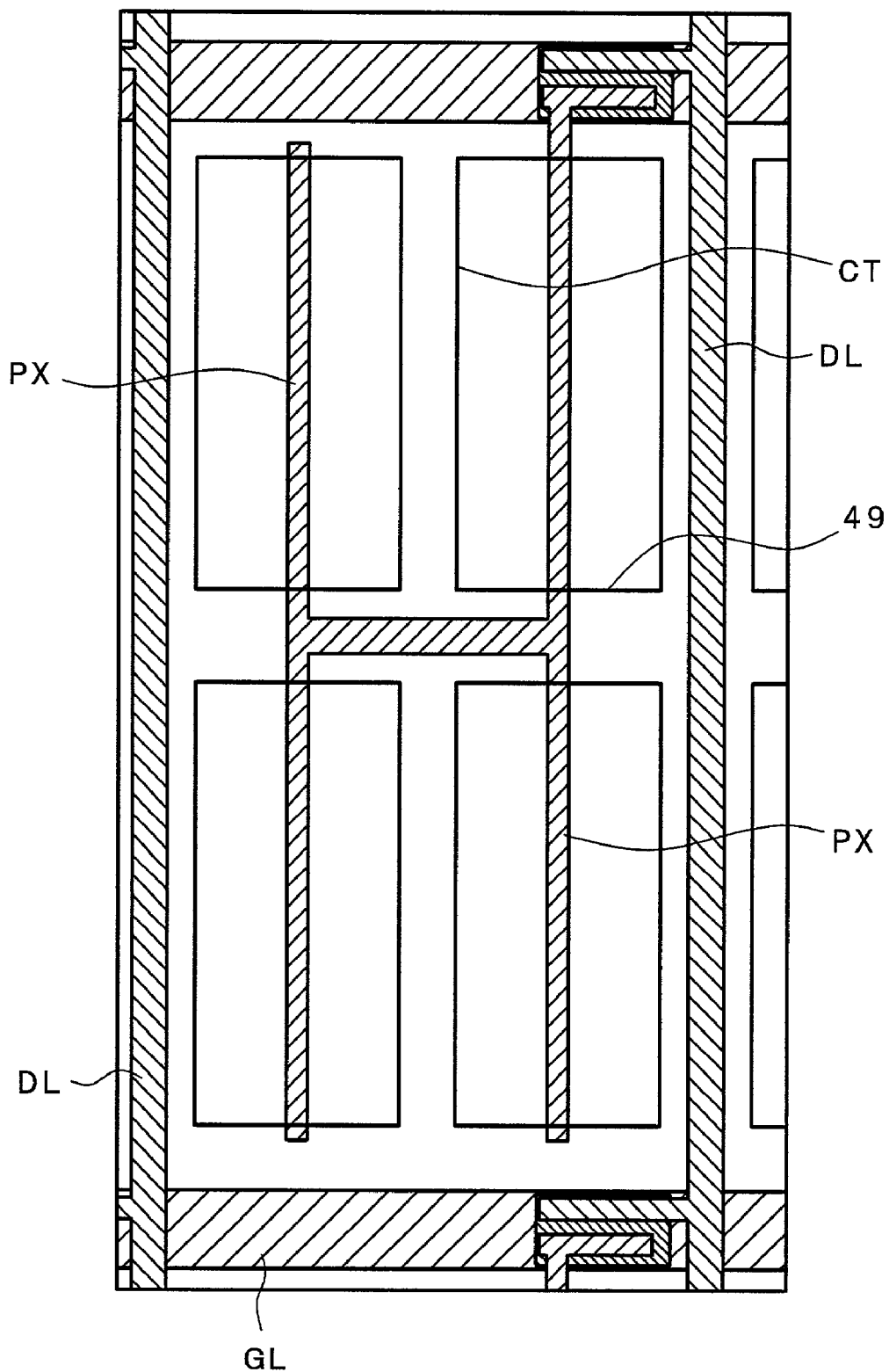
FIG. 33 is a constitutional view showing another embodiment of the pixel of the liquid crystal display device according to the present invention.

Further, as shown in FIG. 33, a connecting portion 49 may be formed on the material layer which forms the reference electrode CT as a portion thereof such that the connecting portion 49 is superposed on the connecting portion 48 for respective pixel electrodes PX.

(Embodiment 37)

This embodiment is characterized by forming a capacitive element Cstg and a capacitive element Cadd in one pixel region.

Figure 34:
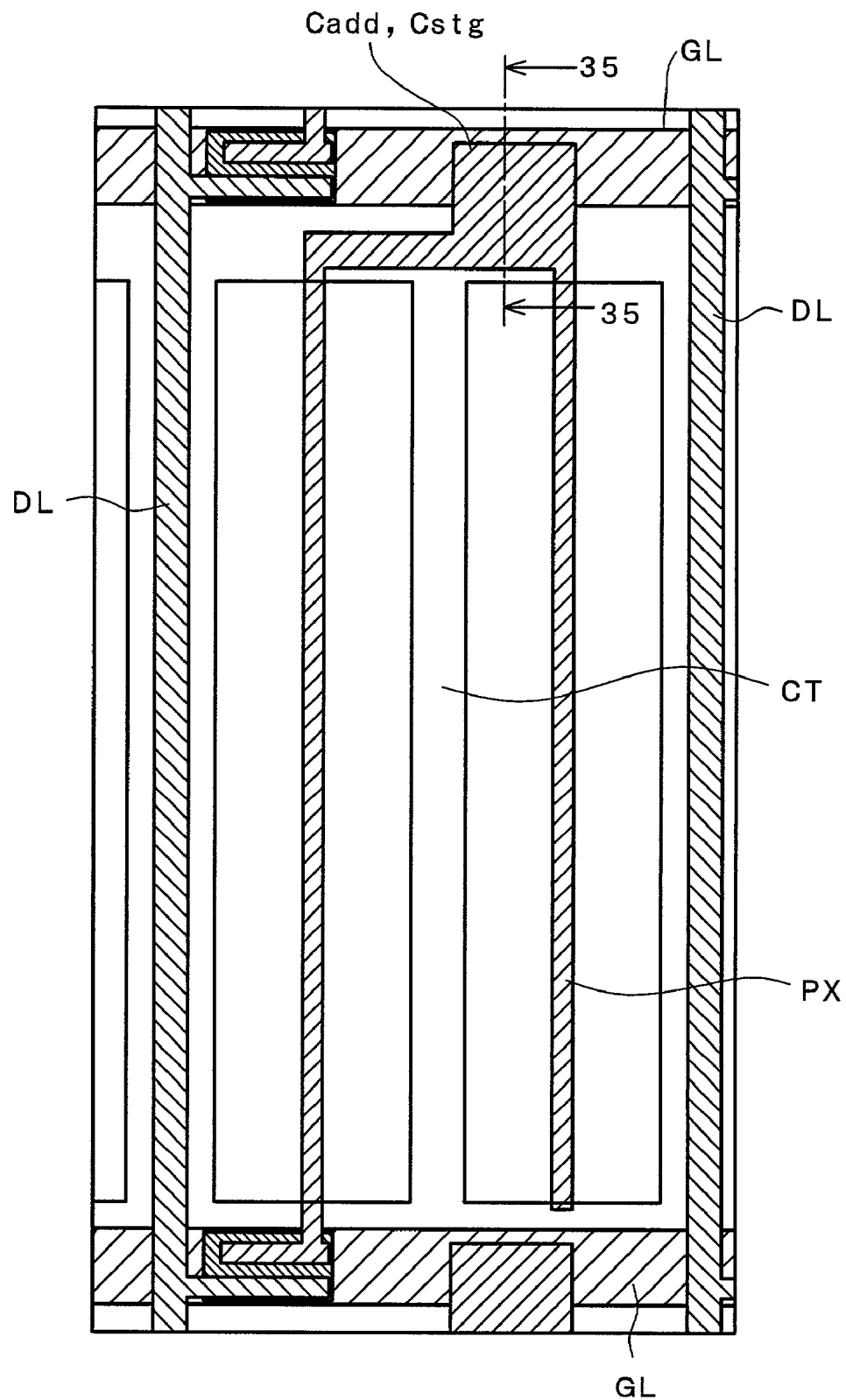
FIG. 34 is a constitutional view showing another embodiment of the pixel of the liquid crystal display device according to the present invention.
Figure 35:
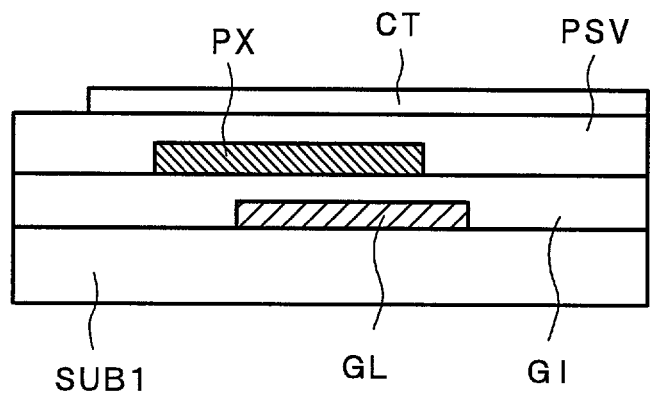
FIG. 35 is a cross-sectional view of FIG. 34 taken along a line 35—35.

As shown in FIG. 34, an extension portion of a pixel electrode PX is superposed on a portion of a gate signal line GL via an insulation film GI so as to form the capacitive element Cadd. The extension portion of the pixel electrode PX is also superposed on an extension portion of a reference electrode CT via a protective film PSV so as to form the capacitive element Cstg. FIG. 35 is a view showing a cross section of FIG. 34 taken along a line 35—35.

(Embodiment 38)

Figure 36:
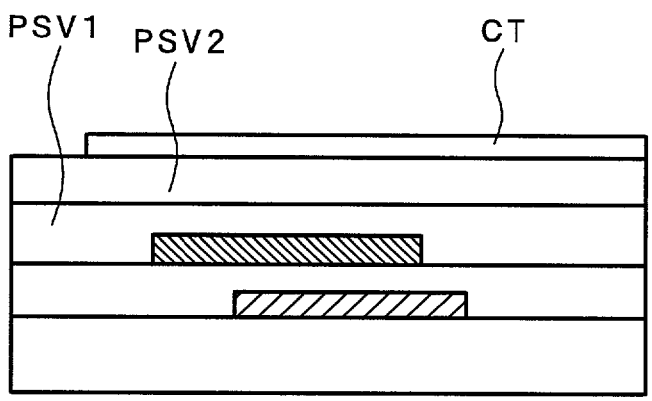
FIG. 36 is a view showing another embodiment of the liquid crystal display device according to the present invention and is a view which corresponds to FIG. 35.

Further, another embodiment which is provided for the comparison with the embodiment shown in FIG. 35 is shown in FIG. 36. As shown in the drawing, when the protective film PSV is formed of a sequential laminated body (PSV1, PSV2) constituted of inorganic material and organic material, a capacity of the capacitive element Cstg can not be sufficiently ensured. Accordingly, the constitution which uses the capacitive element Cadd together with the capacitive element Cstg is advantageous.

Figure 37:
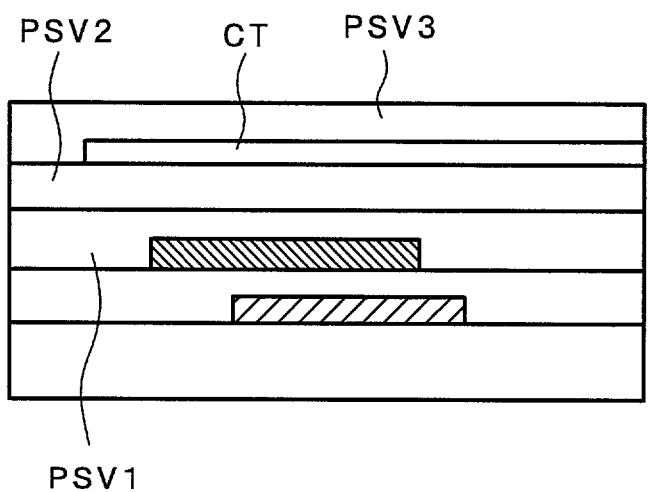
FIG. 37 is a view showing another embodiment of the liquid crystal display device according to the present invention and is a view which corresponds to FIG. 35.

Further, as shown in FIG. 37 which corresponds to FIG. 36, it is needless to say that a protective film PSV3 may be further formed on an upper surface of the reference electrode CT.

(Embodiment 39)

Further, in the above-mentioned constitution, the capacitive element Cstg and the capacitive element Cadd are substantially formed in the inside of the same region, that is, respective elements, Cstg, Cadd are formed in a superposed manner and hence, their occupying area can be made small so that numerical aperture can be enhanced.

(Embodiment 40)

Further, in the above-mentioned constitution, by making the area of the capacitive element Cadd smaller than the area of the capacitive element Cstg, while ensuring the necessary capacity, the holding role of the capacitive element Cstg which is electrically more stable than the capacitive element Cadd can be ensured so that the holding potential can be stabilized.

(Embodiment 41)

Further, in the above-mentioned constitution, the extension portion of the pixel electrode PX is constituted of a connecting portion with other neighboring pixel electrode PX and a portion which is superposed on a portion of the gate signal line GL (capacitive element Cadd forming portion). Accordingly, when a short-circuiting occurs at the capacitive element Cadd forming portion, for example, it becomes possible to cope with this short-circuiting by separating the portion which is superposed on the gate signal line from other portion with the use of laser beams, for example.

In this case, a fixed capacity can be ensured by the capacitive element Cstg so that the degrading of the quality of the pixel can be suppressed.

(Embodiment 42)

Further, in the case of the embodiment 41, by constituting a material layer which includes the reference electrode CT as a portion thereof via a light transmitting material layer, an advantageous effect that a short-circuiting which occurs at the capacitive element Cadd forming portion can be easily observed with naked eyes is obtained.

(Embodiment 43)

Figure 38:
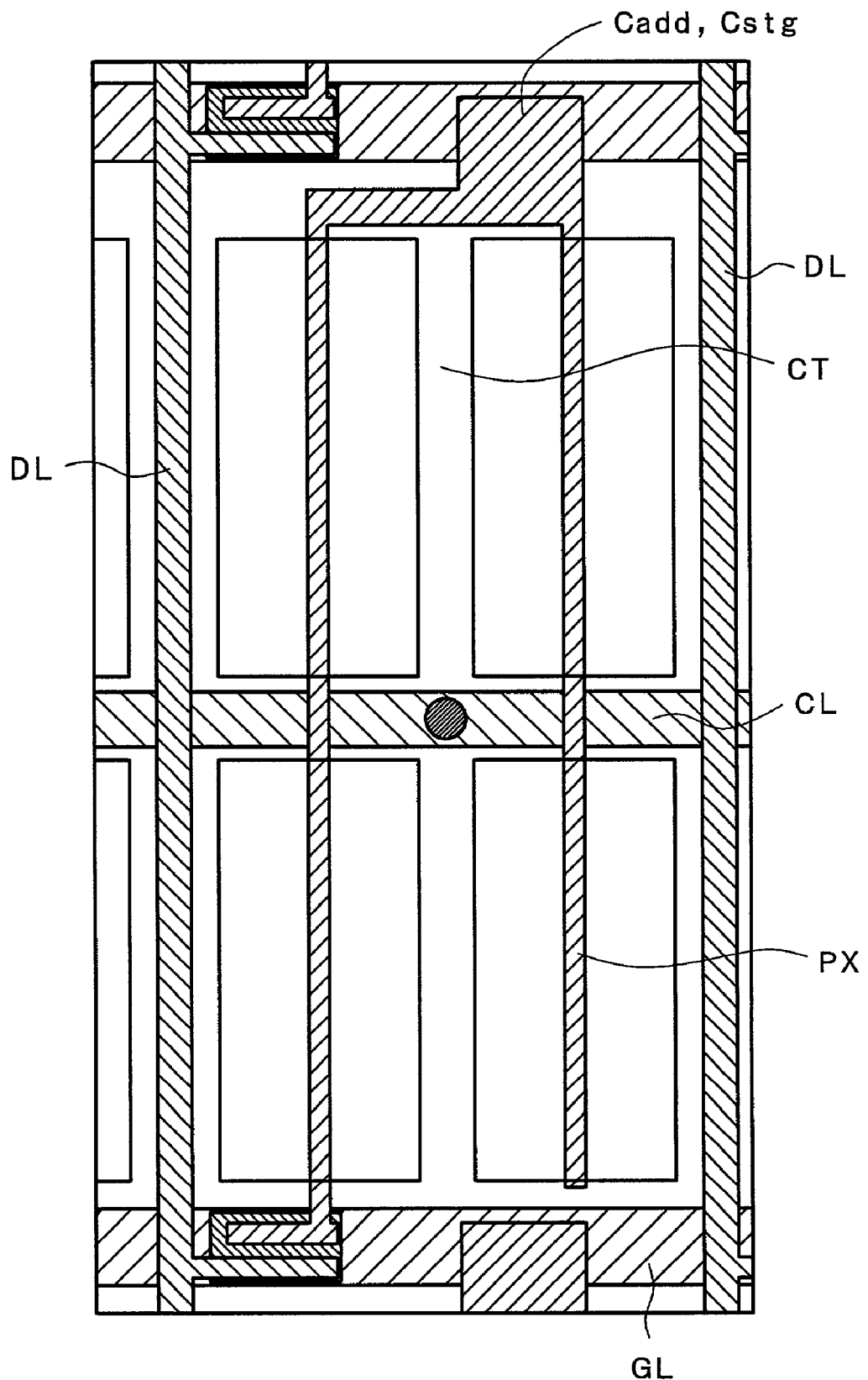
FIG. 38 is a constitutional view showing another embodiment of the pixel of the liquid crystal display device according to the present invention.

The advantageous effects as described in the abovementioned embodiments 37 to 42 are obtained in the same manner with respect to a constitution shown in FIG. 38 in which a reference signal line CL is formed and the reference signal line CL and reference electrodes CT are connected via a through hole TH.

(Embodiment 44)

Figure 39:
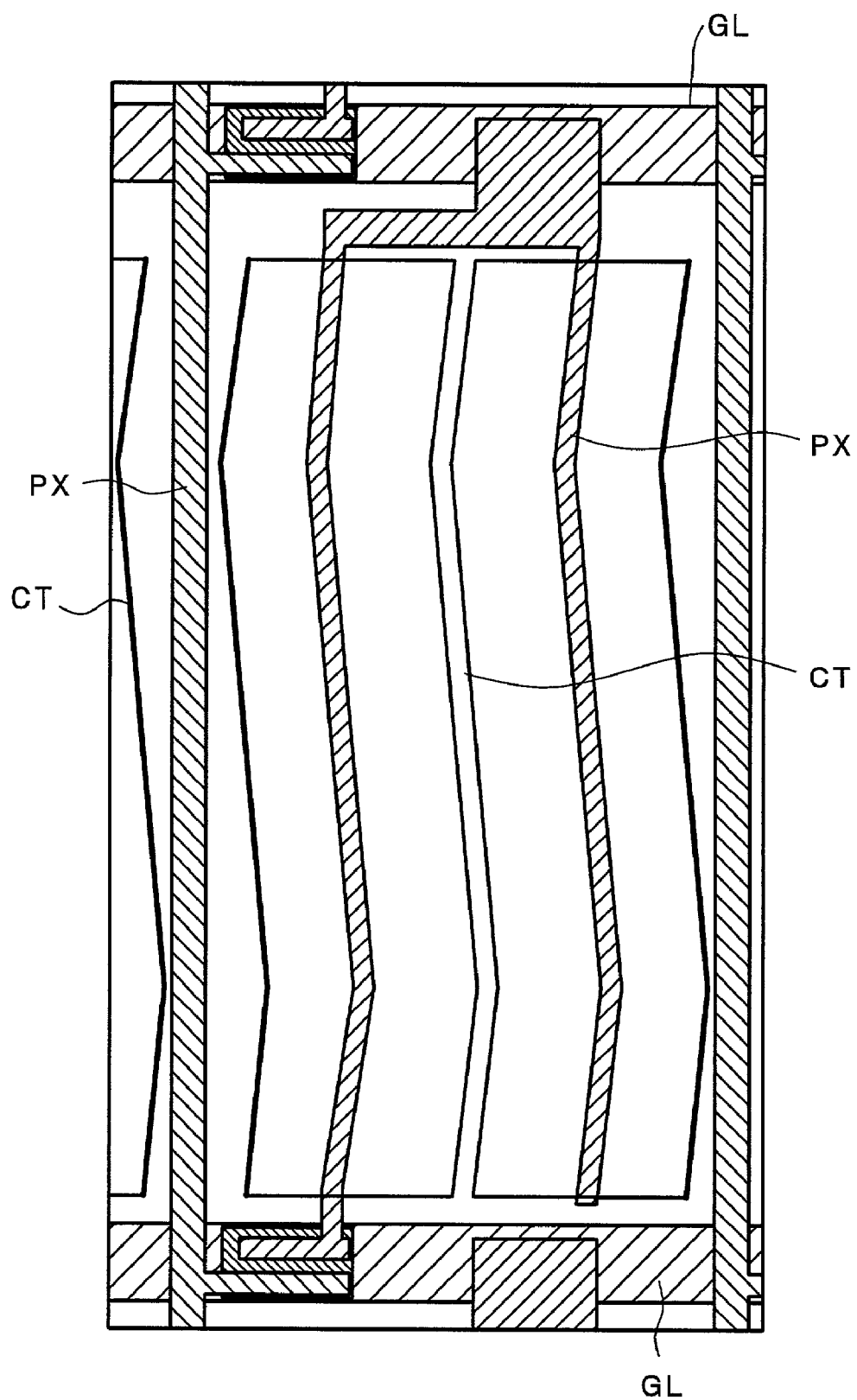
FIG. 39 is a constitutional view showing another embodiment of the pixel of the liquid crystal display device according to the present invention.

FIG. 39 shows a constitution in which the constitution of the above-mentioned embodiment 37 or the embodiment 43 is applied to a so-called multi-domain method.

The multi-domain method is a method in which the directions of an electric field which is generated between a pixel electrode PX and a reference electrode CT are formed in two ways so that even when the observation is made from the direction different from the direction perpendicular to a display surface, the change of color tone is not generated.

As one embodiment which adopts such a multi-domain method, the pixel electrode and the reference electrodes are respectively formed in a zigzag shape by forming a plurality of bent portions along their respective extension directions.

In this embodiment, an example which constitutes a capacitive element Cadd is illustrated in FIG. 39. However, this embodiment is applicable to a case in which only a capacitive element Cstg is provided.

(Embodiment 45)

Figure 40:
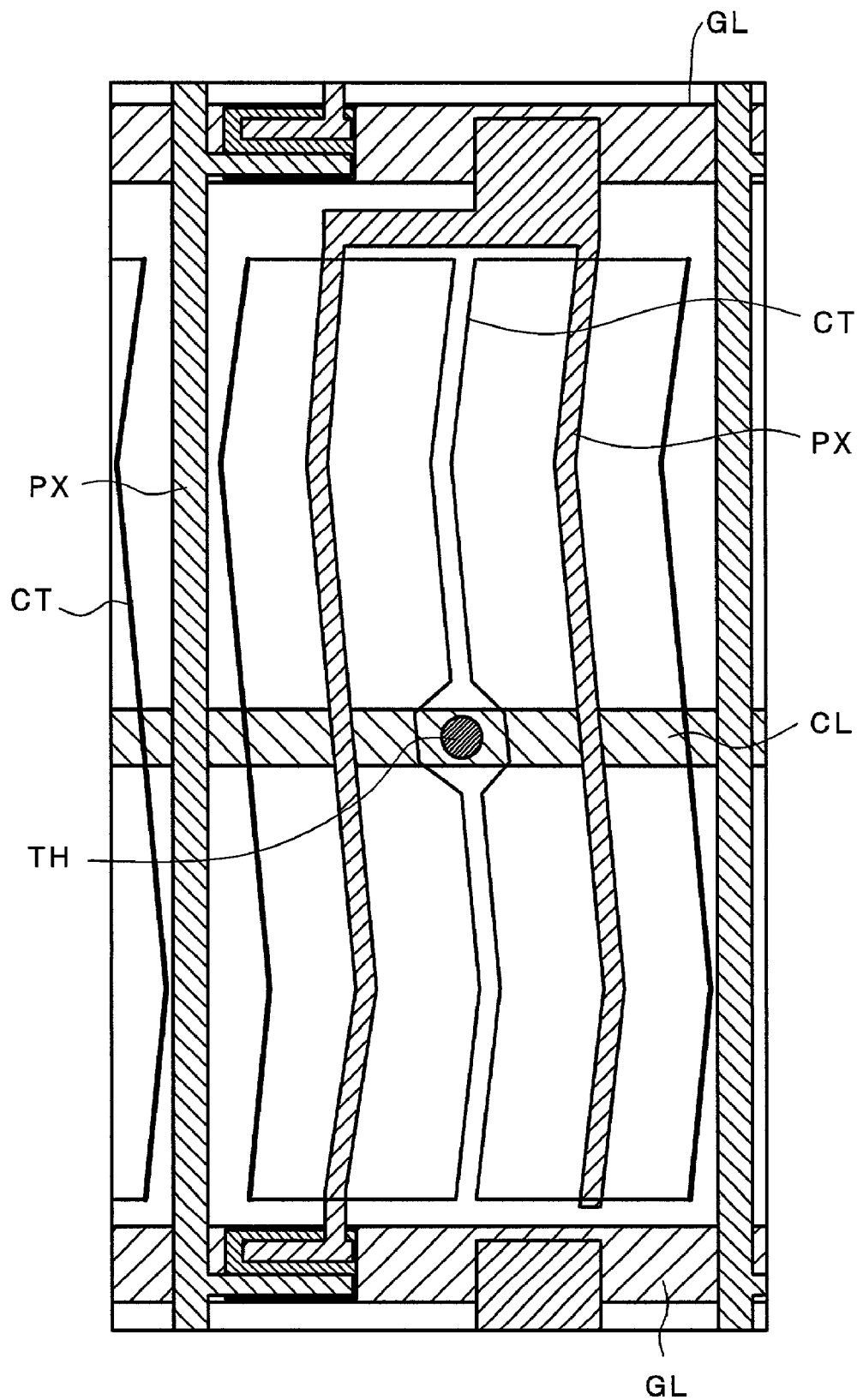
FIG. 40 is a constitutional view showing another embodiment of the pixel of the liquid crystal display device according to the present invention.

As shown in FIG. 40, this embodiment is characterized in that, in the constitution of the embodiment 44, a reference voltage signal line CL is formed in parallel with a gate signal line GL and the reference voltage signal line CL is connected with a reference electrode CT via a through hole TH formed in an insulation film.

(Embodiment 46)

Figure 41:
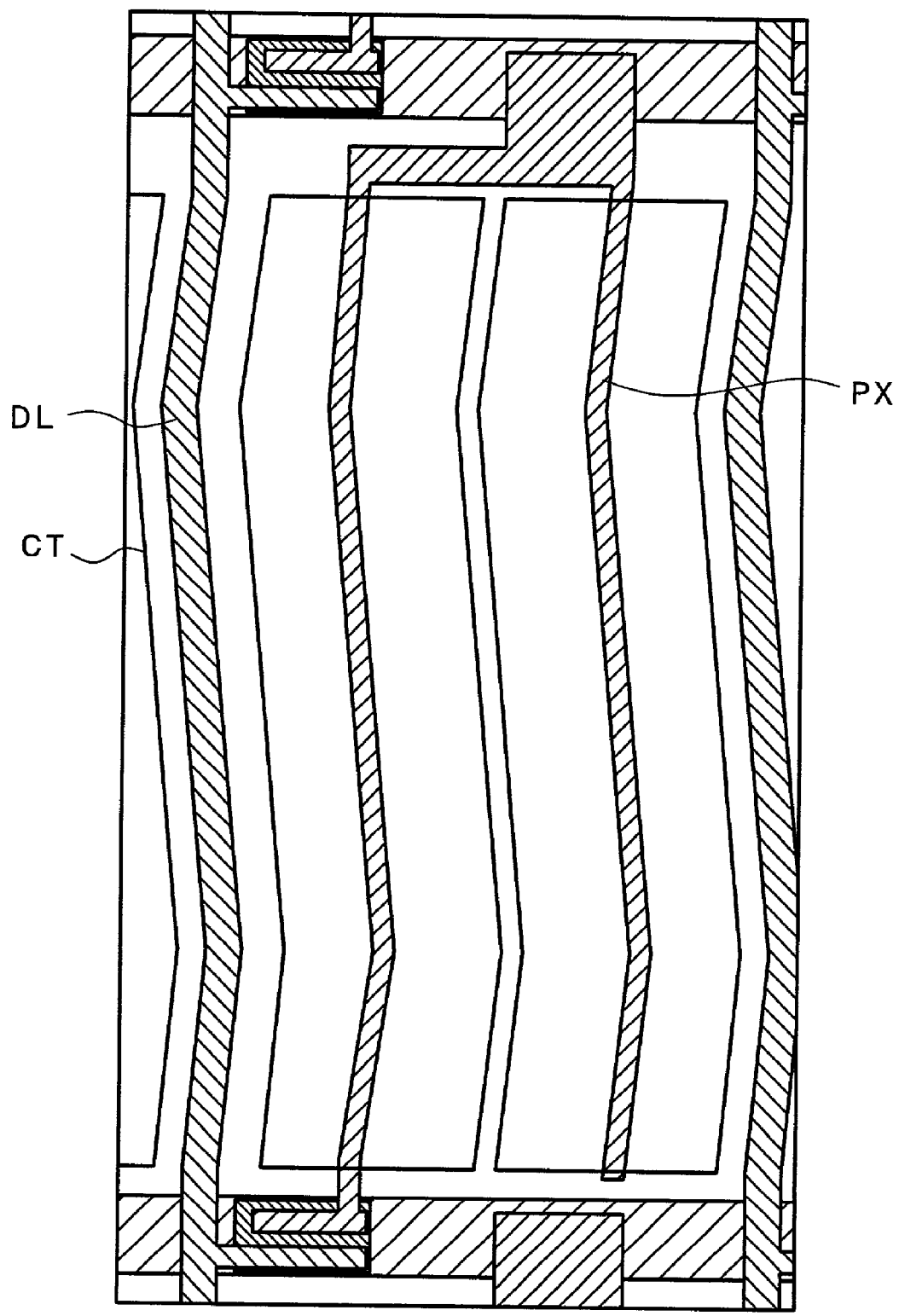
FIG. 41 is a constitutional view showing another embodiment of the pixel of the liquid crystal display device according to the present invention.

As shown in FIG. 41, this embodiment is characterized in that, in the constitution of the embodiment 44, a drain signal line DL is formed in a zigzag shape in the running direction thereof corresponding to the shape of the reference electrode CT which is formed as a layer above the drain signal line DL.

Due to such a constitution, the reference electrode CT can cover the drain signal line DL with a uniform width thereof so that the electric field from the drain signal line DL can be reliably terminated to the reference electrode CT side.

(Embodiment 47)

Figure 42:
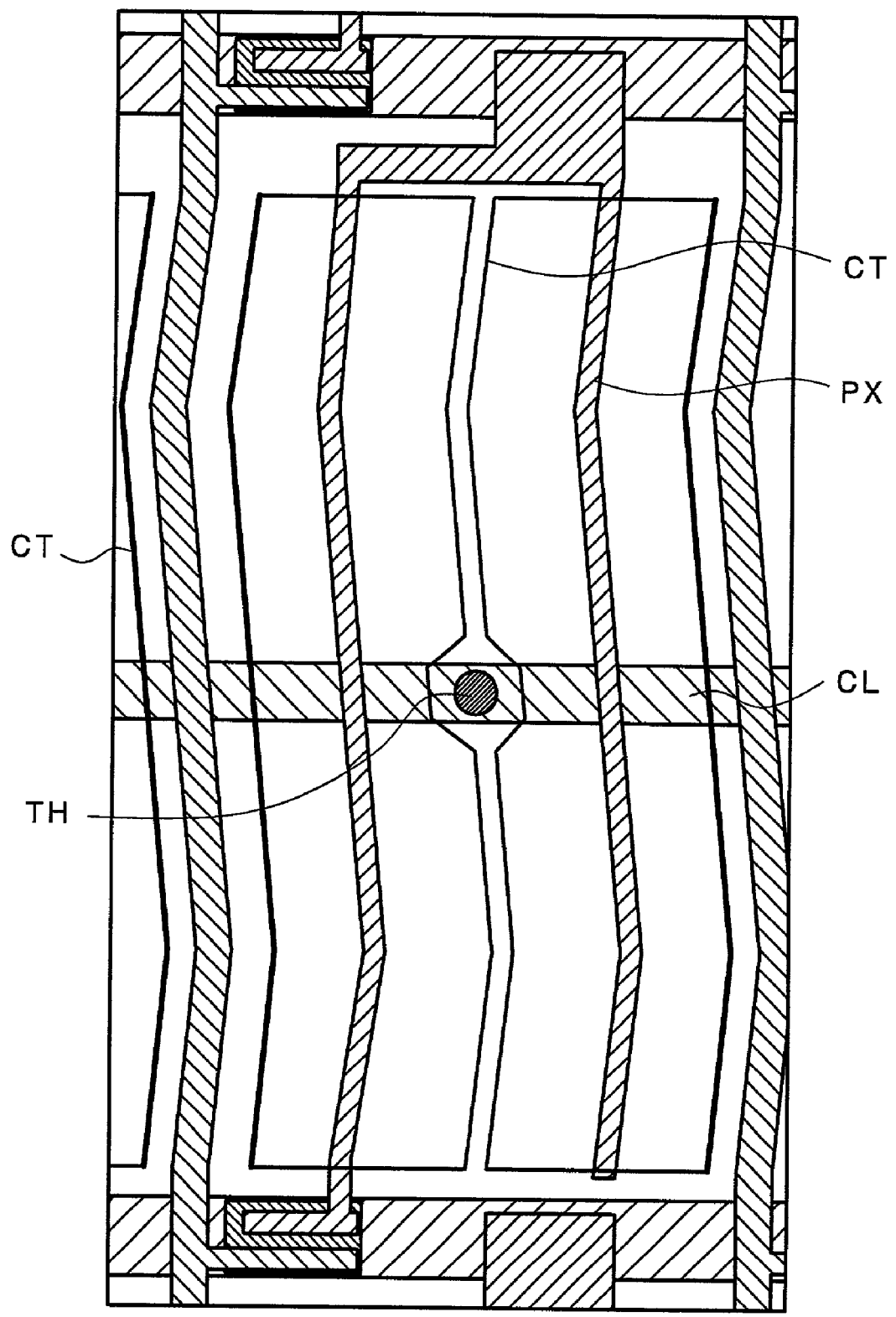
FIG. 42 is a constitutional view showing another embodiment of the pixel of the liquid crystal display device according to the present invention.

As shown in FIG. 42, this embodiment is characterized in that, in the constitution of the above-mentioned embodiment 46, a reference voltage signal line CL is provided and a connecting portion of the reference electrode CT which is connected with the reference voltage signal line CL via a through hole TH has a width thereof widened.

(Embodiment 48)

This embodiment is characterized in that, in respective constitutions of the embodiment 23 to the embodiment 26, to obviate the occurrence of back channel of the thin film transistor TFT, an aperture is formed in a region of a conductive film which includes the reference electrode CT as a portion thereof above the thin film transistor TFT.

(Embodiment 49)

This embodiment is characterized in that, in respective constitutions of the embodiment 37 to the embodiment 48, as material of the reference electrode CT, any material selected from a group consisting of Al, Cr, Mo, Ta, W, or material made of an alloy thereof, or material formed by laminating some of these materials can be used.

Due to such a constitution, it is unnecessary to particularly form a light shielding film above the drain signal line DL and the reference electrode CT exhibits a low resistance so that the waveform distortion in the common inversion driving can be suppressed.

(Embodiment 50)

This embodiment is characterized in that, in respective constitutions of the embodiment 37 to the embodiment 48, as material of the reference electrode CT, any material selected from a group consisting of Al, Cr, Mo, Ta, W, or material made of an alloy thereof, or material formed by laminating some of these materials can be used.

Further, as material of the reference voltage signal line CL, material made of either Al or Cr, or material made of an alloy thereof, or material formed by laminating some of these materials can be used.

(Embodiment 51)

This embodiment is characterized in that, as the material of the reference electrode CT, any material selected from a group consisting of ITO, $In_2O_3$, $SnO_2$, IZO, $ZnO_2$, or material made of an alloy thereof, or material formed by laminating some of these materials can be used.

In this case, when the above-mentioned material is served for covering terminal portions of the gate signal line GL, the drain signal line DL and the reference voltage signal line CL to prevent the electrolytic corrosion, the formation of the reference electrode can be performed simultaneous with such a covering so that the increase of man-hours for manufacturing can be obviated.

Further, in this case, at the time of repairing the capacitive element, the capacitive element can be directly observed with naked eyes through the reference electrode CT and hence, an advantageous effect that the positioning in laser cutting at the time of repairing is facilitated is obtained.

(Embodiment 52)

This embodiment is characterized in that, in the constitution of the embodiment 51, a so-called normally black mode is adopted.

Due to such a constitution, a reference electrode CT above the drain signal line functions as a light shielding film. Accordingly, compared to a case in which the liquid crystal display device is constituted in a normally white mode, for example, a drawback caused by leaking of light can be solved.

Here, the normally white mode implies the constitution in which the liquid crystal exhibits the maximum light transmittivity when an electric field is generated between a pixel electrode PX and the reference electrode CT.

(Embodiment 53)

This embodiment is characterized in that, in respective constitutions of the embodiments 51, 52, a voltage is applied between the reference electrode CT and pixel electrode PX in a so-called dot inversion driving.

In the above-mentioned respective constitutions, the reference electrode CT is made of the above-mentioned material (ITO, $In_2O_3$, $SnO_2$, IZO, $ZnO_2$ or the like) and hence, the resistance of the reference electrode CT is relatively high. In view of the above, this embodiment enhances the uniformity of the brightness of a display surface by performing the dot inversion.

(Embodiment 54)

This embodiment is characterized in that, among the above-mentioned respective constitutions, in the constitutions which forms the conductive layer including the reference electrode CT as a portion thereof above the thin film transistor TFT (constitution which is not provided with the aperture), the reference electrode CT is driven such that the potential thereof falls within a range from not less than (−) 5 V to not more than (+) 10 V.

This is because that it is found that with the driving of the reference electrode CT within the above-mentioned range, the fluctuation of the threshold value of the thin film transistor TFT can be suppressed within an allowable range.

(Embodiment 55)

In the above-mentioned respective embodiments, the switching element which is formed in the inside of the pixel is not limited to the thin film transistor TFT and a switching element having other constitution is also applicable as such a switching element.

However, when the thin film transistor TFT is adopted as the switching element, the scanning signals supplied to the gate signal line is set to not less than +12 V to turn on the thin film transistor TFT and is set to not more than 5 V to turn off the thin film transistor TFT.

Accordingly, by driving the reference electrode CT while setting the potential of the reference electrode CT in a region which does not satisfy the above-mentioned conditions, an erroneous operation of the thin film transistor TFT which may be caused by the reference electrode CT can be prevented.

(Embodiment 56)

This embodiment is characterized in that, among the above-mentioned respective constitutions, in the constitutions which form the conductive layer including the reference electrode CT as a portion thereof above the thin film transistor TFT (constitution which is not provided with the aperture), the minimum value of the potential of the reference electrode is set to not less than −5 V in a so-called common inversion driving method.

Also with such a provision, the fluctuation of the threshold value of the thin film transistor TFT can be suppressed.

(Embodiment 57)

This embodiment is characterized in that, among the above-mentioned respective constitutions, in the constitutions which form the conductive layer including the reference electrode CT as a portion thereof above the thin film transistor TFT (constitution which is not provided with the aperture), in driving the reference electrode with a substantially fixed potential, the potential is set within a range from not less than −5 V to not more than +10 V, and preferably, within a range from not less than −1 V to not more than +7 V. Also with such a provision, the fluctuation of the threshold value of the thin film transistor TFT can be suppressed.

(Embodiment 58)

This embodiment is characterized by the constitution in the vicinity of the connection between a gate signal line GL and a gate drive IC 5, for example.

Figure 43A:
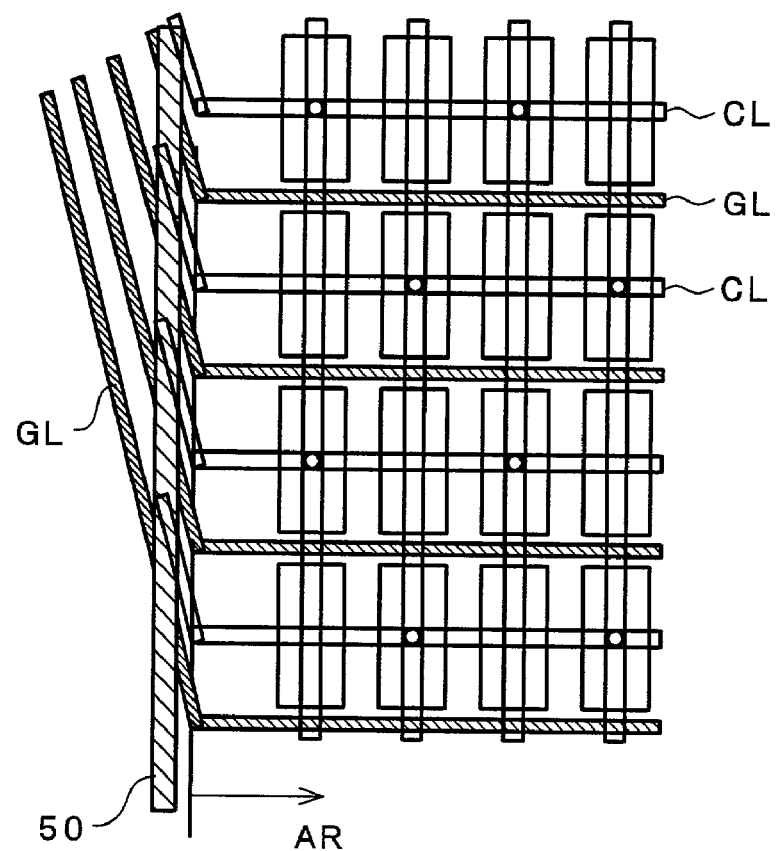
FIG. 43 is a constitutional view showing another embodiment of the liquid crystal display device according to the present invention and more specifically to a plan view showing a portion where respective reference voltage signal lines are pulled out.

As shown in FIG. 43, the constitution in the vicinity of the connection between the gate signal lines GL and the gate drive ICs 5 is, as mentioned previously, formed as a pattern which converges at the gate drive IC 5 side along with other neighboring gate signal line GL.

Figure 58:
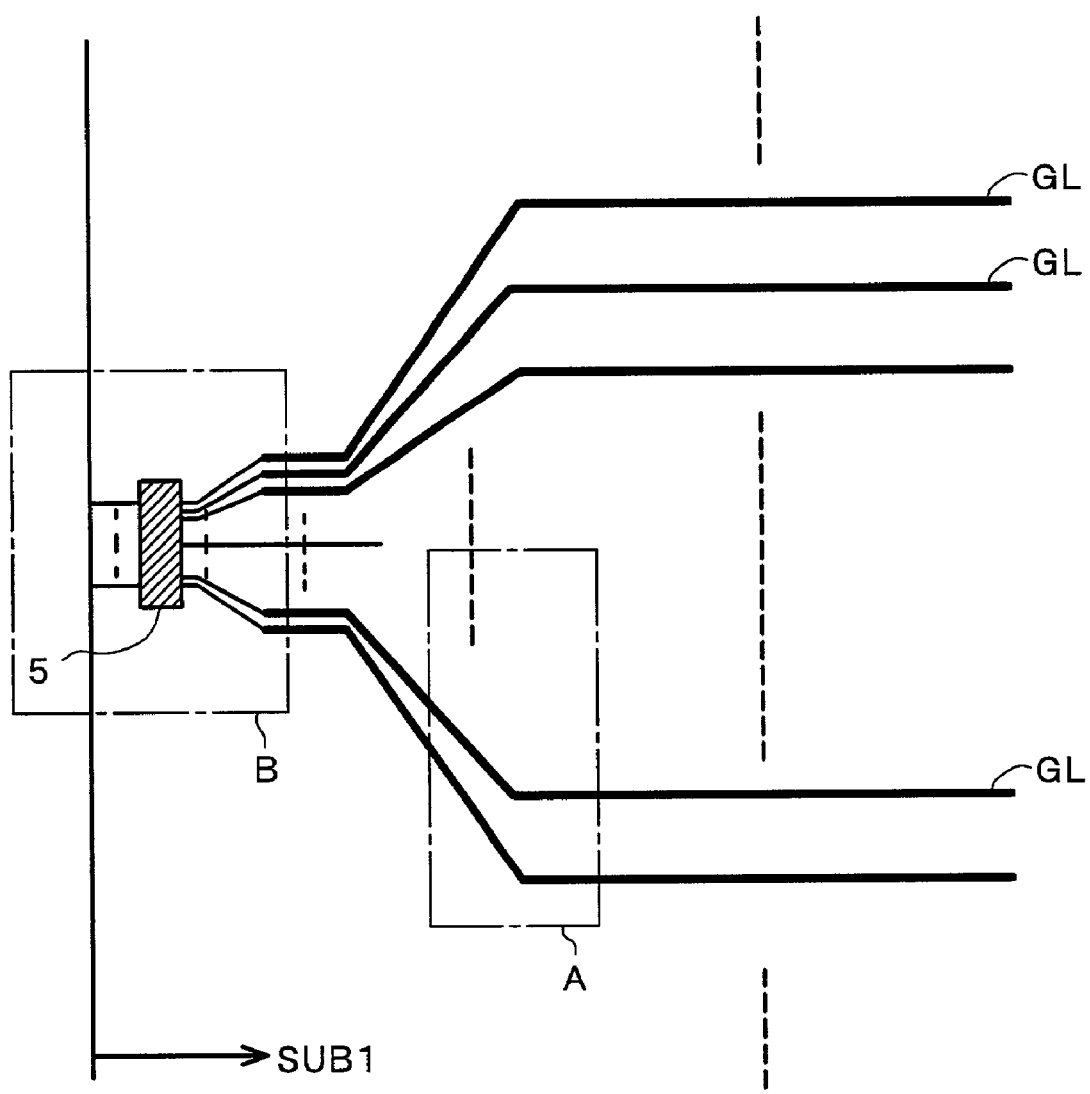
FIG. 58 is a plan view showing a portion in the vicinity of a region on which drivers of the liquid crystal display device according to the present invention is mounted.

Here, this portion corresponds to a portion surrounded by a dashed line A shown in FIG. 58.

In this case, the reference voltage signal lines CL are arranged as the same layer as the gate signal lines GL between respective gate signal lines GL and when the reference voltage signal line CL is also pulled out to the gate drive IC 5 side, the reference voltage signal lines CL interfere with the gate signal lines GL at the region where respective gate signal lines GL are converged and hence, a short-circuiting is liable to occur.

Accordingly, in this embodiment, the reference voltage signal line CL is formed in other layer with respect to the gate signal lines GL via an insulation film and the reference voltage signal line CL and the reference electrodes CT are connected via a wiring layer 50 which is extended in the direction substantially perpendicular at a right angle to the gate signal line GL and a through hole formed in the insulation film in the region where respective gate signal lines GL are converged.

Due to such a constitution, the increase of a region which is referred to as a picture frame can be obviated.

That is, in the previous example, when the reference voltage signal lines CL are to be formed without generating short-circuiting in the region where respective gate signal lines GL are converged, a bending angle of respective gate signal lines at the converging portion must be set to a small value and hence, the gate drive ICs 5 must be mounted at a position remote from a display region AR.

When the pixels of this embodiment adopt the constitution shown in FIG. 13, for example, the wiring layer 50 may be a wiring layer which can be simultaneously formed with the drain signal lines DL.

Further, although this embodiment is directed to the constitution in the vicinity of the connection of the gate signal lines GL and the gate drive ICs 5, it is needless to say that this embodiment is applicable to the constitution in the vicinity of the connection between the drain signal lines DL and the drain drive ICs 6.

(Embodiment 59)

Figure 43B:
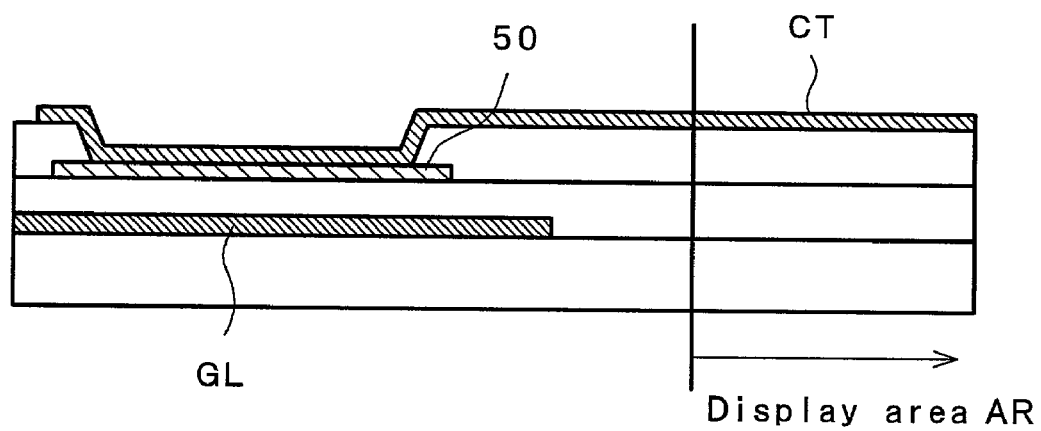
Figure 44:
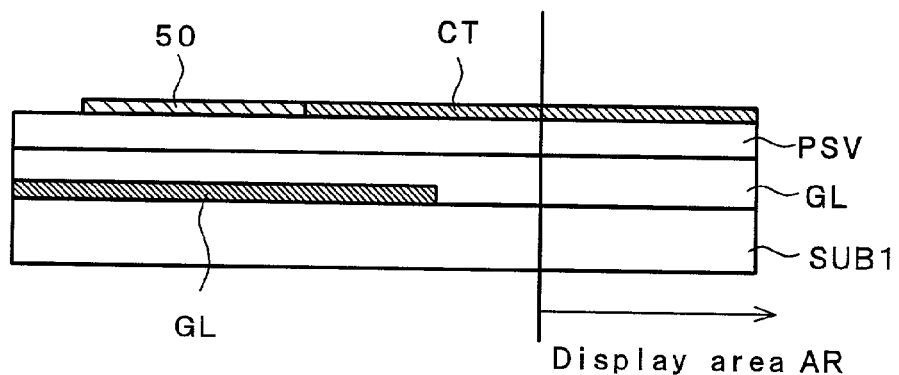
FIG. 44 is a constitutional view showing another embodiment of the liquid crystal display device according to the present invention and more specifically to a cross-sectional view showing a portion where respective reference voltage signal lines are pulled out.
Figure 45:
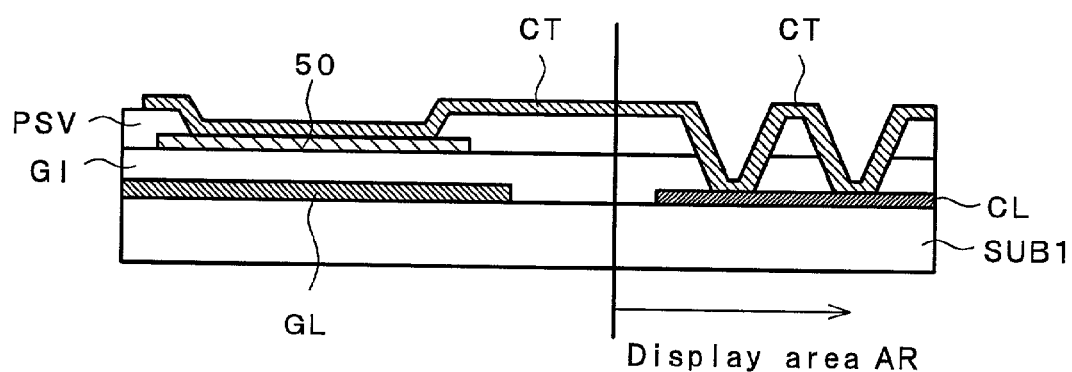
FIG. 45 is a constitutional view showing another embodiment of the liquid crystal display device according to the present invention and more specifically to a cross-sectional view showing a portion where respective reference voltage signal lines are pulled out.
Figure 46:
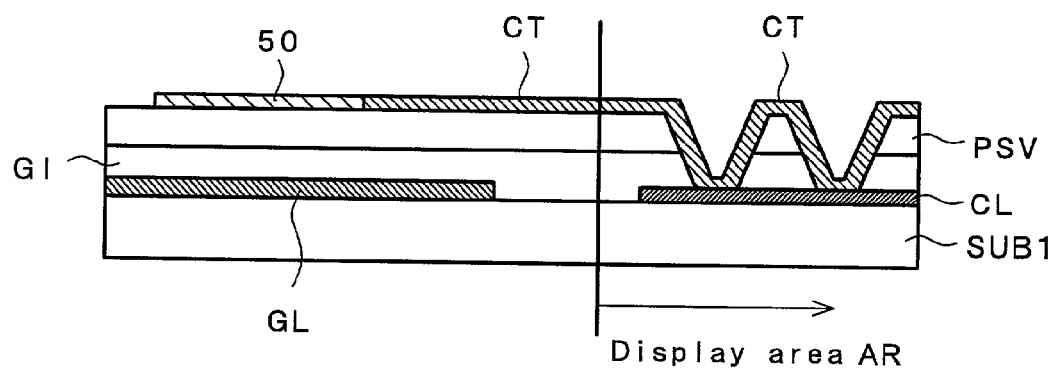
FIG. 46 is a constitutional view showing another embodiment of the liquid crystal display device according to the present invention and more specifically to a cross-sectional view showing a portion where respective reference voltage signal lines are pulled out.

As shown in FIG. 44 which corresponds to FIG. 43(b), this embodiment is characterized in that the above-mentioned wiring layer 50 is integrally formed with the reference voltage signal lines CL.

(Embodiment 60)

This embodiment is characterized by the constitution in the pixel region in the constitution show in FIG. 58. That is, gate signal lines GL and reference voltage signal lines CL

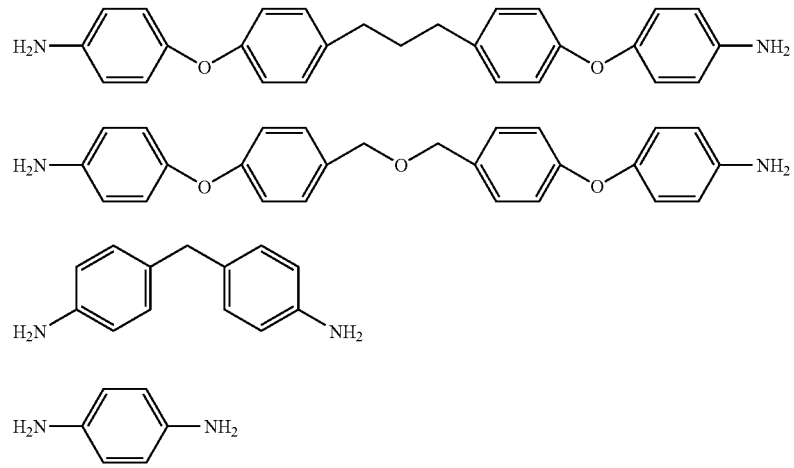

are formed as the same layer and the reference voltage signal lines CL are connected with the reference electrodes CT which are formed on an upper surface of an insulation film by way of the insulation film via a through hole TH formed in the insulation film.

(Embodiment 61)

This embodiment is also characterized by the constitution of the pixel region in the constitution described in the embodiment 59.

(Embodiment 62)

Figure 47:
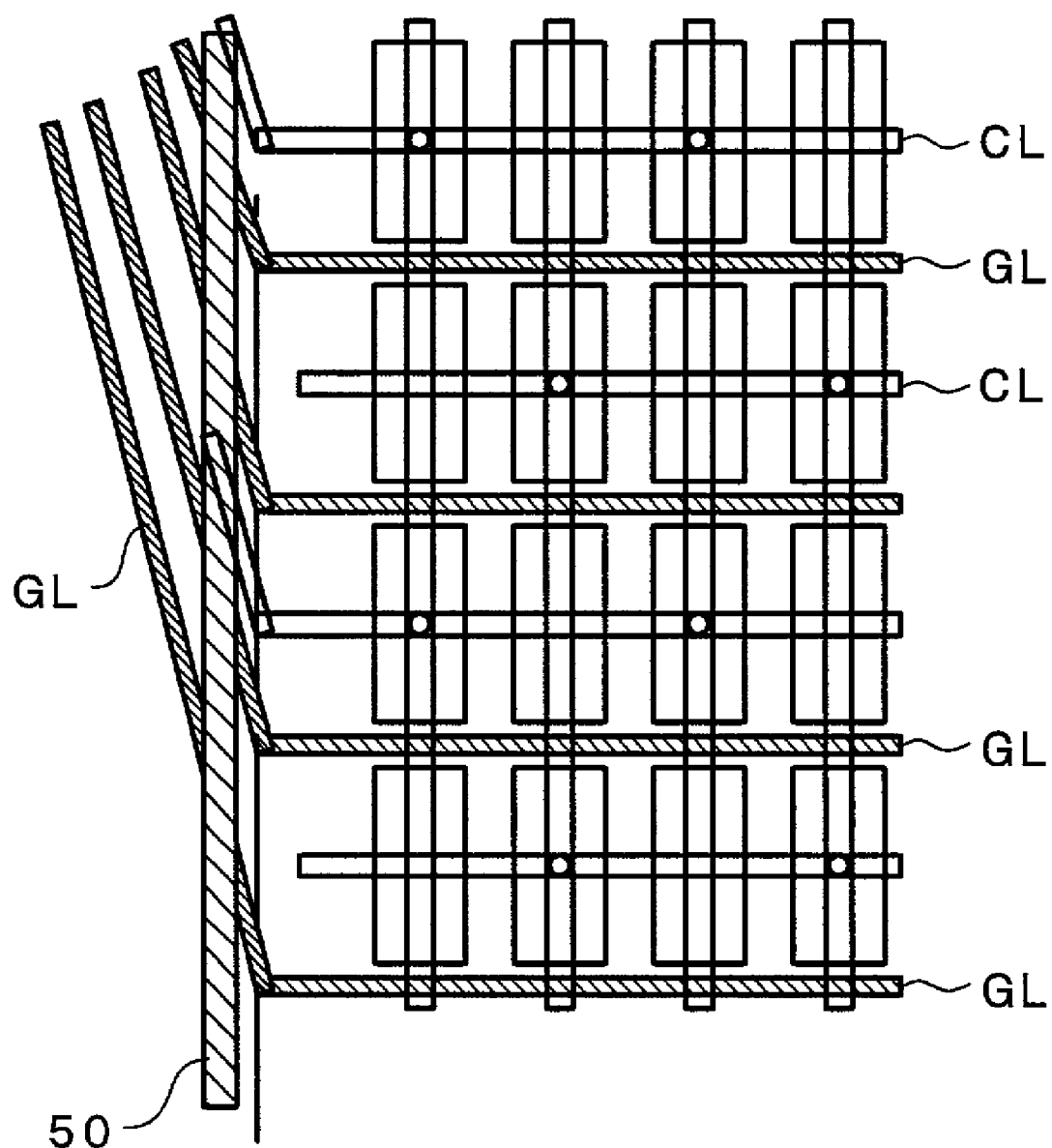
FIG. 47 is a constitutional view showing another embodiment of the liquid crystal display device according to the present invention and more specifically to a cross-sectional view showing a portion where respective reference voltage signal lines are pulled out.

FIG. 47 is a view which corresponds to FIG. 43. What differs from the constitution of FIG. 43 lies in that the reference voltage signal lines CL which are pulled out to the wiring layer 50 are arranged every one other. In this case, it is needless to say that the arrangement of the reference voltage signal lines CL is not limited to the every one other arrangement and the every two other arrangement, the every three other arrangement or the like may be adopted.

Here, the reference electrodes CT are formed as portions of the material layer as mentioned above and this material layer is formed such that the material layer is connected with a material layer of other neighboring pixel region.

Due to such a constitution, in the region where respective gate signal lines GL are converged, the concentration of the signal lines can be obviated.

Although the reference voltage signal lines have been explained in this embodiment, it is needless to say that the embodiment is applicable to the holding capacitive lines.

(Embodiment 63)

Figure 48:
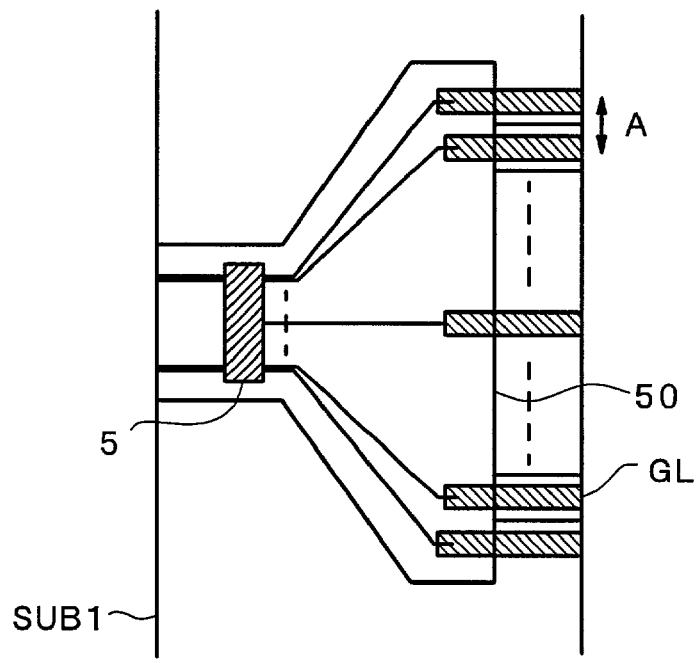
FIG. 48 is a constitutional view showing another embodiment of the liquid crystal display device according to the present invention and is more specifically is a plan view showing a portion in the vicinity of a driver mounting portion.

This embodiment is, as shown in FIG. 48, characterized in that the above-mentioned wiring layer 50 is turned around the outside of a bundle of respective gate signal lines GL which are connected with one driver chip (drain drive IC 6, gate drive IC 5) and then is pulled out in the vicinity of the driver chip.

Due to such a constitution, it becomes possible to pull out the wiring layer 50 to the terminal side of the input side of the driver chip.

Here, a portion shown in FIG. 48 corresponds to a portion indicated by a frame B depicted by a dashed line in FIG. 58.

(Embodiment 64)

Figure 49:
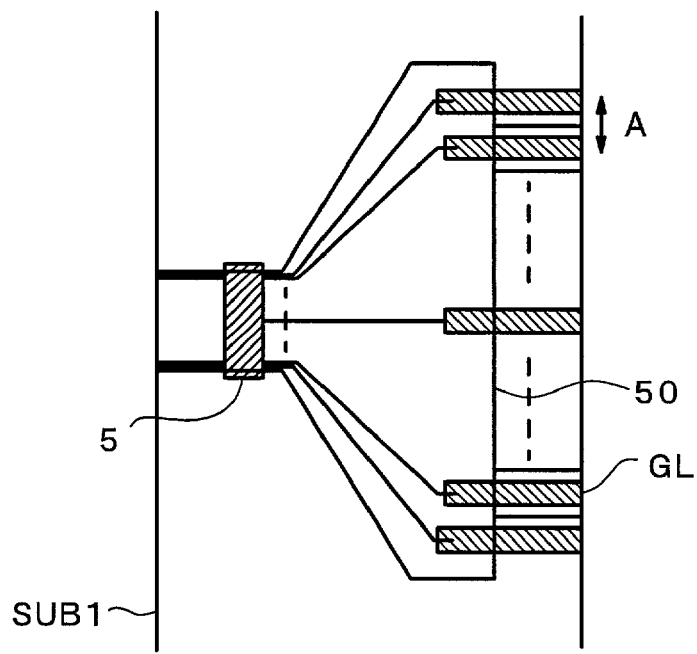
FIG. 49 is a constitutional view showing another embodiment of the liquid crystal display device according to the present invention and is more specifically is a plan view showing a portion in the vicinity of a driver mounting portion.

This embodiment is directed to other embodiment related with the embodiment shown in FIG. 48. As shown in FIG. 49, a wiring layer 50 which is pulled out in the vicinity of the driver chip is positioned below the driver chip.

(Embodiment 65)

This embodiment is characterized in that, in the constitutions of the above-mentioned respective embodiments, materials having following structural formulae are used as materials of orientation films ORI1, ORI2.

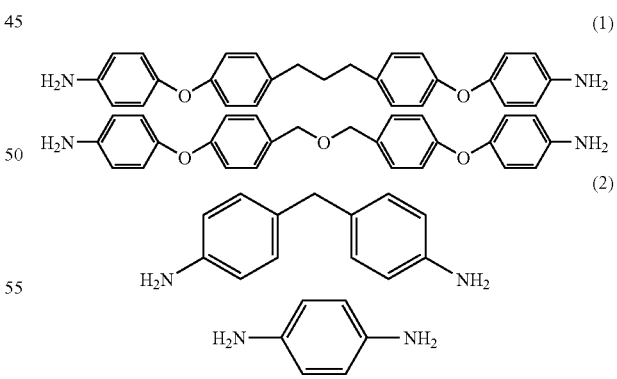

With the use of these orientation films ORI1, ORI2, the occurrence of image sticking (ionic image sticking) derived from the movement of ionic impurities in a liquid crystal layer can be suppressed.

Further, when the material of the formula (1) amounts to 30% to 70% for the sum of the material expressed by the formula (1) and the material expressed by the formula (2) in the orientation film, the occurrence of the ionic image sticking can be further suppressed.

Figure 50A:
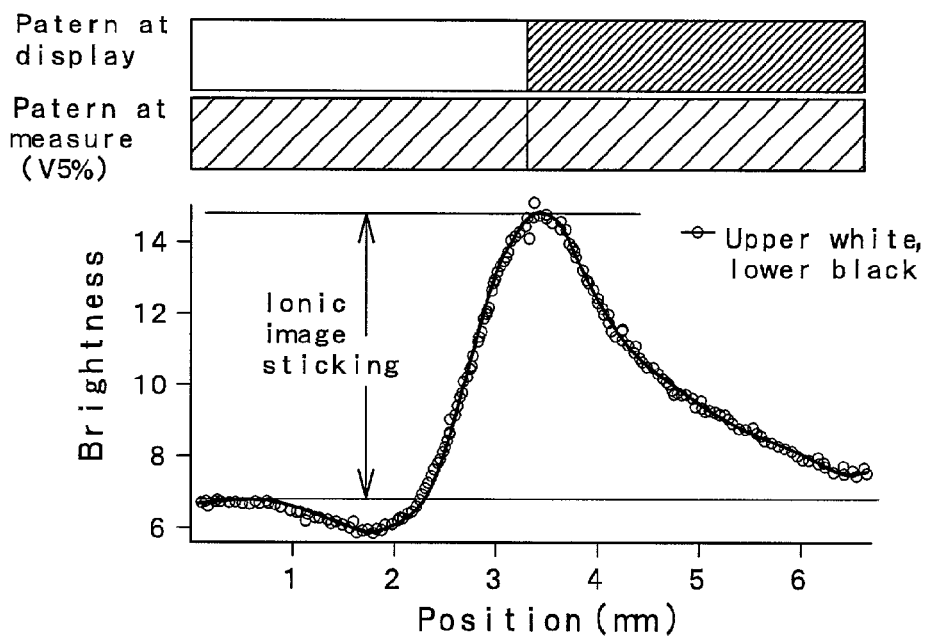
FIG. 50 is an explanatory view showing an ionic image sticking phenomenon in the inside of the liquid crystal and the ionic image sticking strength.

Here, the ionic image sticking means, as shown in FIG. 50(a), a portion of brightness which protrudes from brightness corresponding to a middle level pattern at measure when white and black displays are performed in neighboring regions with a pattern at display for 1 hour and thereafter the display is performed with the middle level pattern at measure and the change of brightness is detected over the white-display region and the black-display region.

In this case, with the use of the above-mentioned materials as the orientation films ORI1, ORI2, it becomes possible to suppress the intensity of the ionic image sticking shown in FIG. 50(a) to not more than 3 (preferably, not more than 2) so that the generation of the ionic image sticking can be prevented.

Figure 50B:
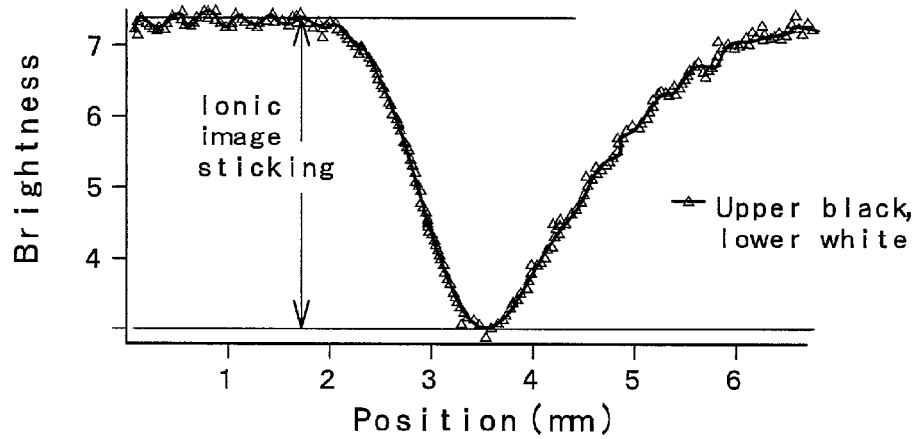

FIG. 50(b) shows that the black display with a pattern at display is used as a common portion and the white display is disposed at the right side of the black display.

The reason why the brightness distribution with the middle level pattern at measure of FIG. 50(b) differs from that of FIG. 50(a) is that a phenomenon in which ions move to the left side in the drawing is observed.

(Embodiment 66)

Figure 31B:
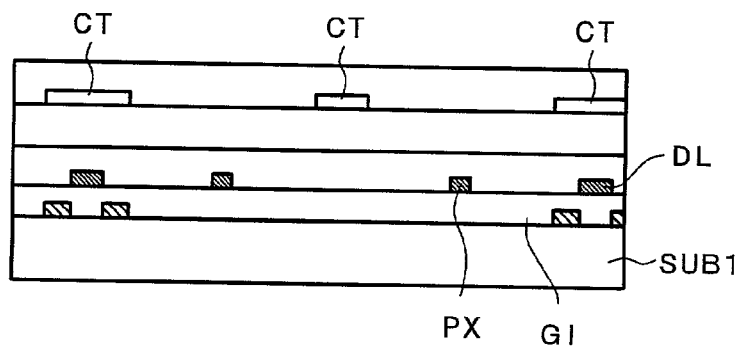

This embodiment is characterized in that, in the constitution shown in FIG. 31, for example, as shown in FIG. 51(a) which corresponds to FIG. 31(b), reference electrodes CT are formed on a protective film PSV (an upper layer thereof being formed of a protective film PSV2 made of organic material) and an orientation film ORI1 is formed on the protective film PSV such that the orientation film ORI1 also covers the reference electrodes CT.

Further, recessed portions are formed at portions of an upper surface of the protective film PSV where the reference electrodes CT are formed.

Due to such a constitution, the step of the reference electrodes CT can be minimized so that the lowering of rubbing, the worsening of image sticking or the leaking of light caused by the insufficient orientation in the vicinity of the reference electrodes CT can be solved.

In this case, as shown in FIG. 51(b), on the condition that the thickness of the electrodes is set to H (=300 nm) and the protruding height of the electrodes is set to $H_1$ (=0, 90, 150, 300 nm), the state of the leaking of light was investigated with respect to respective electrodes. The result shown in FIG. 52 was obtained. In the drawing, oo indicates the state which the leaking of light was obviated most favorably, o indicates the state in which the leaking of light was obviated favorably, and x indicates the state in which the leaking of light was not obviated favorably.

It is understood from the above result that the constitution which embeds the reference electrodes CT in the protective film PSV2 is preferable and the thickness H of the reference electrodes CT and the protruding height Hi of electrodes CT from the recessed portions should preferably have the relationship expressed by a following formula.

$$0 \leq (H-H_1)/H \leq 0.5 \quad (3)$$

This embodiment explains the case in which the orientation film ORI1 is directly formed on the surfaces of the reference electrodes CT. However, the embodiment is applicable to a case in which other insulation film is formed and the orientation film ORI1 is directly formed on the surface of the insulation film.

In this case, the height which appears on the surface of the other insulation film may be converted into the height Hi of the step of the reference electrodes CT.

Here, in this case, the electrodes are not limited to the reference electrodes CT and the above-mentioned height relationship is applicable to other electrodes and the reference electrodes CT are not limited to the light transmitting material layer or the opaque material layer.

(Embodiment 67)

This embodiment is characterized in that, in the above-mentioned respective embodiments, when the protective film PSV is formed of the sequential laminated body constituted of the protective film PSV1 made of inorganic material and the protective film PSV2 made of organic material, as material of the protective film PSV2, an acrylic-based film (highly transparent and positive-type photosensitive), a polyimide-based film (high heat resistance),a novolak-based film (easily colored), polyimide-epoxy copolymer (working also as an orientation film) or a laminated body thereof can be used.

Such a protective film PSV2 has a film thickness of 400 nm, a light transmittivity of 95% and the heat resistance of not less than 230° C.

Further, the protective film PSV2 exhibits the low contamination property to the liquid crystal and has the process resistance characteristics (capable of withstanding sputtering, an etchant, peeling-off liquid, an orientation film solvent, UV/$O_3$ cleaning).

(Embodiment 68)

It is confirmed that when the electric field is generated by applying the voltage between the pixel electrode PX and the reference electrode CT and the protective film PSV2 made of organic material is disposed between these electrodes, the driving voltage due to the protective film PSV2 has to be increased.

In this case, when the drivers, that is, the gate drive ICs 5 which supply scanning signals to the gate signal line GL or the drain drive ICs 6 which supply video signals to the drain signal line DL are directly mounted on the transparent substrate SUB1 (FCA method), it is necessary to take measures to cope with the generation of heat of the drive ICs.

Accordingly, inventors of the present invention have studied the relationship between the liquid crystal driving voltage Vmax which produces the maximum brightness in the normally black mode and the film thickness of the protective film PSV2 made of organic material, the distance between the pixel electrode Px and the reference electrode CT and the dielectric anisotropy of the liquid crystal.

Figure 53:
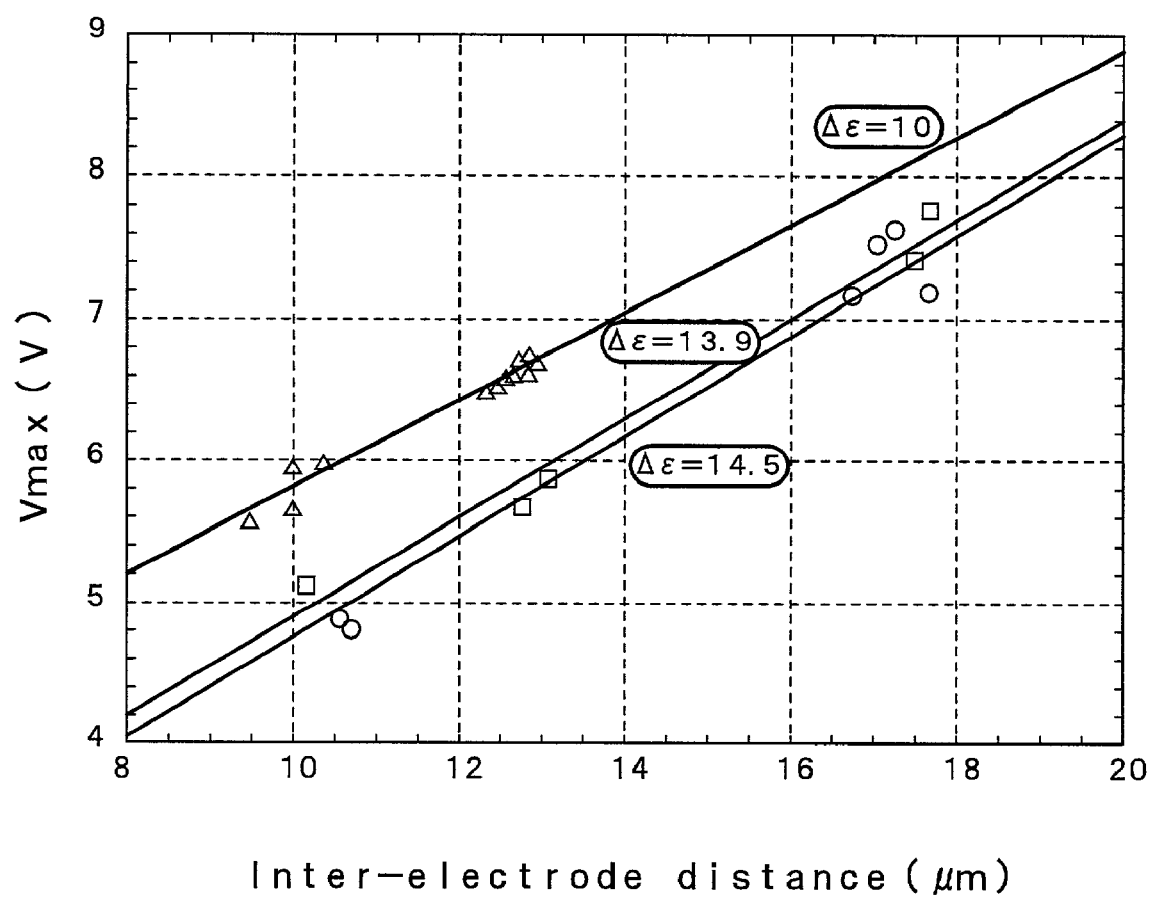
FIG. 53 is a graph showing the relationship among the dielectric anisotropy of the liquid crystal, the distance between the pixel electrode and the reference electrode, and inter-electrode voltage Vmax.
Figure 54:
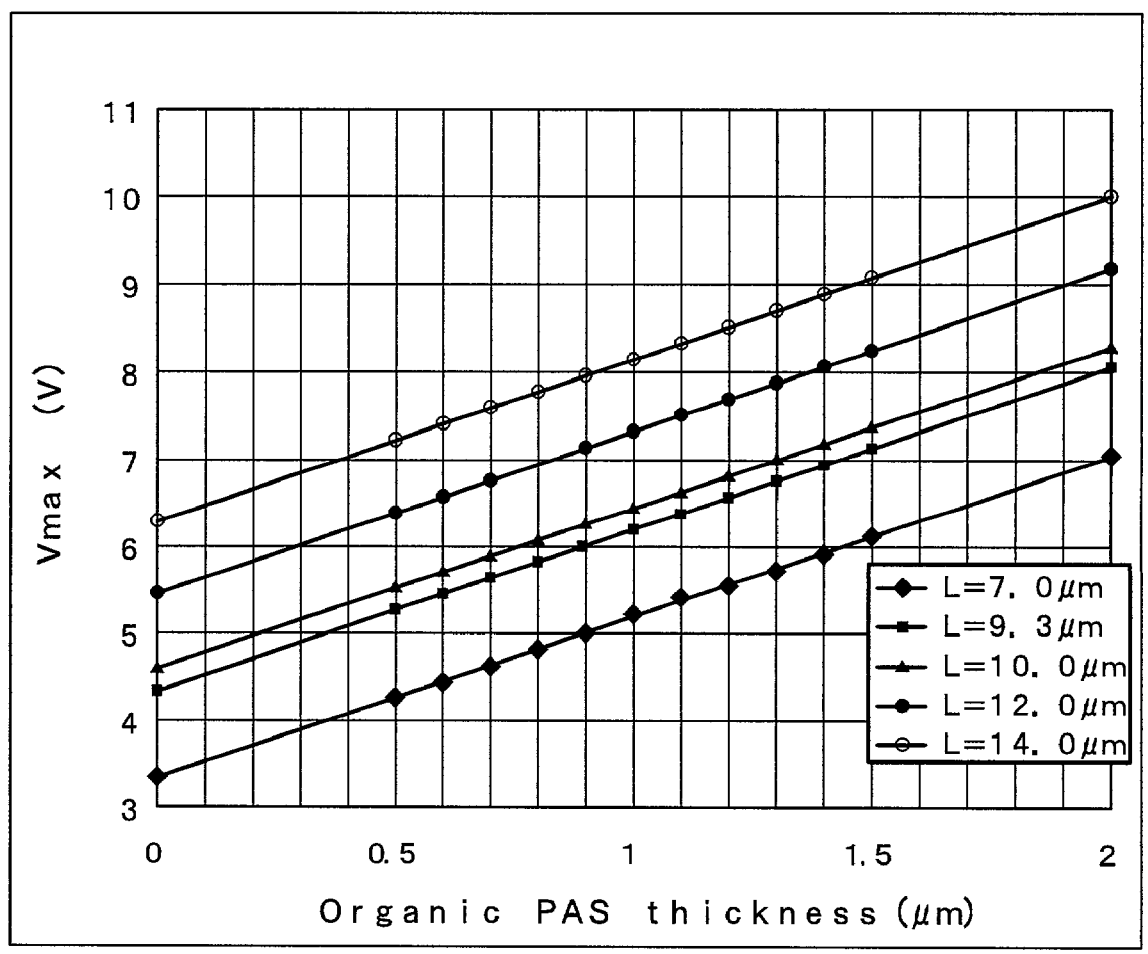
FIG. 54 is a graph showing the relationship among a film thickness of a protective film made of organic material with the dielectric anisotropy of the liquid crystal set to 10, the distance between the pixel electrode and the reference electrode and the inter-electrode voltage Vmax.
Figure 55:
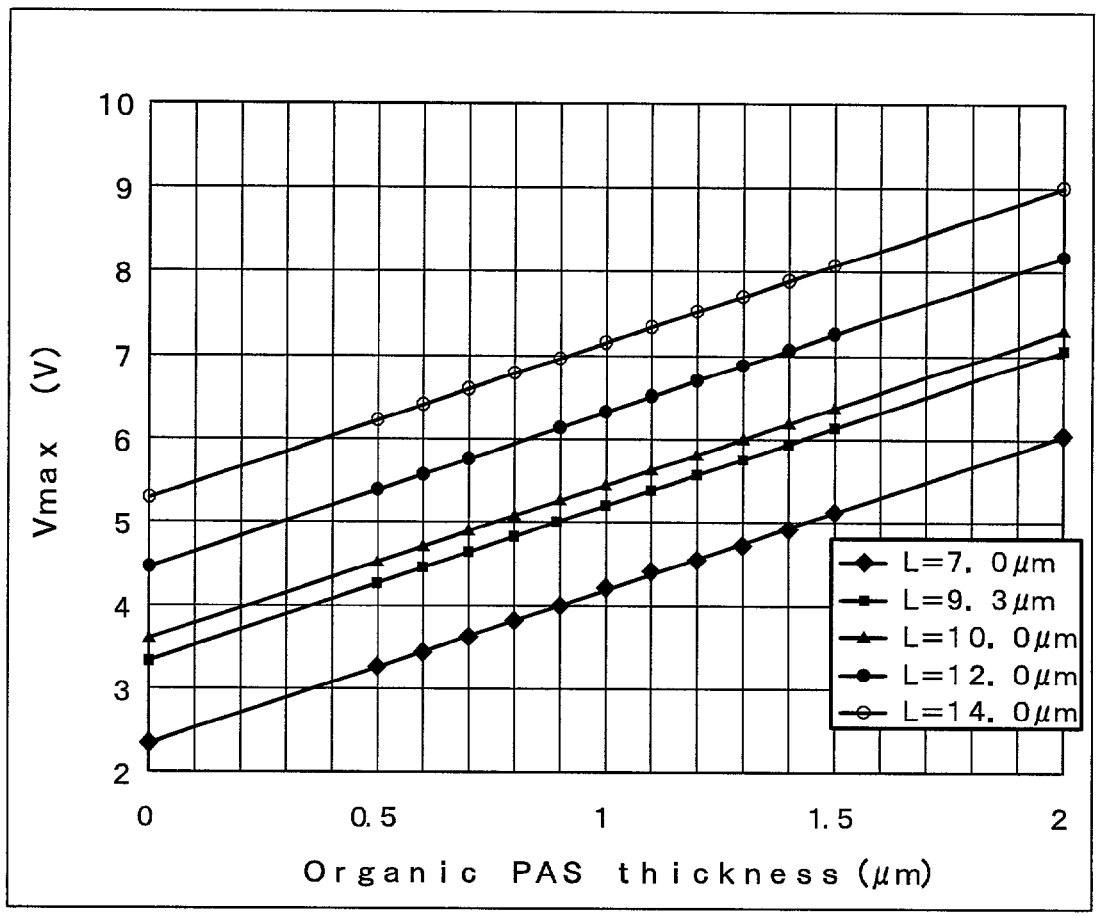
FIG. 55 is a graph showing the relationship among a film thickness of a protective film made of organic material, the distance between the pixel electrode and the reference electrode and the inter-electrode voltage Vmax with the dielectric anisotropy of the liquid crystal set to 14.5.
Figure 56:
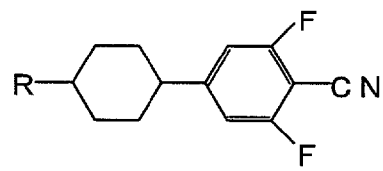
FIG. 56 is a structural formula showing one embodiment of a liquid crystal contained in the liquid crystal used in the liquid crystal display device according to the present invention.

First of all, following graphs shown in FIG. 53 to FIG. 55 are obtained. That is, the graph shown in FIG. 53 indicates the relationship among the dielectric anisotropy of the liquid crystal, the distance between the pixel electrode PX and the reference electrode CT and the liquid crystal driving voltage Vmax. The graph shown in FIG. 54 which indicates the relationship among the film thickness of the protective film PSV2 when the dielectric anisotropy of the liquid crystal is set to 10, the distance between the pixel electrode PX and the reference electrode CT and the liquid crystal driving voltage Vmax. The graph shown in FIG. 55 which indicates the relationship among the film thickness of the protective film PSV2 when the dielectric anisotropy of the liquid crystal is set to 14.5, the distance between the pixel electrode PX and the reference electrode CT and the liquid crystal driving voltage Vmax.

In view of the above, as shown in FIG. 53, the liquid crystal driving voltage Vmax can be reduced with the use of the liquid crystal material having the high dielectric anisotropy of the liquid crystal. Then, corresponding to the increase of the film thickness of the protective film PSV2, the liquid crystal driving voltage Vmax is increased, while corresponding to the increase of the distance between the pixel electrode PX and the reference electrode CT, the liquid crystal driving voltage Vmax is increased. These relationships are indicated in FIG. 54 and FIG. 55.

Accordingly, the relationship expressed by a following formula (4) is led from the above-mentioned graph.

$$Vmax=1.9d+0.4146W-0.2328\Delta\epsilon+2.8218 \qquad (4)$$

Here, d is a film thickness (μm)of a protective film PSV2 made of organic material, W is a distance (μm) between a pixel electrode Px and a reference electrode CT and Δϵis a dielectric anisotropy of a liquid crystal.

Figure 57:
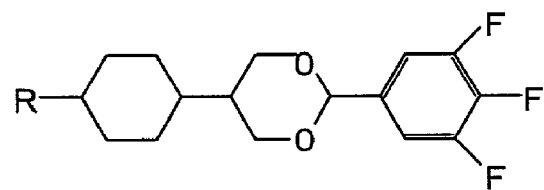
FIG. 57 is a structural formula showing one embodiment of a liquid crystal contained in the liquid crystal used in the liquid crystal display device according to the present invention.

From the above, it is preferable to use a cyano difluorine liquid crystal which is expressed by a structural formula shown in FIG. 55 as the material of the liquid crystal having high dielectric anisotropy of a liquid crystal Δϵ. Further, it is preferable to use a trifluoro dioxane liquid crystal which is expressed by a structural formula shown in FIG. 57 as the liquid crystal to realize the high dielectric anisotropy of a liquid crystal Δϵof not less than 14.5.

In any case, with the use of the liquid crystal which contains at least one of these liquid crystals, the liquid crystal driving voltage Vmax can be reduced.

(Embodiment 69)

In the constitution adopting the normally black mode, when the pixel electrode PX and the reference electrodes CT constitute different layers from each other via the protective film PSV2 made of organic material, the liquid crystal display can be realized by setting the amplitude of the output voltage of the drain drivers at the time of white display to not more than 7.5 V at one side of amplitude.

(Embodiment 70)

Further, in the constitution adopting the normally black mode, when the pixel electrode PX and the reference electrodes CT constitute different layers from each other via the protective film PSV2 made of organic material, the liquid crystal display can be realized by setting the film thickness d (μm)of a protective film PSV2, the distance W (μm) between the pixel electrode Px and the reference electrode CT and the dielectric anisotropy of the liquid crystalΔϵ such that the liquid crystal driving voltage Vmax in the above-mentioned formula (4) becomes less than 15 V , performing a so-called common inversion, and setting the amplitude of the output voltage of the drain drivers at the time of white display to not more than 7.5 V at one side of amplitude.

This is because that, with the use of the common inversion driving, the output voltage of the drivers necessary for obtaining the same liquid crystal driving voltage can be reduced approximately by half.

(Embodiment 71)

Further, in the constitution adopting the normally black mode, when the pixel electrode PX and the reference electrodes CT constitute different layers from each other via the protective film PSV2 made of organic material, the liquid crystal display can be realized by setting the film thickness d (μm)of a protective film PSV2, the distance W (μm) between the pixel electrode PX and the reference electrode CT and the dielectric anisotropy of the liquid crystalΔϵ such that the liquid crystal driving voltage Vmax in the above-mentioned formula (4) becomes less than 7.5 V and setting the amplitude of the output voltage of the drain drivers at the time of white display to not more than 7.5 V at one side of amplitude.

(Embodiment 72)

Further, in the constitution adopting the normally black mode, when the pixel electrode PX and the reference electrodes CT constitute different layers from each other via the protective film PSV2 made of organic material, the liquid crystal display can be realized by setting the maximum amplitude of voltage of video signals to not more than a voltage which is necessary for setting the relative transmittivity of the liquid crystal layer to 90% and by setting the amplitude of the output voltage of the drain drivers at the time of white display to not more than 7.5 V at one side of amplitude in the state that the liquid crystal driving voltage Vmax in the above-mentioned formula (4) is less than 9.375 V.

This is because that, in the normally black mode, since a curve B-V in the vicinity of the liquid crystal driving voltage Vmax becomes gentle, compared to the voltage necessary for obtaining the transmittivity of 100, as the voltage necessary for obtaining the transmittivity of 90%, it is sufficient to ensure 80% of the voltage necessary for obtaining the transmittivity of 100.

(Embodiment 73)

Further, in the constitution adopting the normally black mode, when the pixel electrode PX and the reference electrodes CT constitute different layers from each other via the protective film PSV2 made of organic material, the liquid crystal display can be realized by performing a so-called common inversion, setting the maximum amplitude of voltage of video signals to not more than a voltage which is necessary for setting the relative transmittivity of the liquid crystal layer to 90% and by setting the amplitude of the output voltage of the drain drivers at the time of white display to not more than 7.5 V at one side of amplitude in the state that the liquid crystal driving voltage Vmax in the above-mentioned formula (4) is less than 18.75 V.

(Embodiment 74)

Further, in the constitution adopting the normally black mode, when the pixel electrode PX and the reference electrodes CT constitute different layers from each other via the protective film PSV2 made of organic material, it becomes possible to cope with the generation of heat of the drain drivers by setting the amplitude of the output voltage of the drain drivers at the time of white display to not more than 5 V at one side of amplitude.

(Embodiment 75)

Further, in the constitution adopting the normally black mode, when the pixel electrode PX and the reference electrodes CT constitute different layers from each other via the protective film PSV2 made of organic material, it becomes possible to cope with the generation of heat of the drivers by performing a so-called common inversion, and by setting the amplitude of the output voltage of the drain drivers at the time of white display to not more than 5 V at one side of amplitude, and by setting the film thickness d (μm)of a protective film PSV2, the distance W (μm) between the pixel electrode PX and the reference electrode CT and the dielectric anisotropy of the liquid crystalΔϵ such that the liquid crystal driving voltage Vmax in the above-mentioned formula (4) becomes less than 10 V.

(Embodiment 76)

Further, in the constitution adopting the normally black mode, when the pixel electrode PX and the reference electrodes CT constitute different layers from each other via the protective film PSV2 made of organic material, it becomes possible to cope with the generation of heat of the drivers by performing a so-called common inversion, and by setting the amplitude of the output voltage of the drain drivers at the time of white display to not more than 5 V at one side of amplitude, and by setting the film thickness d (μm)of a protective film PSV2, the distance W (μm) between the pixel electrode PX and the reference electrode CT and the dielectric anisotropy of the liquid crystal$\Delta\epsilon$ such that the liquid crystal driving voltage Vmax in the above-mentioned formula (4) becomes less than 10 V.

(Embodiment 77)

Further, in the constitution adopting the normally black mode, when the pixel electrode PX and the reference electrodes CT constitute different layers from each other via the protective film PSV2 made of organic material, it becomes possible to cope with the generation of heat of the drivers by setting the maximum amplitude of voltage of video signals to not more than a voltage which is necessary for setting the relative transmittivity of the liquid crystal layer to 90% and by setting the amplitude of the output voltage of the drain drivers at the time of white display to not more than 5 V at one side of amplitude in the state that the liquid crystal driving voltage Vmax in the above-mentioned formula (4) is less than 6.25 V.

(Embodiment 78)

Further, in the constitution adopting the normally black mode, when the pixel electrode PX and the reference electrodes CT constitute different layers from each other via the protective film PSV2 made of organic material, it becomes possible to cope with the generation of heat of the drivers by setting the maximum amplitude of voltage of video signals to not more than a voltage which is necessary for setting the relative transmittivity of the liquid crystal layer to 90% and by setting the amplitude of the output voltage of the drain drivers at the time of white display to not more than 5 V at one side of amplitude in the state that the liquid crystal driving voltage Vmax in the above-mentioned formula (4) is less than 12.5 V.

As can be clearly understood from the above-mentioned description, according to the present invention, the liquid crystal display device which can suppress the local temperature elevation in the vicinity of the drivers is obtained.

The liquid crystal display device which can suppress the transmission of the stress of the drivers to the substrate is obtained.

The liquid crystal display device which can suppress the alignment displacement on a display surface in the vicinity of drivers is obtained.

The liquid crystal display device which can enhance the numerical aperture is obtained.

The liquid crystal display device which can narrow the so-called picture frame is obtained.

What is claimed is:

1. A liquid crystal display device comprising
first and second substrates with a liquid crystal layer therebetween;
a plurality of gate signal line and a plurality of reference voltage signal line formed on the first substrate;
a wiring adjacently arranged along a display area which has a plurality of pixels;
and a plurality of reference electrodes formed on a layer arranged above said first substrate, said reference electrodes connected with said reference voltage signal lines;
wherein each of the plurality of the gate signal lines is elongated in a respective first direction in the display area, where the plurality of the gate lines are parallel with each other, and is elongated in a respective second direction in an area outside of the display area, where the plurality of the gate lines are not parallel with each other, and
at least one connecting portion of said reference electrodes is provided between two neighboring ones of the gate signal lines, and the connecting portion is formed in said outside area and connected to said wiring at a crossing between said wiring and an imaginary line defined by prolonging an neighboring gate signal line from the display area to said outside area along the first direction.

2. A liquid crystal display device according to claim 1, wherein a number of said at least one connecting portions at one side of the display area is smaller than a number of the reference voltage signal lines.

3. A liquid crystal display device according to claim 2, wherein a number of said at least one connecting portions at one side of the display area is half of a number of the gate signal lines.

4. A liquid crystal display device comprising:
first and second substrates with a liquid crystal layer therebetween;
a plurality of gate signal lines and a plurality of holding capacitive lines formed on the first substrate; and
a wiring adjacently arranged along a display area which has a plurality of pixels;
and a plurality of reference electrodes formed on a layer arranged above said first substrate, said reference electrodes connected with said holding capacitive lines;
wherein each of the plurality of the gate signal lines is elongated in a respective first direction in the display area, where the plurality of the gate lines are parallel with each other, and is elongated in a respective second direction, in an area outside of the display area, where the plurality of the gate lines are not parallel with each other, and
at least one connecting portion of said reference electrodes is provided between two neighboring ones of the gate signal lines, and the connecting portion is formed in said outside area and connected to said wiring at a crossing between said wiring and an imaginary line defined by prolonging an neighboring gate signal line from the display area to said outside area along the respective first direction.

5. A liquid crystal display device according to claim 4, wherein a number of said at least one connecting portions at one side of the display area is smaller than a number of the holding capacitive lines.

6. A liquid crystal display device according to claim 5, wherein a number of said at least one connecting portions at one side of the display area is half of a number of the gate signal lines.

7. A liquid crystal display device comprising:
first and second substrates with a liquid crystal layer therebetween;
a plurality of gate signal lines and a plurality of reference voltage signal lines formed on the first substrate; and
a plurality of reference electrodes formed on a layer arranged above said first substrate, said reference electrodes connected with said reference voltage signal lines;
a wiring arranged outside of a display area,
wherein each of the plurality of the gate signal lines is elongated in a respective first direction in a first region and elongated in a respective second direction in a second region, the respective first directions are identical for the plurality of the gate signal lines, and the respective second directions are different among some of the plurality of the gate signal lines, and at least one connecting portion of said reference electrodes is provided between two neighboring ones of the gate signal lines and arranged in said second region, and the connecting portion crosses an imaginary line defined by prolonging one of said neighboring gate signal lines from the first region to the second region along the respective first direction.

8. A liquid crystal display device according to claim 7, wherein the reference electrodes are arranged in a layer different from a layer in which the gate signal lines are arranged.

9. A liquid crystal display device according to claim 7, wherein the reference voltage signal lines are connected through the wiring.

10. A liquid crystal display device according to claim 7, wherein the respective second directions are different among some of the gate signal lines such that some of the gate lines converge in the second region.

11. A liquid crystal display device according to claim 7, wherein some of the reference electrodes converge in the second region.

12. A liquid crystal display device according to claim 7, wherein a number of said at least one connecting portions at one side of the display area is smaller than a number of the reference voltage signal lines.

13. A liquid crystal display device according to claim 12, wherein a number of said at least one connecting portions at one side of the display area is half of a number of the gate signal lines.

14. A liquid crystal display device comprising:
first and second substrates with a liquid crystal layer therebetween;
a plurality of gate signal lines and a plurality of holding capacitive lines formed on the first substrate; and
a plurality of reference electrodes formed on a layer arranged above said first substrate, said reference electrodes connected with said holding capacitive lines;
a wiring arranged outside of a display area,
wherein each of the plurality of the gate signal lines is elongated in a first direction in a first region and elongated in a second direction in a second region,
the respective first directions are identical for the plurality of the gate signal lines, and the respective second directions are different among some of the plurality of the gate signal lines, and at least one connecting portion of said reference electrodes is provided between two neighboring ones of the gate signal lines and arranged in said second region, and the connecting portion crosses an imaginary line defined by prolonging one of said neighboring gate signal lines from the first region to the second region along the respective first direction.

15. A liquid crystal display device according to claim 14, wherein the reference electrodes are arranged in a layer different from a layer in which the gate signal lines are arranged.

16. A liquid crystal display device according to claim 14, wherein the holding capacitive lines are connected through the wiring.

17. A liquid crystal display device according to claim 14, wherein the respective second directions are different among some of the gate signal lines such that some of the gate lines converge in the second region.

18. A liquid crystal display device according to claim 14, wherein a number of said at least one connecting portions at one side of the display area is smaller than a number of the holding capacitive lines.

19. A liquid crystal display device according to claim 18, wherein a number of said at least one connecting portions at one side of the display area is half of a number of the gate signal lines.

* * * * *